(12) United States Patent
Schmidt et al.

(10) Patent No.: US 11,313,967 B2
(45) Date of Patent: Apr. 26, 2022

(54) SELF-TESTING MEASURING SYSTEM

(71) Applicant: Elmos Semiconductor SE, Dortmund (DE)

(72) Inventors: André Schmidt, Wiehl (DE); Guido Schlautmann, Altenberge (DE); Stefanie Heppekausen, Essen (DE)

(73) Assignee: ELMOS SEMICONDUCTOR SE, Dortmund (DE)

( * ) Notice: Subject to any disclaimer, the term of this patent is extended or adjusted under 35 U.S.C. 154(b) by 0 days.

(21) Appl. No.: 17/106,750

(22) Filed: Nov. 30, 2020

(65) Prior Publication Data
US 2021/0080574 A1 Mar. 18, 2021

Related U.S. Application Data

(63) Continuation of application No. 16/636,372, filed as application No. PCT/EP2018/071025 on Aug. 2, 2018, now abandoned.

(30) Foreign Application Priority Data

Aug. 9, 2017 (DE) ...................... 10 2017 118 096.6
Aug. 9, 2017 (DE) ...................... 10 2017 118 097.4
(Continued)

(51) Int. Cl.
*G01S 15/931* (2020.01)
*G01S 7/52* (2006.01)
(Continued)

(52) U.S. Cl.
CPC ........ *G01S 15/931* (2013.01); *G01S 7/52004* (2013.01); *G01S 7/524* (2013.01); *G01S 7/526* (2013.01); *G01S 7/4073* (2021.05)

(58) Field of Classification Search
CPC .... G01S 15/931; G01S 7/52004; G01S 7/524; G01S 7/526; G01S 7/4073
See application file for complete search history.

(56) References Cited

U.S. PATENT DOCUMENTS

| 4,743,886 A | 5/1988 | Steiner et al. |
| 5,808,177 A | 9/1998 | Bonnefoy |
| (Continued) | | |

FOREIGN PATENT DOCUMENTS

| DE | 19625667 A1 | 1/1998 |
| DE | 10248677 A1 | 4/2004 |
| (Continued) | | |

OTHER PUBLICATIONS

Sleiman, Bou Sleiman et al. "Built-in-Self-Test and Digital Self-Calibration for Radio Frequency Integrated Circuits"; Sep. 26, 2011; Retrieved from the internet: https://etd.ohiolink.edu/!etd.send_file?accession=osu1311685013&disposition=inline [retrieved on Oct. 19, 2018] XP055517369.

(Continued)

*Primary Examiner* — Ryan W Sherwin
(74) *Attorney, Agent, or Firm* — Michael J. McCandlish

(57) ABSTRACT

A self-testing measuring system includes at least three modes: an operating mode and at least two test modes. In a third test mode, a digital signal generating unit stimulates the digital input circuit directly by means of test signals. In a second test mode, the digital signal generating unit stimulates the analogue signal string and the digital input circuit by means of test signals. In a first test mode, the digital signal generating unit stimulates the analogue signal string, the measuring unit (typically an ultrasound transducer) and the digital input circuit by means of test signals, thereby allowing this signal string to be tested. In the operating mode, the digital signal generating unit stimulates the analogue signal string, the measuring unit (typically an ultra- (Continued)

sound transducer) and the digital input circuit by means of output signals, thereby allowing the signal string to be monitored for parameter compliance.

27 Claims, 57 Drawing Sheets

(30) Foreign Application Priority Data

| Aug. 9, 2017 | (DE) | ..................... | 10 2017 118 098.2 |
| Aug. 9, 2017 | (DE) | ..................... | 10 2017 118 099.0 |
| Aug. 9, 2017 | (DE) | ..................... | 10 2017 118 100.8 |
| Aug. 9, 2017 | (DE) | ..................... | 10 2017 118 101.6 |
| Aug. 9, 2017 | (DE) | ..................... | 10 2017 118 102.4 |
| Aug. 9, 2017 | (DE) | ..................... | 10 2017 118 103.2 |
| Aug. 9, 2017 | (DE) | ..................... | 10 2017 118 104.0 |
| Aug. 9, 2017 | (DE) | ..................... | 10 2017 118 105.9 |
| Aug. 9, 2017 | (DE) | ..................... | 10 2017 118 106.7 |
| Aug. 9, 2017 | (DE) | ..................... | 10 2017 118 107.5 |
| Apr. 3, 2018 | (DE) | ..................... | 10 2018 107 826.9 |

(51) Int. Cl.
*G01S 7/524* (2006.01)
*G01S 7/526* (2006.01)
*G01S 7/40* (2006.01)

(56) References Cited

U.S. PATENT DOCUMENTS

| 5,856,953 | A | 1/1999 | Durkee |
| 6,314,380 | B1* | 11/2001 | Seip .................. B60H 1/00742 |
| | | | 702/99 |
| 2004/0004905 | A1 | 1/2004 | Lyon et al. |
| 2004/0194532 | A1 | 10/2004 | Lally et al. |
| 2012/0192043 | A1 | 7/2012 | Jiang et al. |
| 2017/0212230 | A1* | 7/2017 | Wigh ..................... G01S 15/42 |

FOREIGN PATENT DOCUMENTS

| DE | 102008001436 A1 | 10/2009 |
| DE | 102008042820 A1 | 4/2010 |
| DE | 102011016287 A1 | 7/2012 |
| DE | 102011121092 A1 | 6/2013 |
| DE | 102013008235 A1 | 11/2014 |
| DE | 10 2013 021 328 A | 6/2015 |
| DE | 102015012192 B3 | 3/2016 |
| DE | 112016002984 T5 | 3/2018 |
| EP | 1410950 A2 | 4/2004 |
| EP | 1965179 A1 | 9/2008 |
| EP | 2124070 A2 | 11/2009 |
| JP | 2015121502 A | 7/2015 |
| WO | 2014067777 A1 | 5/2014 |
| WO | 2017002548 A1 | 1/2017 |

OTHER PUBLICATIONS

Erdem Serkan Erdogan et al. "Single-Measurement Diagnostic Test Method for Parametric Raults of I/Q Modulating RF TRansceivers"; VLSI Test Symposium, 2008. 26th IEEE, IEEE, Piscataway, MJ, USA; Apr. 27, 2008; ISBN: 978-0-7695-3123-6. XP031248853.
Thierry Oggier et al. "SwissRanger SR3000 and First Experiences based on Miniaturized 3D-TOF Cameras"; Proc. of the First Range Imaging Research Day at ETH Zurich, Switzerland; Sep. 8, 2005; Retrieved from the Internet: http://j-clavis.co.jp/pdf/h-4.pdf [retrieved on Jan. 23, 2019]; XP055546515.
International Search Report for PCT/EP2018/071025 with English Translation and Written Opinion.
Further International Search Report for PCT/EP2018/071025 with English Translation.

* cited by examiner

SELF-TESTING MEASURING SYSTEM

CROSS-REFERENCE TO RELATED APPLICATIONS

This application claims priority to U.S. patent application Ser. No. 16/636,372 filed on Feb. 4, 2020, which application is a national stage of, and claims priority to, Patent Cooperation Treaty Application No. PCT/EP2018/071025, filed on Aug. 2, 2018, which application claims priority to German Application No. DE 10 2017 118 096.6, filed on Aug. 9, 2017, German Application No. DE 10 2017 118 097.4, filed on Aug. 9, 2017, German Application No. DE 10 2017 118 098.2, filed on Aug. 9, 2017, German Application No. DE 10 2017 118 099.0, filed on Aug. 9, 2017, German Application No. DE 10 2017 118 100.8, filed on Aug. 9, 2017, German Application No. DE 10 2017 118 102.4, filed on Aug. 9, 2017, German Application No. DE 10 2017 118 103.2, filed on Aug. 9, 2017, German Application No. DE 10 2017 118 104.0, filed on Aug. 9, 2017, German Application No. DE 10 2017 118 105.9, filed on Aug. 9, 2017, German Application No. DE 10 2017 118 106.7, filed on Aug. 9, 2017, German Application No. DE 10 2017 118 107.5, filed on Aug. 9, 2017, German Application No. DE 10 2017 118 101.6, filed on Aug. 9, 2017, and German Application No. DE 10 2018 107 826.9, filed on Apr. 3, 2018, which applications are hereby incorporated herein by reference in their entireties.

TECHNICAL FIELD

The disclosure relates to a self-testing measuring system, in particular an ultrasound sensor measuring system for automotive use, and to a method for operating a self-testing measuring system.

BACKGROUND

Within the scope of the introduction of functional safety in accordance with ISO standard 26262 in the automotive sector, ultrasound sensor systems must also satisfy such functional safety requirements. These requirements are particularly high in respect of autonomous functions, for example automatic parking. In order to better identify hidden errors, a self-diagnosis capability is also necessary, particularly during operation. One problem is that the measurement results of such ultrasound measuring systems are used for example for the autonomous parking of motor vehicles. An identification of hidden errors is therefore essential.

Document DE-A-10 2013 021 328 describes an ultrasound sensor device and a corresponding method for measuring by means of ultrasonic pulses. For diagnosis, in the known methods, in a first test mode pulses are sent by a control command, received, and assessed in the receiver. In the second test mode the pulses originating from the transmitter are transmitted via the direct connection, received, and assessed in the receiver.

Document DE-A-10 2008 042 820 describes a sensor apparatus comprising an ultrasound sensor and a function monitoring apparatus for determining the impedance by means of a voltage level which is determined by amplifiers, filters, and microcontrollers at the sound converter. This document, too, describes an assessment of the voltage level at a comparator, wherein a monitoring signal in respect of the voltage or impedance is formed.

SUMMARY

The object of the disclosure is to describe a self-testing measuring system and a method for operating same, by means of which an improved self-testing functionality may be achieved.

In order to solve the problem, a self-testing measuring system and a self-testing method are proposed as disclosed herein.

During the initial self-test of the proposed measuring system (SS) or within the scope of customer-specific diagnosis measures, various tests for system diagnosis may be performed:
1. Checking the digital signal processing
   ADVANTAGE: stimuli and expected values of the system response of the digital signal processing may be determined in exact fashion.
2. Internal signal path checking
   (Excitation of the burst generator, use of a divided driver current, in-coupling after the first amplifier step, assessment in accordance with the echo evaluation).
   ADVANTAGE: this method is quick and comprehensive.
3. Impedance value checks of the impedance of the measuring unit (TR), that is to say for example an ultrasound transducer (TR)
   (Execution of a frequency sweep and assessment of the resonance profile)
   ADVANTAGE: The method tests the complete signal path inclusive of the external elements. The assessment of the resonance profile of the measuring unit (TR), that is to say the ultrasound transducer (TR), which is the system response of the measuring unit (TR) to the stimulus in the form of the frequency sweep, may occur in the digital signal processing already checked in accordance with methodology 1. The frequency sweep itself may also be produced in the digital signal processing already checked according to number 1 above.
4. Comparators at the sensor controller for monitoring the external components and the driver transistors
   ADVANTAGE: Continuous checking of the sensor excitation also during operation.
5. Symmetry check by symmetry checking apparatuses also during operation
   ADVANTAGE: Operation-relevant disturbances to the symmetry of the measuring unit (for example the ultrasound transmitter system) may be identified.
6. Harmonics checking also during operation
   ADVANTAGE: operationally relevant, non-symmetry-impairing, yet vibration spectrum-changing disturbances to the measuring unit (for example the ultrasound transducer/transmitter interference subsystem) may be identified.

The digital signal processing is checked by feeding at least one test signal corresponding to a critical possible signal of the relevant measuring unit, for example an ultrasound sensor system in the form for example of an ultrasound transducer. This feed is provided in the signal path of the ultrasound sensor system in a third test mode of the sensor system after the analogue-to-digital converter (ADC) or in a second test mode of the sensor system before the analogue-to-digital converter (ADC). There is then an assessment of the form, as would occur in normal operation for an actual ultrasound echo signal or measurement signal of a measuring unit. Since both the test signal and the expected result thereof are already known, the signal path may be checked very quickly during operation for continuity and functionality. This may occur during operation without any detriment to performance, for example at non-operational times, or during the starting or re-starting of the system, or during shutdown. A feed into the signal path before the analogue-to-digital converter (ADC) is provided here as an analogue signal via an analogue multiplexer (AMX). A feed into the signal path after the analogue-to-digital converter (ADC) is provided here digitally, for example via a digital multiplexer (DMX). In the case of a digital feed, the response of the system at the end of the signal path must comply exactly with the specifications, whereas in the case of a feed in the form of analogue signal, a tolerance range must be specified or the analogue signals should be produced with such an allowance that an incorrect assessment under consideration of the process fluctuations and the operating parameter fluctuations is ruled out. The advantage of this method is that it is particularly quick and exact.

During normal operation of the ultrasound sensor system, a rather high functional test coverage may hereby be maintained. These principles, however, may be generalised to similar measuring systems in which other measuring units may be used in accordance with the disclosure.

The principle of the self-testing method proposed here comprises feeding of a test signal after or before the analogue-to-digital converter (ADC) in the analogue input circuit (AS) and assessment in accordance with the echo assessment in the subsequent digital input circuit (DSI). Check possible here to pass through various paths in the analogue input circuit (AS) and in the subsequent digital input circuit (DSI), in order to adapt the checks as precisely as possible to the particular application of the measuring system (SS).

The excitation with a defined input signal by a digital input circuit (DSI) with bypassing of the non-digital signal path components leads to fixed, reproducible echo information (for example in respect of moment in time, echo level, correlation with an expected, exactly pre-known signal profile, etc.) at the output of the signal string in the digital input circuit (DSI).

This predictability is used for a self-test with one operating mode and three test modes of the measuring system.

A self-testing measuring system (SS) is therefore proposed, having
  a digital signal generating unit (DSO) for generating the stimuli,
  a driver stage (DR) for power amplification and analogue signal shaping of the digitally present stimuli,
  a measuring unit (TR), for example an ultrasound transducer, for converting the power-amplified stimuli into measurement signals in the measurement medium (for example air in the case of ultrasound) and for receiving the channel response from the measuring channel (CH) in the form of a received signal,
  an analogue input circuit (AS) for amplifying, pre-processing and digitizing the received signal, and
  a digital input circuit (DSI) for processing the digitised received signal. These components of a measuring system may be found in the prior art in typical ultrasound measuring systems, for example for use in automotive parking aid systems.

The previously described measuring system, on which the disclosure is based, in generalised terms thus has a measuring unit which transmits an excitation or output signal as measurement signal into a measuring channel or a measuring section and receives a response signal in return. The measuring unit, quite generally, in this regard has at least one actuator and at least one sensor, which are operatively connected via the measuring channel or the measuring section. The measuring system has an excitation (or also outward) signal path and a response (or also return) signal path. Both signal paths are provided with a digital circuit part and an analogue circuit part for the purpose of digital signal processing. The digital excitation signal is converted in the outward signal path into an analogue excitation signal, by means of which the measuring unit is controlled. It delivers over the returned signal path an analogue response signal, which is converted into a digital signal. The digital signal is evaluated in the measuring system, or this may also be implemented outside the measuring system. Here, it is checked whether the digital excitation signal has led to the expected response signal. An analogue channel simulation unit is connected between the analogue circuits in the outward and return signal path and the measuring unit, and is connected to the outward signal path (or optionally is connectable thereto), more specifically between the analogue circuit and the measuring unit, and via a multiplexer or similar switchover unit optionally feeds its output signal, instead of the response signal originating from the measuring unit, into the analogue circuit of the return signal path. A digital channel simulation unit, which is connected to the outward signal path (or optionally is connectable thereto), is also situated between the digital circuits and the analogue circuits of both signal paths, more specifically between the digital circuit and analogue circuit thereof, and via a further multiplexer or similar switchover unit optionally feeds its digital output signal, instead of the response signal originating from the analogue circuit of the return signal path, into the digital circuit of the return signal path. The analogue channel simulation unit emulates or simulates the measuring unit (optionally with measuring channel), whereas the digital channel simulation unit simulates the analogue circuits of both signal paths and the measuring unit. As soon as the analogue channel simulation unit is activated, the digital channel simulation unit is inactive (i.e. does not feed any signal into the return signal path). If the digital channel simulation unit is activated, the analogue channel simulation unit should be deactivated. Alternatively, however, in this case the analogue channel simulation unit may likewise be activated. Depending on this, different tests may be carried out in order to examine the components of the system.

The analogue channel simulation unit may be formed as a damping member which adapts the comparatively high signal level for controlling the measuring unit (the measurement signal, in particular in the case of an ultrasound measuring unit, should be energy-rich in order to cover an accordingly large detection range) to the signal level of the response of the measuring system. Conversely, the analogue channel simulation unit may also have an amplification signal if the ratios of the level values of the control and response signals of the measuring unit are inverse as compared to that stated above. The digital channel simulation unit, in addition to the above, also emulates the functions of the analogue circuits of both signal paths, which for example are formed in the outward signal path as a digital-analogue converter, optionally with signal amplification, and in the return signal path for example as an analogue-digital converter.

In order to now enable an efficient self-test of the measuring system (SS) it is thus proposed to provide the self-testing measuring system additionally with an analogue channel simulation unit (ACS). This analogue channel simulation unit (ACS) should be able to emulate the string from measuring unit (TR) (or ultrasound transducer (TR)) and measuring channel (CN) in signal form. In order to enable this, the return signal path must be separated by an analogue multiplexer (AMX) before the analogue input circuit (AS), so as to optionally feed the output signal of the analogue channel simulation unit (ACS) there and the output signal of the measuring unit (TR) (or the ultrasound transducer (TR)). It is of course also conceivable to feed the output signal of the analogue channel simulation unit (ACS) within the analogue input circuit (AS) by a corresponding multiplexer structure within the analogue input circuit (AS) or to implement elements of the analogue channel simulation within the driver stage (DR) (i.e. the analogue circuit of the outward signal path), which acts here also as a digital-to-analogue converter. For example, it is conceivable that the driver stage (DR) in a test configuration is reduced in respect of its starting amplitude, and the analogue input circuit (AS) is controlled directly from the output of the driver stage (TR). The configuration of the driver stage (DR) is preferably controlled by a control device (CTR). The damping for example, realised by the analogue channel simulation unit, is then used to produce a level close to operation at the input of the analogue input circuit (AS). Critical, allowed and incorrect test cases may thus be simulated. The response of the measuring system (SS) must lie within a predetermined expectation value range. Error cases and allowed operating modes may be emulated as test cases. The signal string may thus be examined, with exclusion of the measuring channel (CN) and the measuring unit (TR) (for example an ultrasound transducer) preceding and following this measuring channel (CN), for compliance with predefined specification ranges for important operating parameters and operating cases.

Correspondingly, a digital channel simulation unit (DCS) with a digital multiplexer (DMX) may be provided. The digital channel simulation unit (DCS) preferably emulates, in a manner which may be reproduced exactly, a predetermined behaviour of the signal string from driver stage (DR), measuring unit (TR), measuring channel (CN), and analogue input circuit (AS) in signal form. Critical allowed and defective operating cases may thus be simulated as check cases and test cases. The signal string may thus be checked, with exclusion of the measuring channel (CN) and the measuring unit (TR) (for example an ultrasound transducer) preceding and following the measuring channel (CN) and also the analogue circuit parts, for exact compliance of predefined specification values for important operating parameters and operating cases.

Thus, a plurality of (preferably four) modes of the proposed sensor system (SS) may thus be distinguished:

1. First, the proposed measuring system (SS) has a mode referred to hereinafter as the "operating mode" corresponding to the measuring, normal operation.
2. Second, the measuring system (SS) has a mode referred to hereinafter as the "first test mode", in which the measuring unit (TR), for example an ultrasound transducer, is checked for correct function. This may be implemented for example by way of an impedance measurement of the exemplary ultrasound transducer (TR).
3. Third, the measuring system (SS) has a mode referred to hereinafter as the "second test mode", in which the measuring unit (TR) itself is no longer part of the signal path. Rather, the measuring unit (TR) and therefore also the measuring channel (CN) is bridged by an analogue channel simulation unit (ACS) and an analogue multiplexer (AMX). The advantage is that the behaviour of the signal path is thus no longer dependent on the conditions in the measuring channel (CN) or on the state of the measuring unit (TR), that is to say for example on the state of the measuring unit (TR), for example an ultrasound transducer (TR), and is therefore predictable.

If the response of the signal path in this second test mode to a predefined stimulus does not correspond to an expected response within certain limits, an error is thus present. Here, the expected response must allow a certain tolerance in order to compensate for manufacturing fluctuations which, according to experience, are particularly pronounced in the analogue circuit parts and the measuring unit (TR).

The stimulus and the stimulation of the channel may be selected here such that both stimulus and channel response correspond to an actual case that is allowed according to the specification. In this case, the response of the system must therefore correspond to an expected response within the scope of certain limits foreseeable in advance. If this is not the case, there is an error present.

The stimulus may also be selected such that it corresponds to an actual case that is allowed according to the specification. The simulation of the channel may then be selected here such that the channel response corresponds to a case that is not allowed according to the specification. In this case as well, the error must be identified by the subsequent receive string.

It is of course conceivable that both the stimulus and the simulation of the channel lead to an error case. This must also be identified by the subsequent receive string.

4. Fourth, the proposed measuring system (SS) may assume a mode referred to hereinafter as the "third test mode", in which the measuring unit (TR), in particular in the form of an ultrasound transducer, and the analogue signal path components are no longer part of the remaining signal path. The remaining signal path is then purely digital. Responses of the remaining signal path in this third test mode to predefined stimuli must therefore match exactly with predefined or expected values, in contrast to the second test mode of the measuring system (SS).

The stimulus and the stimulation of the channel may be selected here such that both stimulus and channel response now correspond exactly to an actual case that is allowed according to the specification. In this case the response of the system must match exactly with an associated expected response. If this is not the case, an error is present.

The simulation of the channel may again be selected such that the channel response corresponds to an actual case that is allowed according to specification, however the stimulus itself should lead to an error event in the receive string. If this error event is not identified by the digital receive string consisting only of the digital input circuit (DSI), the digital receive string is thus defective, which may be signalled. In this case, the response of the system must correspond exactly to the expected response.

The stimulus may also be selected here such that it corresponds to an actual case that is allowed according to the specification. The simulation of the channel may then be selected here such that the channel response corresponds to a case that is not allowed according to the specification. In this case as well the error must be identified by the following digital receiving string.

It is of course conceivable for both the stimulus and the simulation of the channel to lead to an error case. This must also be identified by the following digital receive string in the third test mode.

The four modes will first be described hereinafter in greater detail. Further modes may be provided.

Operating Mode

In the operating mode the digital signal generating unit (DSO) generates a first digital signal (S1), which forms or comprises said stimuli. The driver stage (DR) converts this first digital signal (S1) of the digital signal generating unit (DSO) into a second analogue signal (S2) and in so doing typically performs a digital-to-analogue conversion as well as a power amplification. The driver stage (DR), with this second analogue signal (S2), controls the measuring unit (TR), that is to say for example an ultrasound transducer (TR), and thus prompts this, by means of the second analogue signal (S2), to transmit an output signal (MS) into a measuring channel (CN) in an outer region (ASOS) outside the measuring system (SS). For example, by way of the driver stage (DR), an ultrasound transducer (TR) may be prompted to transmit an output signal (MS) into an air gap as measuring channel (CN). The measuring unit (TR), that is to say for example said ultrasound transducer (TR), then receives a receive signal (ES) from the measuring channel (CN) at certain times, which in the case of an ultrasound transducer (TR) preferably correspond to the times of the transmission of the ultrasound measuring signal, i.e. the transmission phases (SP), depending on the output signal (MS). In the case of an ultrasound transducer (TR), these are preferably echoes of the previously emitted output signal (MS), which reach the ultrasound transducer (TR) from the measuring channel (CN). The measuring unit (TR) generates a third analogue signal (S3) depending on the received receive signal (ES), which third analogue signal is dependent on the receive signal (ES) received from the measuring channel (CN). The exemplary ultrasound transducer (TR) for example generates the third analogue signal (S3) depending on the ultrasound receive signal (ES) that it receives from the ultrasound measuring channel (CN) as an echo of the output signal (MS) emitted by itself beforehand.

The analogue multiplexer (AMX) forwards this third analogue signal (S3) as a fourth analogue signal (S4) to the analogue input circuit (AS).

The analogue input circuit (AS) converts the fourth analogue signal (S4) into a fifth digital signal (S5). It thus works on the one hand as an analogue-to-digital converter (ADC). On the other hand, the analogue input circuit, for example, may also comprise filters and amplifiers and other analogue circuits, which pre-process and process the received signal. The digital multiplexer (DMX) forwards the fifth digital signal (S5) as sixth digital signal (S6) in the operating mode.

The digital input circuit (DSI) receives the sixth digital signal (S6) and generates a seventh response signal (S7). For example, the digital input circuit (DSI) may have digital filters and signal processor systems. The use of "matched filters" (also referred to as optimal filters), the filter function of which corresponds to expected signal forms from the previous signal string, is particularly preferred. For example, it is conceivable that further allowed operating configurations are admissible that differ only by the signal path in the digital input circuit (DSI) and/or by the signal path in the analogue input circuit (AS) and by the associated stimuli generation in the digital signal generating unit (DSO) or in the configuration of the driver stage (DR). These configurations are preferably set and controlled by the (system) control device (CTR), the connection lines of which to superordinate overall system components are not shown in the accompanying drawings. For the sake of simplicity, a single configuration of the measuring system (SS) has been assumed here, but is not intended to be limiting in this respect. Since the operating mode is the normal mode, the output signal of the digital input circuit, that is to say the seventh response signal (S7), is interpreted as a signal for the measurement result and is further processed as such and/or signalled at other system components, for example a (system) control device (CTR). By contrast, in the subsequent test modes, the seventh response signal (S7) is interpreted and used as a test result of the measuring system (SS). This does not occur in the operating mode if the values are plausible. It is conceivable, prior to the use of the seventh response signal (S7) as measurement result or prior to the use of the values of the seventh response signal (S7) as measurement result or as measurement results, to check these signals or the values represented by them for plausibility, also in the operating mode, and to thus identify errors during running operation.

First Test Mode (Testing of the Measuring System as A Whole)

In the first test mode the digital signal generating unit (DSO) generates a first digital signal (S1). This comprises predetermined stimuli, which are intended to lead to predictable reactions of the signal string, which can thus be checked. These stimuli may include normal operating cases, error cases, and stimuli for measurements. For example, it is conceivable, in the case of the ultrasound transducer, already mentioned many times, as measuring unit (TR), to excite the ultrasound transducer (TR) to a vibration at a first vibration frequency and then to change the vibration frequency predefinably up to a second vibration frequency, preferably rising monotonically or falling monotonically. Such a method for changing vibration frequency is referred to within the scope of the disclosure as a "sweep".

As in the operating mode, the driver stage (DR) converts this first digital signal (S1) of the digital signal generating unit (DSO) into a second analogue signal (S2), which controls the measuring unit (TR). This second analogue signal (S2) then prompts the measuring unit (TR), that is to say for example the said ultrasound transducer (TR), to transmit an output signal (MS), that is to say for example an ultrasound measurement signal, into a measuring channel (CN), that is to say for example an ultrasound measuring channel, in an outer region (ISS) outside the measuring system (SS). As before in the operating mode, the measuring unit (TR), that is to say for example the ultrasound transducer (TR), receives a receive signal (ES) from the measuring channel (CN) depending on the previously transmitted output signal (MS). The received receive signal (ES) may be an ultrasound echo, for example. The measuring unit (TR), for example the ultrasound transducer (TR), generates a third analogue signal (S3), as before depending on the received receive signal (ES). The analogue multiplexer (AMX) in this first test mode, as before in the operating mode, forwards this third analogue signal (S3) as fourth analogue signal (S4). The analogue input circuit (AS) converts the fourth analogue signal (S4) into a fifth digital signal (S5). However, in contrast to the operating mode, these may now also be constituted by measurement values. For example, it is conceivable to determine the impedance of an ultrasound transducer (TR), which is being used as a measuring unit (TR). This impedance determination occurs preferably in the analogue input circuit (AS) and optionally in cooperation with the subsequent digital input circuit (DSI). Here, special circuit parts of the analogue input circuit (AS) and of the digital input circuit (DSI), which are only employed in the first test mode, may be used. In order for this to be possible, the digital multiplexer (DMX) forwards the fifth digital signal (S5) as sixth digital signal (S6). The digital input circuit (DSI) receives the sixth digital signal (S6) and generates a seventh response signal (S7). However, the seventh response signal (S7) is now used as the test result of the measuring system and not as a measurement result. The testing for excited harmonics and for symmetry of the control and system response may likewise be performed in this first test mode and will be explained later in greater detail.

Second Test Mode (Testing with Simulation/Emulation of the Measuring Unit Performed by the Analogue Channel Simulation Unit)

In the second test mode the digital signal generating unit (DSO) again generates a first digital signal (S1) as stimulus of the subsequent signal string. The driver stage (DR) again converts this first digital signal (S1) of the digital signal generating unit (DSO) into a second analogue signal (S2), as described before. The analogue channel simulation unit (ACS) now modifies this second analogue signal (S2) into a third analogue test signal (S3t). Predefined modes of the measuring channel (CN) and of the measuring unit (TR) are preferably simulated. The analogue multiplexer (AMX) forwards this third analogue test signal (S3t) as fourth analogue signal (S4) instead of the third analogue signal (S3). The measuring unit (TR), that is to say for example the ultrasound transducer (TR), and the measuring channel (CN) are thus bridged in defined and predetermined fashion. Since this occurs in the analogue part of the measuring system (SS), this bridging is not performed in an exactly predeterminable manner, since manufacturing fluctuations and other operating parameters that cannot be influenced completely, such as circuit temperature, lead to behaviour fluctuations of the signal string within the measuring system (SS), in spite of this bridging by the analogue channel simulation unit (ACS) and the analogue multiplexer (AMX). The analogue multiplexer (AMX) may also be configured such that the analogue input circuit (AS) has two inputs, between which it is possible to switch. In this case the analogue multiplexer (AMX) is thus integrated in the analogue input circuit (AS). The disclosure also includes this case. The behaviour of the signal string in response to predefined stimuli generated by the digital signal generating unit (DSO), however, can be examined within predefinable limits. As in the operating mode, the analogue input circuit (AS) again converts the fourth analogue signal (S4) into a fifth digital signal (S5). The digital multiplexer (DMX) forwards the fifth digital signal (S5) as sixth digital signal (S6) to the digital input circuit (DSI). The digital input circuit (DSI) receives the sixth digital signal (S6) and generates a seventh response signal (S7). The digital multiplexer (DMX) may also be realised in such a form that the digital input circuit (DSI) has two inputs, between which it is possible to switch. The digital multiplexer (DMX) is then part of the digital input circuit (DSI). The digital input circuit (DSI) receives the sixth digital signal (S6) and generates a seventh response signal (S7). As in the first test mode, the seventh response signal (S7) is now again used as test result of the measuring system, and not as measurement result.

Third Test Mode (Testing with Simulation/Emulation of the Analogue Components of the Measuring System Performed by the Digital Channel Simulation Unit (DCS))

In the third test mode the digital signal generating unit (DSO) again generates a first digital signal (S1) as predefined stimulus for examining the following signal string. Now, however, the analogue parts of the signal string and the measuring unit (TR) and the measuring channel are bridged. This bridging is performed digitally. Stimuli and the responses of the signal string to these stimuli are therefore exact and predictable. The digital channel simulation unit (DCS) emulates the bridged parts of the signal path by preferably a plurality of emulation states within this third test mode. To this end, the digital channel simulation unit (DCS) preferably has a plurality of configurations, which are set and configured by the control device (CTR). The digital channel simulation unit (DCS) converts the first digital signal (S1) into a fifth digital test signal (S5t). In this third test mode of the measuring system (SS) the digital multiplexer (DMX) forwards the fifth digital test signal (S5t) instead of the fifth digital signal (S5) as sixth digital signal (S6). The digital input circuit (DSI) receives the sixth digital signal (S6) and generates a seventh response signal (S7) corresponding to the stimulus. As in the first and second test mode, the seventh response signal (S7) is now used again as test result of the measuring system and not as measurement result. In contrast to the first and second test mode, however, the seventh response signal (S7) must now satisfy predeterminable responses exactly, since all circuit parts in the active signal path in this third test mode of the measuring system (SS) are digital and all other parts are bridged.

Variant 1

In a further example of the proposal, which preferably relates to an ultrasound measuring system, a transmitter (UEB) is inserted between the measuring unit (TR), that is to say the ultrasound transducer (TR), and the driver stage (DR). In the example of FIG. 2, the transmitter (UEB) is connected by the third analogue signal (S3) to the measuring unit (TR), that is to say here by way of example the ultrasound transducer. In the example of FIG. 2 the third analogue signal (S3) is thus dependent both on the output signal of the transmitter (UEB) and on the input behaviour of the measuring unit (TR), and thus in the case of an ultrasound transducer is dependent on the receive signal (ES). In the operating mode and in the first test mode, the measuring unit (TR) therefore is not prompted directly, but instead via a transmitter (UEB) by means of the second analogue signal (S2) to transmit an output signal (MS) into a measuring channel (CN) in the outer space (ASOS) outside the measuring system (SS). The measuring unit (TR) thus generates the third analogue signal (S3) depending on the received receive signal (ES) and in cooperation with the transmitter (UEB), wherein the third analogue signal (S3) is dependent on the second analogue signal (S2) and the receive signal (ES) received by the measuring unit (TR).

Variant 2

Variant 2 relates to a proposed measuring system (SS) corresponding to variant 1, wherein in the operating mode at least one comparison apparatus, in particular a comparator (C2, C3), compares a parameter value of the third analogue signal (S3a, S3b) with at least one reference value (Ref2, Ref3) and generates at least one comparison result signal (v2, v3) depending on the comparison result. This parameter value may be, for example, a voltage or current level.

Variant 3

Variant 3 relates to a proposed measuring system (SS) corresponding to variant 1, wherein in the operating mode at least one comparison apparatus, in particular a differential amplifier (D1), compares two parameter values of the third analogue signal (S3a, S3b) with one another, in particular by establishing a difference, and generates a difference signal (d1) and, by comparison of the difference signal (d1) with at least one reference value (Ref1), generates a comparison result signal (v1), in particular by means of a comparator (C1) separate from the comparison apparatus. These parameter values may be, for example, voltage or current levels.

Variant 4

Variant 4 relates to a proposed measuring system (SS) corresponding to variant 1, wherein in the operating mode at least one comparison apparatus, in particular a comparator (C4, C5, C6), compares a parameter value of the second analogue signal (S2a, S2b, S2c) with a reference value (Ref4, ref5, Ref6) and generates a comparison result signal (v4, v5,) depending on the comparison result. This parameter value may be, for example, a voltage or current level.

Variant 5

Variant relates to a proposed measuring system (SS) corresponding to variant 1, wherein in the operating mode at least one comparison apparatus, in particular a differential amplifier (D7, D6, D8), compares two parameter values of the second analogue signal (S2a, S2b, S2c) with one another, in particular by establishing a difference, and generates a difference signal (d6, d7, d8) and, by comparison of the difference signal (d6, d7, d8) with a reference value (Ref6, Ref7, Ref8), generates a comparison result signal (v10, v11, v12), in particular by means of a comparator (C10, C11, C12) separate from the comparison apparatus.

Variant 6

Variant 6 relates to a proposed measuring system corresponding to variants 2, 3, 4 or 5 or the following variants, which likewise generate comparison result signals or comparison results from a target-actual comparison, wherein the measuring system (SS) is designed, in the operating mode, to generate or not to generate an error message depending on at least one comparison result signal (v1, v2, v3, v4, v5, v6, v10, v11, v12, v13, v14, v15, v16, v17, v18, v19).

Variant 7

Variant 7 relates to a proposed measuring system (SS) corresponding to variant 6, wherein it comprises a control device (CTR), which assesses the comparison result signal (v1, v2, v3, v4, v5, v6, v10, v11, v12, v13, v14, v15, v16, v17, v18, v19) and generates the error message.

Variant 8

In variant 8 the measuring unit (TR) is an ultrasound transducer (TR), which transmits an ultrasound signal measurement as output signal (MS) into an ultrasound measuring channel as measuring channel (CN) and, as receive signal (ES), receives the ultrasound receive signal reflected at an object in the ultrasound measuring channel (CN). Alternatively, the measuring unit (TR) may comprise at least one active element for generating an acoustic, optical, electric, inductive, capacitive, electromagnetic IR or UV output signal (MS) as measurement signal and at least one sensor element for detecting a signal as receive signal in response to the output signal of the active element.

It is preferably provided that the measuring unit (TR) comprises an ultrasound transducer, a pair formed of at least an ultrasound transmitter and an ultrasound receiver, a camera, in particular a TOF camera, a pair formed of heating element and temperature sensor, a pair formed of optical transmitter and optical receiver, or at least one other pair formed of actuator and sensor, which are operatively connected to one another, an anemometer, a flowmeter, a measuring bridge, a pressure and/or acceleration sensor operating on the basis of a material deformation and having an active element for deforming the material for test purposes, a MEMS (micro-electrical-mechanical system), MEOS (micro-electrical-optical system), MEMOS (micro-electrical-mechanical-optical system), or the like.

Variant 9

In variant 9 the proposed measuring system (SS) comprises a control device (CTR) which in the first or second or third test mode compares the seventh response signal (S7) of the digital input circuit (DSI) with a predefined response and determines a comparison result.

Variant 10

In variant 10 the proposed measuring system (SS) comprises a control device (CTR) which in the first or second or third test mode controls the digital signal generating unit (DSO) by means of a control signal (S0) and which in the first or second or third test mode compares the seventh response signal (S7) of the digital input circuit (DSI) with a predefined response and determines a comparison result. These predefined responses and the control signal (S0) of the control device (CTR) are dependent on one another.

Variant 11

In variant 11 the proposed measuring system (SS) comprises a control device (CTR), which in the second test mode controls the analogue channel simulation unit (ACS) such that the way in which the analogue channel simulation unit (ACS) converts the second analogue signal (S2) into the third analogue test signal (S3t) is dependent on this control of the analogue channel simulation unit (ACS), and wherein the control device (CTR) in the second test mode compares the seventh response signal (S7) of the digital input circuit (DSI) with a predefined response and determines a comparison result. These predefined responses and the control of the analogue channel simulation unit (ACS) are dependent on one another.

Variant 12

In variant 12 the proposed measuring system (SS) comprises a control device (CTR) which in the third test mode controls the digital channel simulation unit (DCS) such that the way in which the digital channel simulation unit (DCS) converts the first digital signal (S1) into the fifth digital test signal (S5t) is dependent on this control of the digital channel simulation unit (DCS), and wherein the control device (CTR) in the third test mode compares the seventh response signal (S7) of the digital input circuit (DSI) with a predefined response and determines a comparison result. These predefined responses and the control of the digital channel simulation unit (DCS) are dependent on one another.

Variant 13

In the thirteenth variant of the proposed measuring system (SS) the digital input circuit (DSI) has an apparatus for measuring the vibration frequency of the sixth digital signal (S6) in the transmission phase (SP). This measurement of the vibration frequency enables the detection of various kinds of damage to the resonant circuit of an ultrasound transducer (TR) when this is used as measuring unit (TR).

Variant 14

In the fourteenth variant of the proposed measuring system (SS) the digital input circuit (DSI) has an apparatus for measuring the decay time of the sixth digital signal (S6) in the decay phase (AP). This measurement of the decay time enables the detection of various kinds of damage to the resonant circuit of an ultrasound transducer (TR) when this is used as measuring unit (TR). For the measurement of the decay time, an envelope signal from the signal level profile of the third analogue signal (S3) or the value profile of the sixth digital signal (S6) is preferably formed in the analogue input circuit (AS) or the digital input circuit. If this envelope signal in the decay phase (AP) undershoots a reference value for the value of this envelope signal, the decay of the measuring unit (TR) or of the ultrasound transducer (TR) can thus be declared as complete. Typically, the decay phase (AP) then also finishes. The time between the end of the transmission phase (SP) and the end, thus defined, of the decay is then the decay time.

Variant 15

In the fifteenth variant of the proposed measuring system (SS), which is based on the thirteenth and fourteenth variants, the digital input circuit (DSI) or a control device (CTR) compares the measured vibration frequency with a target value or a target value range for this vibration frequency and compares the measured decay time with a target value or a target value range for the decay time. The relevant sub-apparatus then concludes, as appropriate, that there is a short circuit of the measuring unit (TR), in particular of an "inner" ultrasound transducer (TRi), or that part of the measuring unit (TR) is not provided, in particular there is a non-connected "inner" ultrasound transducer (TRi), or a transmitter (UEB) not connected on the secondary side to a first sub-signal (S3a) of the third analogue signal (S3), or another general error. This occurs if the determined vibration frequency is higher than the target value of the vibration frequency or has a value above the target value range of the vibration frequency and if the determined decay time is shorter than the target value of the decay time or has a value below the target value range of the decay time. The digital input circuit (DSI) or the control device (CTR) then generate an error message.

Variant 16

In the sixteenth variant of the proposed measuring system (SS), which is based on the thirteenth and fourteenth variants, the digital input circuit (DSI) or the control device (CTR) compares the measured decay time with a target value or a target value range for this decay time and concludes, as appropriate, that there is part of the measuring unit (TR) not provided, in particular that there is a non-connected "inner" ultrasound transducer (TRi), or that there is an error. This occurs if the determined decay time is shorter than the target value of the decay time or has a value below the target value range of the decay time. In this case, the digital input circuit (DSI) or a control device (CTR) generates an error message.

Variant 17

In the seventeenth variant of the proposed measuring system (SS) the measuring system (SS) has an apparatus for determining the amplitude value of a straight signal component (A2c_b) in a second signal (S2) or a sub-signal (S2c) of the second signal (S2) and has an apparatus for determining the amplitude value of a non-straight signal component (A2c_a) in a second signal (S2) or a sub-signal (S2c) of the second signal (S2).

A comparison apparatus (arctan, C18), which is part of the measuring system (SS), is provided to compare the amplitude value (s3b) of the straight signal component with a threshold value (A2c_b) for this straight amplitude value (s3b) and to generate a corresponding comparison result signal (v18) for the straight signal component (s3b).

A further comparison apparatus, which is part of the measuring system (SS), is provided to compare the amplitude value (s3a) of the non-straight signal component (A2c_a) with a threshold value for this non-straight amplitude value and to generate a corresponding comparison result signal for the non-straight signal component. A sub-apparatus of the measuring system (SS) then generates an error message or outputs an error signal if the corresponding comparison result signal for the non-straight signal component and the corresponding comparison result signal for the straight signal component do not correspond to an allowed value combination.

The terms "straight signal component" and "non-straight signal component" will be defined hereinafter on the basis of the profile of the third sub-signal (S2c). The profile of the third sub-signal (S2c) is shown by way of example in FIG. 51. The third sub-signal (S2c) has a basic frequency and an associated phase position. A "straight signal component" of the sub-signal (S2c) has the same basic frequency and the same phase position as the sub-signal (S2c). A "non-straight signal component" of the sub-signal (S2c) by contrast has the same basic frequency and a phase position shifted through 90° as compared to the sub-signal (S2c). If, for example, the sub-signal (S2c) has a cosinusoidal profile, a "straight signal part" of this sub-signal (S2c) thus also has a cosinusoidal profile, whereas a "non-straight signal component" has a sinusoidal profile.

Variant 18

In the eighteenth variant of the proposed measuring system (SS) the second analogue signal (S2) comprises at least one first sub-signal (S2a) and at least one second sub-signal (S2b). The measuring system (SS) is formed by a symmetrisation of the measuring unit (TR) or of the ultrasound transducer (TR) and, as applicable, of the provided transmitter (UEB), such that the first sub-signal (S2a) of the second analogue signal (S2) and the second sub-signal (S2b) of the second analogue signal (S2), in the error-free case, are identical in respect of the temporal profile apart from a phase shift of 180°. The phase shift may deviate from 180° by up to ±10°. Smaller deviations, however, are preferred. The measuring system in this eighteenth variant comprises a sub-apparatus which is provided to measure the similarity of the first sub-signal (S2a) of the second analogue signal (S2) and the second sub-signal (S2b) of the second analogue signal (S2) and to determine a measured value for this similarity. A phase compensation is carried out prior to the comparison. To this end, one of the two signals is preferably delayed through 180° by suitable buffering in the control device (CTR) or the digital input circuit (DSI). It is now proposed in this variant that the measuring system (SS) comprises a comparison device which compares this measured value for the similarity with a reference value and generates an error signal if the value, thus determined, of the similarity lies below the reference value for this similarity. This measuring method of this eighteenth variant has the advantage that the smallest disturbances to the symmetry of an ultrasound transducer circuits may be identified.

Variant 19

In the nineteenth variant of the proposed measuring system (SS) the measuring system (SS) may be configured such that in the first test mode the value of the impedance of the measuring unit (TR) or of the impedance of an inner ultrasound transducer (TRi), which is part of the ultrasound transducer (TR) as measuring unit, may be determined. This impedance value is preferably determined in the analogue input circuit (AS) or in the digital input circuit (DSI). The digital input circuit (DSI) or the system control device (CTR) compare the determined impedance value with an impedance target value or provides such a message if the detected impedance value deviates from the impedance target value or lies outside the impedance target value range. This occurs likewise preferably in the control device (CTR) or the digital input circuit (DSI).

Variant 20

In the twentieth variant of the proposed measuring system (SS) the measuring system (SS) may be configured such that in the operating mode the value profile and/or the values of the seventh response signal (S7), in particular in the form of measurement results and measured values, are checked for plausibility, in particular by the comparison with target values and target value ranges, by the digital input circuit (DSI) and/or the control device (CTR). For example, during the construction of the proposed measuring system (SS), it may be taken into consideration that certain measured values are not physically possible under certain conditions. The occurrence of such measured values under these conditions may therefore be interpreted as an indication of an error. It may therefore be provided that the digital input circuit (DSI) and/or the control device (CTR) in this case generate or provide an error message.

Variant 21

In the twenty-first variant of the proposed measuring system (SS) the value profile and/or the values of the seventh response signal (S7), which in particular may be present in the form of measurement results and measured values, are/is forwarded in the operating mode by the control device (CTR) and/or the digital input circuit (DSI) only if the plausibility check of the value profile and/or the values of the seventh response signal (S7) was successful. If the plausibility check of the value profile and/or the values of the seventh response signal (S7) was not successful, an error message for example may be generated or provided by the control device (CTR) and/or the digital input circuit (DSI).

Variant 22

In the twenty-second variant of the proposed measuring system (SS) the digital input circuit (DSI) and/or the analogue input circuit (AS) are/is provided and designed to detect the constant component and/or the amplitude and/or the phase and/or other signal parameters of the third analogue signal (S3) at different signal frequencies of the first digital signal (S1) generated by the digital signal generating unit (DSO) or for different temporal signal profile patterns of the first digital signal (S1) generated by the digital signal generating unit (DSO). It goes without saying that in this case the digital signal generating unit (DSO) is able to generate different signal frequencies of the first digital signal (S1) and/or different temporal signal profile patterns of the first digital signal (S1). Frequency sweeps, phase jump signals, and phase-modulated signals, which may be generated by the digital signal generating unit (DSO), are particularly suitable.

Variant 23

In the twenty-third variant of the proposed measuring system (SS) a signal profile pattern of the first digital signal (S1), which is generated by the digital signal reducing unit (DSO), has a signal frequency and a phase jump within its profile.

Operating Method

It is proposed to operate the above-described apparatus and possibly its variants, as follows:

First, the third test mode is preferably assumed by the measuring system (SS), and at least one test case is simulated by generating a control signal (S0) corresponding to this test case by the control device (CTR), and the seventh response signal (S7) is detected by the control device (CTR), and the seventh response signal (S7) is compared with a predefined pattern of the seventh response signal (S7). This is based on predefined patterns of the seventh response signal (S7) which correspond to the generated control signal (S0) of the control device (CTR). It is noted here that the digital signal generating unit (DSO), the digital channel simulation unit (DCS), and the digital input circuit (DSI) may be configured differently as appropriate. These configurations are preferably also provided by the control device (CTR). The control signal (S0) thereof is then dependent on these used configurations, which preferably are set by the control device (CTR) by means of corresponding control lines (not shown in the figures), and on the particular purpose of the test. Accordingly, the predefined pattern of the seventh response signal (S7) is then also dependent on the used control signal (S0), these configurations, which are preferably controlled by the control device (CTR), and the purpose of the test. An error is determined if the seventh response signal (S7) does not correspond exactly to the predefined pattern of the seventh response signal (S7). This determination is made preferably by the control device (CTR) and is signalled at a predefined point in a predefined manner. For example, a flag may be set by the control device (CTR) in the event of such an error. The control device (CTR), for this examination, compares the seventh response signal (S7) with the predefined pattern for the seventh response signal (S7). This occurs preferably by bit-wise examination. If no further measurements are necessary, the third test mode may then be left and another test mode or, in the error-free case, the operating mode may be assumed. In the error-free case the checking of all check cases in the third test mode particularly preferably follows the checking of all check cases (test cases) in the second test mode, since the digital logic of the digital part of the signal string is then assessed to be working correctly.

The checks in the second test mode therefore preferably follow the checks in the third test mode. However, the second test mode may also be assumed directly from the operating mode or the other test modes.

To this end, the second test mode is assumed by the measuring system (SS), and at least one test case is simulated by generation of a control signal (S0) corresponding to this test case by the control device (CTR) as stimulus for the subsequent signal string, and the seventh response signal (S7) is detected by the control device (CTR) and the seventh response signal (S7) is compared with a predefined pattern corridor of the seventh response signal (S7). In contrast to the third test mode, the reaction of the signal string, which now also comprises analogue circuit parts (DR, AS), may no longer be predicted exactly. Thus, a signal corridor (pattern corridor) must be predefined for the allowed profile of the allowed values of the seventh response signal (S7). The seventh response signal (S7) may be a one-dimensional signal, but also a multi-dimensional signal. In the multi-dimensional state space, regions must therefore be specified for each time step or each parameter of the seventh response signal (S7) to be checked, within which regions the value of the seventh response signal (S7) may move. Simple tolerance intervals, which may not be departed from, are particularly preferred for each parameter. The pattern corridor should preferably be a simple linear "tube". However, significantly more complex topologies are also conceivable for the allowed value/parameter combinations of the seventh response signal (S7). If a value/parameter combination of the seventh response signal (S7) departs from the allowed pattern corridor, the control device (CTR) may determine and signal an error. This occurs if the seventh response signal (S7) does not lie within the predefined pattern corridor of the seventh response signal (S7). As soon as all check cases (test cases) have been processed, the second test mode is preferably left.

In the error-free case the checking of all check cases (test cases) in the first test mode particularly preferably follows the checking of all check cases in the third and second test mode, since the digital logic of the digital part of the signal string and the analogue circuit parts of the signal string are then assessed to be working correctly.

The checks in the first test mode thus preferably follow the checks in the second test mode. The first test mode, however, may also be assumed directly from the operating mode or the other test modes.

To this end, the first test mode is assumed by the measuring system (SS), and at least one test case is simulated by generation of a control signal (S0) corresponding to this test case by the control device (CTR), and the seventh response signal (S7) is detected by the control device (CTR), and the seventh response signal (S7) is compared with a predefined pattern corridor of the seventh response signal (S7). In this test case it is particularly important that further parameters of the measuring unit (TR) are preferably measured. In this regard, the generation of the control signal (S0) preferably relates to the generation of suitable stimuli for the measurement of the measuring unit (TR), that is to say of the ultrasound transducer (TR), and the transfer of the determined measured values for the parameters of the measuring unit (TR), that is to say of the ultrasound transducer (TR), in the form of a seventh response signal (S7) to the control device (CTR). The control device (CTR) preferably determines an error if the seventh response signal (S7) does not lie within a predefined pattern corridor of the seventh response signal (S7). For example, this is the case if the impedance of the exemplary ultrasound transducer does not lie within a predefined value range or if there is an asymmetry when symmetry is expected. To this end, the control device (CTR) and/or the digital input circuit (DSI) typically also assess comparison result signals of comparison assemblies.

In the error-free case, the checking of all check cases of the third, second and first test modes is particularly preferably followed by a return to the operating mode, since the digital logic of the digital part of the signal string as well as the analogue circuit parts of the signal string and the measuring unit, that is to say for example the ultrasound transducer (TR), are assessed to be working correctly. This may also be determined by the control device (CTR) and may be signalled as appropriate.

The checks in the third test mode are preferably thus followed by the entering of the operating mode. However, the operating mode may also be assumed directly from all test modes.

The monitoring of amplitude levels, differences of such amplitude levels with and without phase shifts, and the monitoring of whether there is an asymmetry where symmetry is expected may also occur in the operating mode. To this end the control device (CTR) and/or the digital input circuit (DSI) typically also assess comparison result signals of corresponding comparison assemblies, also during normal operation in the operating mode.

In accordance with the disclosure a self-testing ultrasound sensor system (SS) which comprises an "inner" ultrasound transducer (TRi), a transmitter (UEB) and a transducer resistor ($R_{TR}$), which may be part of the "inner" ultrasound transducer (TRi), and with a transducer capacitor ($C_{TR}$) which may be part of the "inner" ultrasound transducer (TRi) is also proposed. A first sub-signal (S2a) of the second analogue signal (S2) and a second sub-signal (S2b) of the second analogue signal (S2) and a first sub-signal (S3a) of the third analogue signal (S3) and a second sub-signal (S3b) of the third analogue signal (S3) are the electrical minimum nodes of this proposed sub-system. The temporal operation of the ultrasound measuring system (SS) then typically comprises at least the transmission phase (SP). The first sub-signal (S2a) of the second analogue signal (S2) is connected to a first primary-side connection of the transmitter (UEB). The second sub-signal (S2b) of the second analogue signal (S2) is connected to a second primary-side connection of the transmitter (UEB). The first sub-signal (S3a) of the third analogue signal (S3) is connected to a first secondary-side connection of the transmitter (UEB) and a first connection of the transducer resistor ($R_{TR}$) and to a first connection of the transducer capacitor ($C_{TR}$) and to a first connection of the inner ultrasound transducer (TRi). The second sub-signal (S3b) of the third analogue signal (S3) is connected to a second secondary-side connection of the transmitter (UEB) and a second connection of the transducer resistor ($R_{TR}$) and to a second connection of the transducer capacitor ($C_{TR}$) and to a second connection of the inner ultrasound transducer (TRi). The topology of the circuit network formed of inner ultrasound transducer (TRi) and transducer resistor ($R_{TR}$) and transducer capacitor ($C_{TR}$) and transmitter (UEB) and the characteristic values of these components and control thereof are selected such that, with normal operation of a transmission phase (SP), the first sub-signal (S2a) of the second analogue signal (S2) corresponds to a second sub-signal (S2b), phase-shifted through 180° (in particular with an allowed deviation of ±10%), of the second analogue signal (S2) with an amplitude deviation of less than 10%, and such that, with normal operation of a transmission phase (SP), the first sub-signal (S3a) of the third analogue signal (S3) corresponds to a second sub-signal (S2b), phase shifted through 180° (in particular with an allowed deviation of ±10%), of the second analogue signal (S2) with an amplitude deviation of less than 10%. At least these sub-signals (S2a, S2b, S3a, S3b) have a common periodicity with the period T in the transmission phase (SP). The ultrasound sensor apparatus (SS) comprises at least one coefficient-monitoring sub-apparatus (KUE). The coefficient-monitoring sub-apparatus (KUE) analyses at least one sub-signal, specifically the signal to be analysed (ZA), which is selected from the sub-signals (S2a, S2b, S3a, S3b), for distortions and forms an associated comparison result signal (v15, v16, v17, v18, v19) (the comparison result signal v_X).

An example of the coefficient-monitoring sub-apparatus (KU) comprises a first sub-apparatus (M1, s1a, F1, s2a, S&H_Ca) of the coefficient-monitoring sub-apparatus (KU), which first sub-apparatus forms a scalar product in the form of a first internal coefficient signal (s3a) formed of a first analysis signal (A_a) and the signal to be analysed (ZA), and a second sub-apparatus (M2, s1b, F2, s2b, S&H_Cb), which forms a scalar product in the form of a second internal coefficient signal (s3b) formed of a second analysis signal (A_b) and the signal to be analysed (ZA). The first analysis signal (A_a) and the second analysis signal (A_b) are different from one another. The ratio of the determined value of the first internal coefficient signal (s3a) to the determined value of the second internal coefficient signal (s3b) for the normal operation in the transmission phase (SP) differs from the ratio of the determined value of the first internal coefficient signal (s3a) to the determined value of the second internal coefficient signal (s3b) for the operation in at least one error case in the transmission phase (SP). The difference between the two coefficient signals (s3a, s3b) is used to generate the comparison result signal (v_X).

Such an ultrasound sensor measuring system makes it possible to test the system efficiently and effectively during normal operation. The advantages, however, are not limited to this.

BRIEF DESCRIPTION OF THE FIGURES

The disclosure will be explained in greater detail hereinafter on the basis of various examples and with reference to the drawings, in which.

DESCRIPTION

Figure 1:
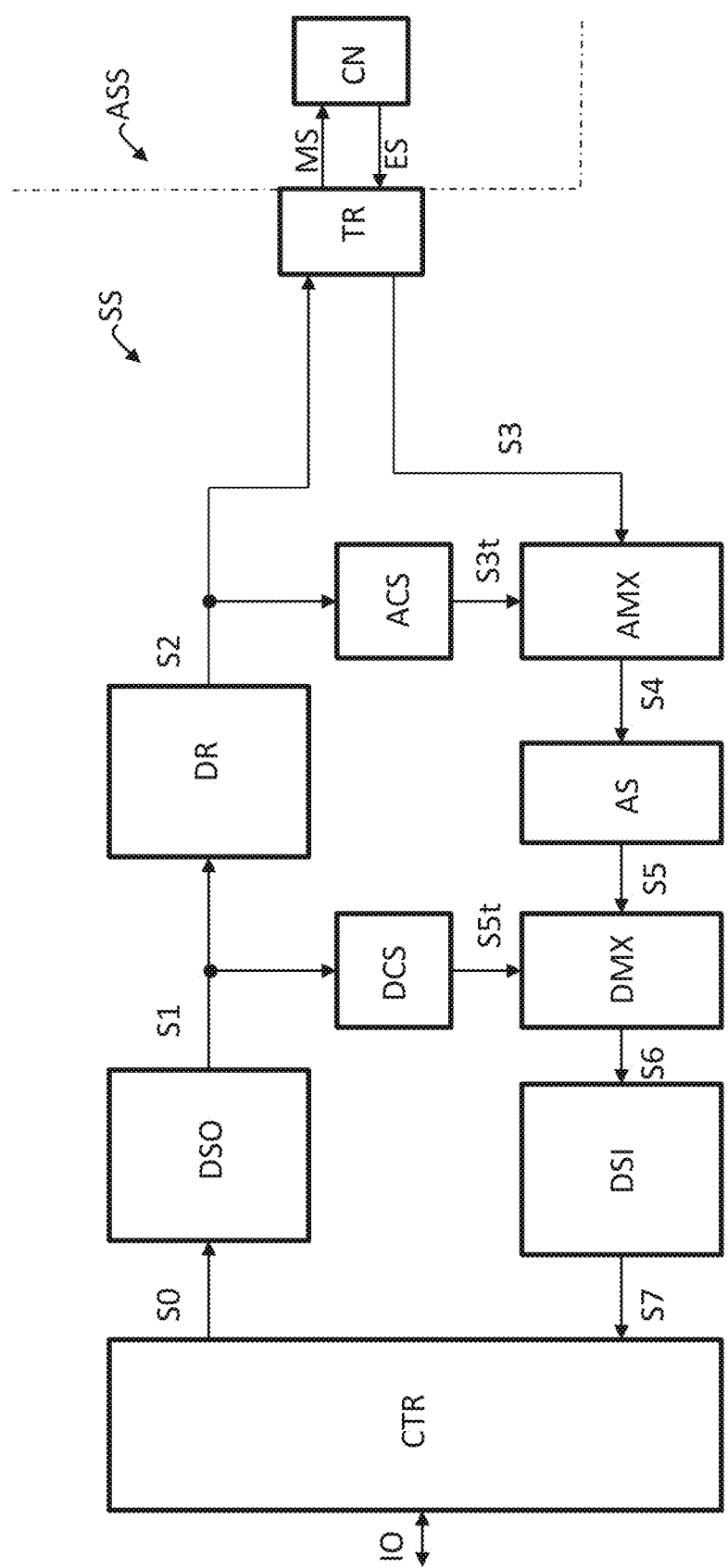
FIG. 1 shows, in schematically simplified form, the basic structure of the proposed self-testing measuring system (SS)

FIG. 1 schematically shows, in a simplified manner, an exemplary basic structure of the proposed self-testing measuring system (SS) on the basis of an exemplary ultrasound sensor system. The control device (CTR) receives data and/or programs and/or commands via a data interface (IO) from other, typically higher-ranking computers. These higher-ranking computers may be, for example a control unit of a motor vehicle, which controls and monitors the proposed measuring system (SS). The control device (CTR) sends determined measured values, error messages and test results from the self-test of the measuring system (SS) to this higher-ranking computer. The control device (CTR) controls the digital signal generating unit (DSO) via a control signal (S0). In addition, the control device (CTR) configures preferably all other configurable sub-apparatuses of the measuring system (SS). The corresponding control lines and signals are not shown in FIG. 1 or the corresponding following figures, for reasons of improved clarity.

The control signal (S0) is preferably a data bus formed of a plurality of digital signals.

Depending on the previous history and the control signal (S0), the digital signal generating unit (DSO) generates stimuli as well as useful, measurement and test signals for the subsequent signal path string formed of the subsequent sub-apparatuses of the measuring system (SS) in the signal path. It is thus proposed to design the digital signal generating unit (DSO) such that it can be used as a measurement signal generator, and as a test signal generator, and as a test pattern generator. The digital signal generating unit (DSO) generates the stimuli and useful, measurement and test signals for the following signal path string as first digital signal (S1). The first digital signal (S1) as preferably a digital data bus. It may be that in some modes of the allowed modes of the measuring system (SS), some lines of the first digital signal (S1) do not show any activity, but are active in other allowed modes of the measuring system (SS).

The driver stage (DR) generates the second analogue signal (S2) depending on the first digital signal (S1). The driver stage (DR) thus performs a conversion of the first digital signal (S1) into an analogue second signal (S2). The second analogue signal (S2) may consist of a plurality of second analogue sub-signals (S2a, S2b, S2c). Here as well, not all sub-signals of the second analogue signal (S2) are necessarily active in all modes of the measuring system (SS). In the example disclosed here, the first sub-signal (S2a) of the second analogue signal (S2) is temporally phase-shifted by 180° relative to the second sub-signal (S2b) of the second analogue signal (S2). This, however, is not an inversion. The third sub-signal (S2c) of the second analogue signal (S2) is the sum of the first sub-signal (S2a) and the second sub-signal (S2b) of the second analogue signal (S2) in said example.

The conversion does not necessarily have to be only a digital-to-analogue conversion of a digital value which has been transmitted by means of the first digital signal (S1) to the driver stage (DR). Rather, the driver stage may also comprise more complex, possibly fed-back circuits, which change their active topology depending on the mode of the measuring system (SS) and possibly on the current time within a transmission/receive sequence. For example, it is possible to divide such a transmission/receive sequence for an ultrasound sensor system as exemplary measuring system (SS) into three phases. In the first phase of the exemplary transmission sequence (ultrasound sequence), referred to hereinafter as the transmission phase (SP), the exemplary ultrasound transducer (TR) is excited to mechanical vibration and therefore to transmission of an ultrasound pulse as output signal (MS) in the exemplary ultrasound measuring channel (CN). In this first phase, that is to say the transmission phase, the driver stage (DR) applies a measurement stimulus, corresponding to the ultrasound transmission frequency, to the ultrasound transducer (TR). The driver stage (DR) then transports energy into the ultrasound transducer (TR).

In a second, temporally subsequent phase, that is to say the decay phase (AP), the driver stage (DR) applies a measurement stimulus, which is directed oppositely to the vibration frequency of the still vibrating ultrasound transducer, to the ultrasound transducer (TR). The driver stage (DR) then removes energy from the ultrasound transducer (TR). In this phase the ultrasound transducer (TR) emits an output signal (MS) into the ultrasound measuring channel (CN) in the outer region (ASS) outside the measuring system (SS) with decreasing emission amplitude. There are typically one or more objects situated in the ultrasound channel (CN) in the outer region (ASS) outside the measuring system (SS), which objects typically generated a heavily damped, delayed and distorted echo of the ultrasound measuring signal. This will be referred to hereinafter as the ultrasound receive signal (ES).

In the third phase of the receive phase (EP), the ultrasound transducer (TR) is not driven by the driver stage (DR). The driver stage (DR) does not remove any energy from the ultrasound transducer (TR), but also does not transport any energy into the ultrasound transducer (TR). In this phase, that is to say the receive phase (EP), the ultrasound transducer (TR) may receive an ultrasound echo very well as receive signal (ultrasound receive signal) (ES). The ultrasound transducer (TR) is set into vibration by the ultrasound receive signal (ES) and on account of its piezoelectric properties generates the third analogue signal (S3). The third analogue signal (S3) may consist of a number of analogue sub-signals (S3a, S3b).

An analogue multiplexer (AMX) connects through the third analogue signal (S3) as fourth analogue signal (S4) in a predefined mode of the measuring system (SS). The signal that is connected through by the analogue multiplexer (AMX) is dependent on the mode of the measuring system (SS). The analogue multiplexer (AMX) is typically controlled by the control device (CTR), which preferably controls and monitors the mode and the configuration of the measuring system (SS). Here as well, not all sub-signals of the fourth analogue signal (S4) are necessarily active in all modes of the measuring system (SS).

The analogue input circuit (AS) receives the fourth analogue signal (S4). This receipt may be dependent on the control signal (S0) and the mode of the measuring system (SS) as well as further factors. The exact way in which the receipt by the analogue input circuit (AS) occurs is preferably specified by the control device (CTR) by means of corresponding control signals (not shown). The receive methodology in the analogue input circuit (AS) preferably correlates with the used stimulus or measurement or test signal generated by the digital signal generating unit (DSO) and the driver stage (DR), and with the configuration of the measuring system (SS) preferably set by the control device (CTR). For example, it is conceivable to adapt analogue filters, levels, amplifications, etc. to the predefined stimuli and useful, measurement and test signals case-specifically. This adaptation is preferably monitored by the control device (CTR). The analogue input circuit (AS) generates the fifth digital signal (S5) depending on the fourth analogue signal (S4). The analogue input circuit (AS) thus preferably also has the function of an analogue-to-digital converter (ADC). The fifth digital signal (S5) may comprise a plurality of digital sub-signals. Here as well, not all sub-signals of the fifth digital signal (S5) are necessarily active in all modes of the measuring system.

A digital multiplexer (DMX) conducts the fifth digital signal (S5) as sixth digital signal (S6) in a predefined mode of the measuring system (SS). The signal that is connected through by the digital multiplexer (DMX) as sixth signal (S6) is again dependent on the mode of the measuring system (SS). The digital multiplexer (DMX) is typically controlled by the control device (CTR), which preferably controls and monitors the mode of the measuring system (SS) and configuration thereof. Here as well, not all sub-signals of the sixth digital signal (S6) are necessarily active in all modes of the measuring system (SS).

The digital input circuit (DSI) receives the sixth digital signal (S6) depending on the mode of the measuring system (SS). The exact way in which the signal is received by the digital input circuit (DSI) this is preferably predefined by the control device (CTR) by means of corresponding control signals (not shown). The receive methodology in the digital input circuit (DSI) preferably correlates with the used stimulus or measurement or test signal generated by the digital signal generating unit (DSO) and the driver stage (DR) and with the selected receive methodology in the analogue input circuit (AS) and the configuration of the measuring system (SS). For example, it is conceivable to adapt digital filters, in particular matched filters, and digital signal processing methods to the predefined stimuli and useful, measurement and test signals and to adapt the selected receive methodology in the analogue input circuit (AS) case-specifically. This adaptation is preferably monitored by the control device (CTR). The digital input circuit (DSI) thus generates the seventh digital signal (S7), which should already comprise the measurement, test or other results, depending on the sixth digital signal (S6). Another result may also be, for example, an error message at the control device (CTR). The control device (CTR), however, may also compare measurement and test results with target values or tolerance intervals for these target values and generate error messages as appropriate. The digital input circuit (DSI), in predetermined modes of the measuring system, therefore not only has the function of signal processing, but may also have the function of a test apparatus for the examination that the signal processing string of the measuring system (SS) delivers a response to stimuli of the digital signal generating unit (DSO) corresponding to a predefined value or a predefined signal sequence with the known system configuration or does not deviate therefrom by more than a predefined amount. Here as well, not all sub-signals of the seventh digital signal (S7) are necessarily active in all modes of the measuring system.

In order to now be able to test the measuring system (SS), the proposed measuring system (SS) has two bypass paths in the signal path.

The first bypass signal path excludes the measuring unit (TR), that is to say the ultrasound transducer (TR), from the signal path. The electronics may thus test themselves. For this second test mode of the measuring system (SS) (the first test mode includes the measuring unit (TR), that is to say the ultrasound transducer (TR)), the second analogue signal (S2) is preferably tapped directly before the measuring unit (TR), that is to say the ultrasound transducer (TR), and by means of the analogue multiplexer (AMX) is switched into the analogue input circuit (AS) instead of the third analogue signal (S3). This, however, does not occur directly. There is generally an overmodulation of the input of the analogue input circuit (AS). The second analogue signal (S2), before the feed into the analogue input circuit (AS) as fourth analogue signal (S4), is therefore at least damped by the analogue multiplexer (AMX) in an additionally proposed analogue channel simulation unit (ACS). The output signal of the analogue channel simulation unit (ACS) is the third analogue test signal (S3t). In the second test mode of the measuring system (SS), the third analogue test signal (S3t) instead of the third analogue signal (S3) is fed by the analogue multiplexer (AMX) as fourth analogue signal (S4) to the analogue input circuit (AS). As analogue channel simulation unit (ACS), configurable signal model is preferably implemented as electronic analogue circuit which may simulate important configuration cases of the signal section over the ultrasound transducer (TR) and the ultrasound channel (CN). This has the advantage that the subsequent signal path, which naturally is not precisely defined, may be simulated on this basis, and the function of the digital and analogue circuit parts may be simulated by a simulated measuring unit (TR) or by a simulated ultrasound transducer (TR) and a simulated ultrasound measuring channel (CN) for important, predefined cases. The various cases to be simulated are produced, inter alia, by various configurations of the analogue channel simulation unit (ACS). For example, it is conceivable to enable various dampings in the analogue channel simulation unit (ACS), so as to be able to provide various dampings in the measuring channel (CN), that is to say the ultrasound transmission channel (CN). Different distances from objects in the ultrasound transmission channel (CN) may be simulated for example by correspondingly delayed signals by means of the digital signal generating unit (DSO). Further simulation targets are of course conceivable. The exact configuration of the analogue channel simulation unit (ACS) is preferably predefined by the control device (CTR) by means of signals (not shown) depending on the mode of the measuring system (SS) and the intended purpose. With regard to the measurements for tests in the second test mode of the measuring system (SS), the measurement results are associated with a specific uncertainty, since the analogue circuit parts on the one hand are provided with manufacturing fluctuations in respect of their parameters and on the other hand are exposed to fluctuating ambient parameters, for example an unpredictable operating temperature, which leads to fluctuations in the measurement results. Thus, in the second test mode, a target/actual comparison when assessing the signal response of the measuring system (SS) is preferably performed always with respect to a tolerance interval for characteristic values of the signal response, and not with respect to a precise individual value.

The second bypass excludes the analogue parts of the measuring system (SS) from the signal string. The digital electronics may thus test themselves. For this third test mode of the measuring system (SS), the first digital signal (S1) is preferably tapped directly before the driver stage (DR), that is to say the digital-to-analogue converter, and by means of the digital multiplexer (DMX) is switched into the digital input circuit (DSI) instead of the fifth digital signal (S5). This, however, here as well does not typically occur directly. Similarly to in the second test mode, the first digital signal (S1), before the feed into the digital input circuit (DSI) as sixth digital signal (S6), is suitably modified by the digital multiplexer (DMX) in an additionally proposed digital channel simulation unit (DCS). The output signal of the digital channel simulation unit (DCS) is the fifth digital test signal (S5t). In the third test mode of the measuring system (SS), the fifth digital test signal (S5t), instead of the fifth digital signal (S5), is fed as sixth digital signal (S6) to the digital input circuit (DSI) by the digital multiplexer (DMX). Here, however, it is expressly conceivable to copy the first digital signal (S1) in predetermined configurations of the measuring system (SS) in the third test mode by looping through the first digital signal (S1) by the digital channel simulation unit (DCS) as fifth digital test signal (S5t) to the sixth digital signal (S6). In this regard, the digital channel simulation unit (DSI) may also consist only of wire bridges—i.e. of a direct connection between first digital signal (S1) and fifth digital test signal (S5t). A configurable signal model as electronic digital circuit is preferably again implemented as digital channel simulation unit (DCS). and may simulate important configuration cases of the signal section that runs via the driver stage (DR), the ultrasound transducer (TR), the ultrasound channel (CH), and the analogue input circuit (AS) and the other auxiliary circuits. The exact configuration of the digital channel simulation unit (DCS) is predefined, preferably by the control device (CTR) by means of signals (not shown), depending on the mode of the measuring system (SS) and the intended purpose. This has the advantage that the subsequent signal path, which naturally is not precisely defined, again may be simulated on this basis, and the function of the digital circuit parts may be simulated EXACTLY by a simulated ultrasound transducer (TR) and a simulated ultrasound measuring channel (CN) and simulated analogue parts for important, predefined cases. The various cases to be simulated are produced here by various configurations of the digital channel simulation unit (DCS). For example, it is conceivable to simulate various defective and non-defective signal responses of the subsequent signal path and to examine the correct response of the digital input circuit. Further simulation objectives are of course conceivable. With regard to the measurements for tests in the third test mode of the measuring system, the measurement results are not associated with any uncertainty and are therefore exact. The digital circuit parts are relatively immune to said manufacturing fluctuations and said fluctuations of ambient parameters. In the third test mode a target/actual comparison when assessing the signal response of the measuring system is therefore performed always with respect to precise values.

The digital input circuit (DSI) signals the measurement and test results as well as any generated error messages at the control apparatus (CTR) by means of the seventh digital signal (S7), which may comprise a plurality of digital sub-signals.

Figure 2:
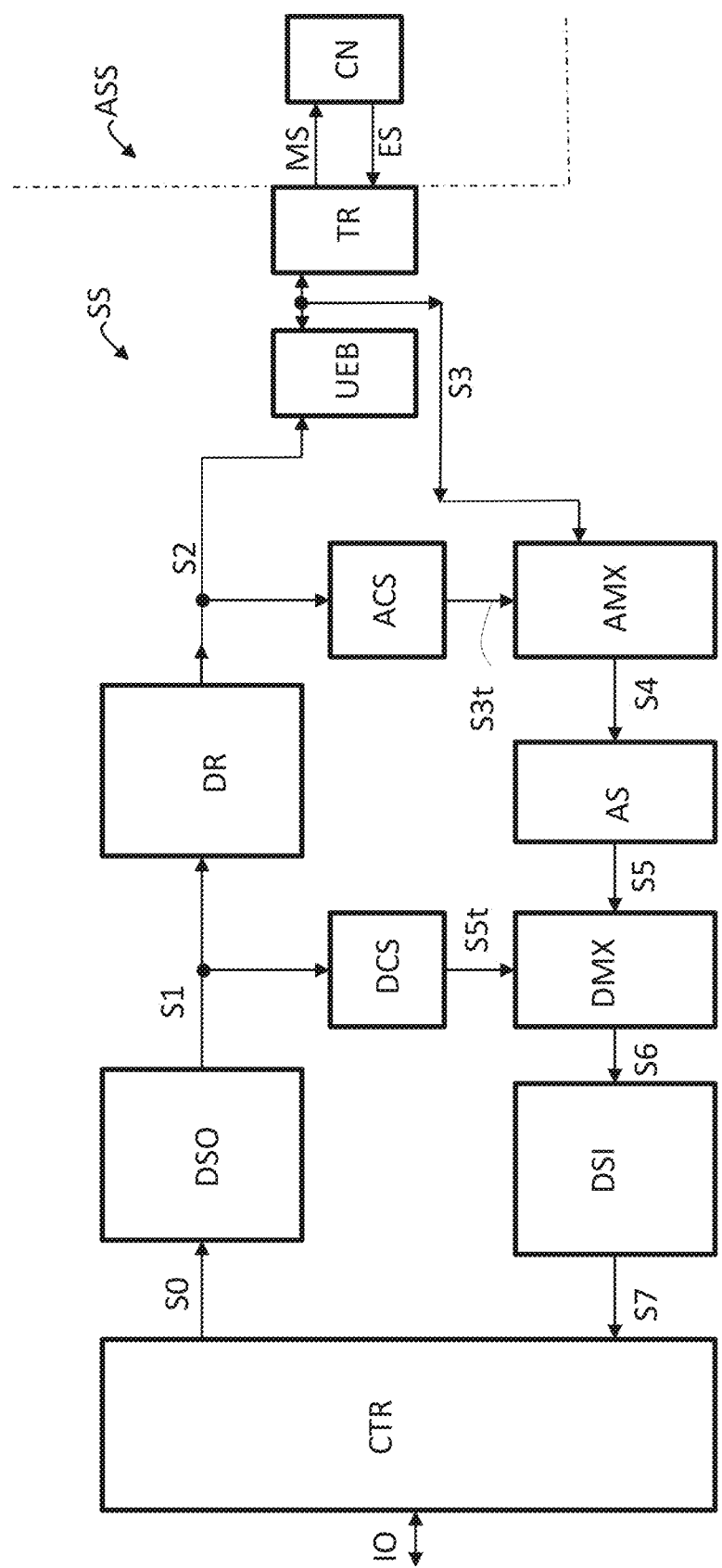
FIG. 2 corresponds to FIG. 1, wherein a transmitter (UEB) is inserted between the measuring unit (TR) and driver stage (DR)

FIG. 2 corresponds to FIG. 1, wherein a transmitter (UEB) has been inserted between the measuring unit (TR), that is to say the ultrasound measuring system, and the driver stage (DR). The third analogue signal (S3) in this example is removed on the secondary side of the transmitter (UEB), whereas the second analogue signal (S2) in this example is connected on the primary side of the transmitter (UEB). In the operating mode and in the first test mode, the cooperation of transmitter (UEB) and ultrasound transducer (TR) may be monitored and assessed by means of the analogue input circuit (AS) and the digital input circuit (DSI).

Figure 3:
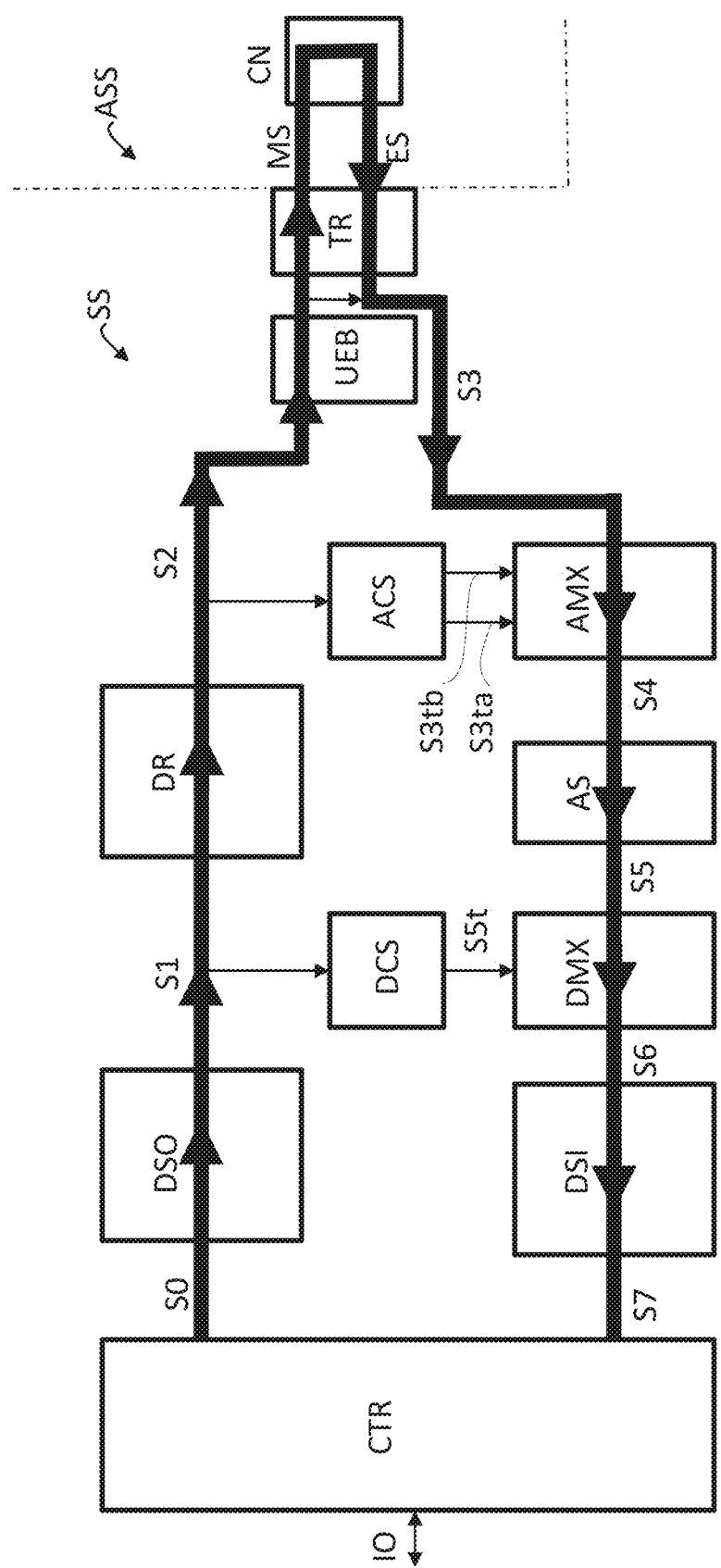
FIG. 3 corresponds to FIG. 2 with the active signal path in the operating mode and in the first test mode marked in bold.

FIG. 3 corresponds to FIG. 2 with the signal path active in the operating mode and in the first test mode marked in bold. The measured values of the ultrasound sensor system are obtained in the operating mode in this way, in accordance with the prior art. What is shown is therefore the signal path when the measuring system (SS) is not testing itself. This signal path is also selected in the first test mode. In this first test mode the ultrasound transducer (TR) is stimulated suitably, and the response of the ultrasound transducer (TR) is measured. To this end, the constant component, amplitude and phase of the third analogue signal (S3) for example may be analysed at different stimulation frequencies and with different stimulation patterns. For example, the response to a phase jump may be detected. The detection of the impedance of the ultrasound transducer (TR) is particularly advantageous, since this is also dependent on the properties of the ultrasound measuring channel. If, for example, the ultrasound transducer (TR) ices over, it's acoustic impedance thus changes, as does also its electrical impedance.

Figure 4:
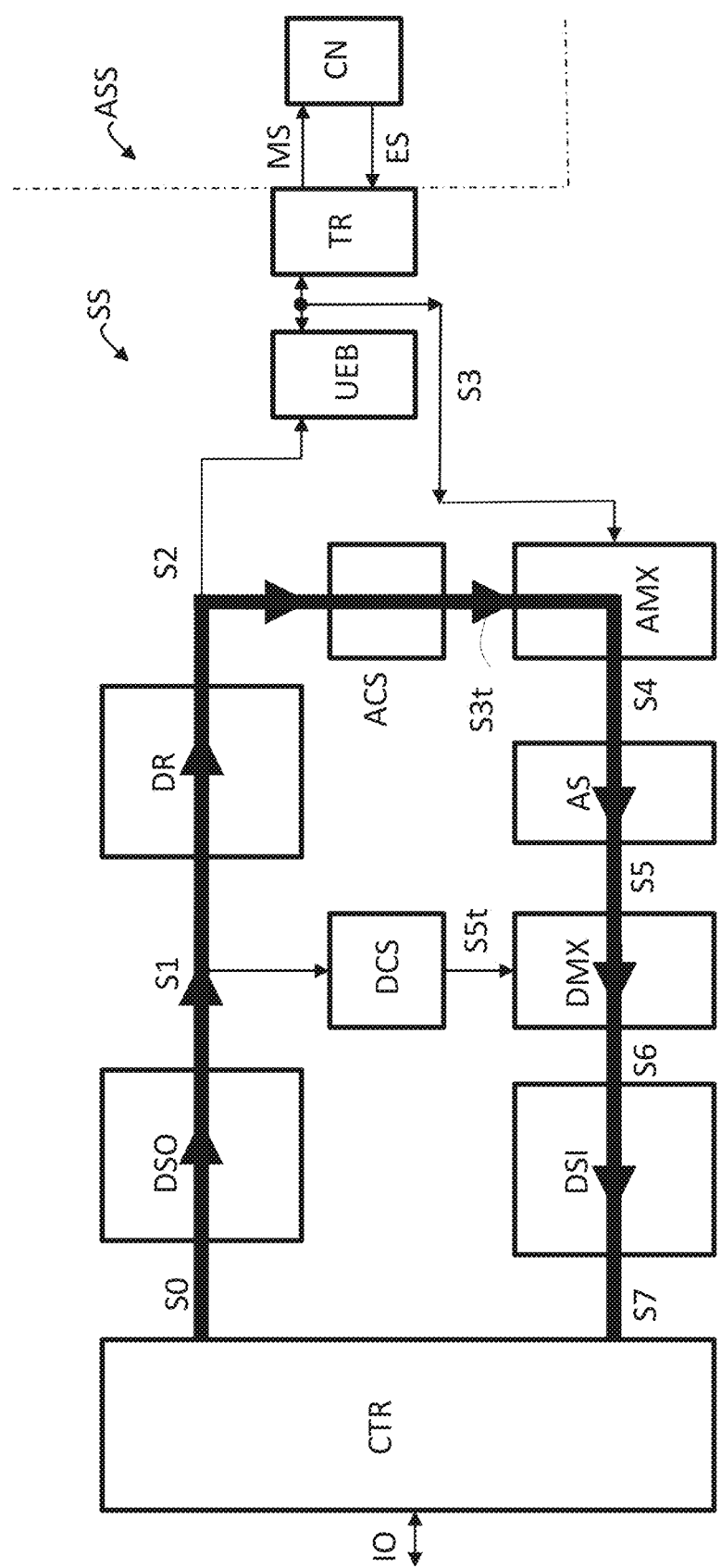
FIG. 4 corresponds to FIG. 2 with the active signal path in the second test mode marked in bold.

FIG. 4 corresponds to FIG. 2 with the signal path active in the second test mode shown in bold.

Figure 5:
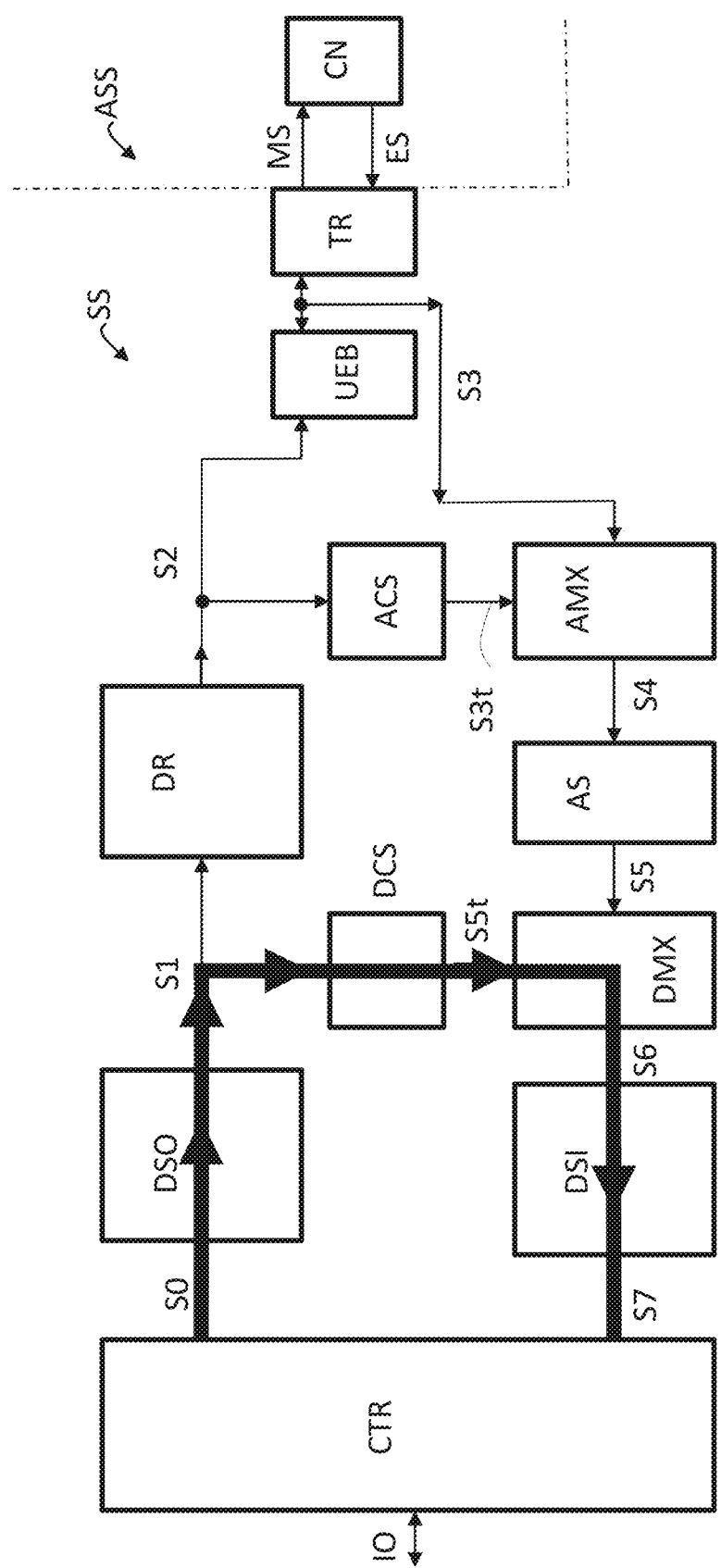
FIG. 5 corresponds to FIG. 2 with the active signal path in the third test mode marked in bold.

FIG. 5 corresponds to FIG. 2 with the signal path active in the third test mode shown in bold.

Figure 6:
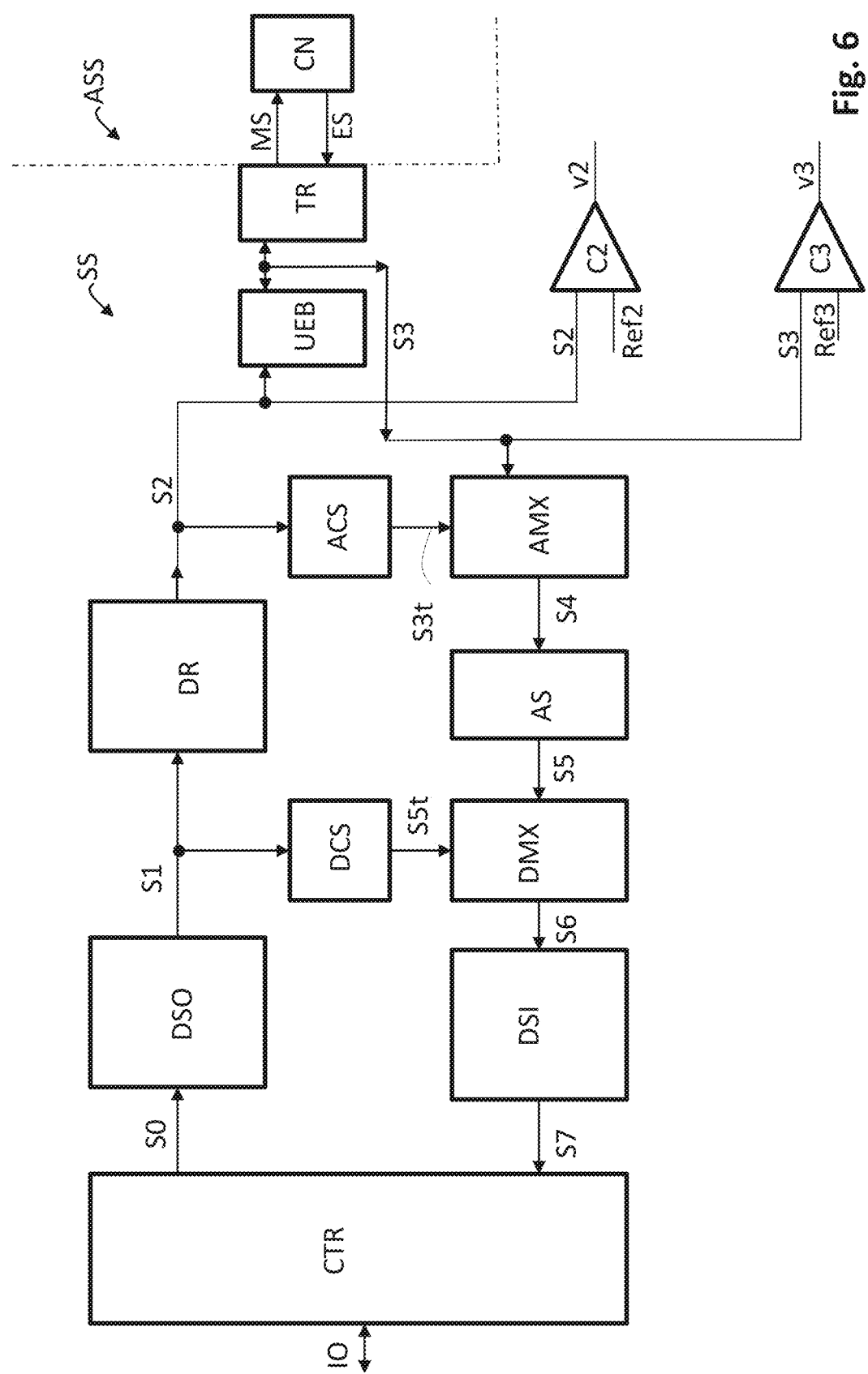
FIG. 6 corresponds to FIG. 2 with the difference that the second analogue signal (S2) is monitored during operation by means of a comparison unit in the form of a second comparator (C2), and the third analogue signal (S3) is monitored during operation by means of a comparison unit in the form of a third comparator (C3)

FIG. 6 corresponds to FIG. 2 with the difference that the second analogue signal (S2) is monitored during operation by means of a comparison unit in the form of a second comparator (C2) and the third analogue signal (S3) is monitored during operation by means of a comparison unit in the form of a third comparator (C3). This monitoring may be designed here such that the comparators (C2, C3) compare maximum values or minimum values or amounts with their respective reference values (Ref2, Ref3). The comparison of the value of the particular analogue signal (S2, S3) with the corresponding reference value (Ref2, Ref3) is particularly preferred. If this reference value (Ref2, Ref3) is overshot, the corresponding comparison result signal (v2, v3) is thus generated. This comparison result signal (v2, v) may be conducted for example directly to a superordinate unit or to a control device (CTR) or to the digital input circuit (DSI). However, assessment of the relevant comparison result signal (v2, v3) by the control device (CTR) is preferred. This preferably assesses the comparison result signals (v2, v3) and generates, as appropriate, suitable status messages or error messages, which it forwards via the data interface (IO) to the superordinate unit (for example a control unit in a motor vehicle). In the example of FIG. 6 a second comparator (C2) compares the value of the level of the second analogue signal (S2) with a second reference value (Ref2) and generates a second comparison result signal (v2) depending on this comparison. The polarity of the comparison result signal, which is preferably a digital signal, is irrelevant, since this is dependent only on the logical meaning. For example, it is expedient in the first phase of the transmission sequence, in which the ultrasound transducer (TR) receives energy from the driver stage (DR), to check a minimum amplitude of the second analogue signal (S2).

The momentary value of the second analogue signal (S2) must therefore overshoot the second reference value (Ref2). Since the second analogue signal (S2), however, is generally a pulsed signal, this overshoot is only expected during the pulse and therefore can only also be checked at that time. In this regard, a suitable synchronisation of the measured values must be provided. Conversely, a reference value must not be undershot at those times at which there is no pulse present over the second analogue signal (S2). It may therefore be expedient to provide, instead of a single second reference value (Ref2), a plurality of second reference values, in order to be able to check the correct control of the ultrasound transducer (TR) or of the transmitter (UEB) by the driver stage (TR). The time control of this check may be implemented either by a separate test apparatus or for example by the digital signal generating unit (DSO) or the control device (CTR).

The momentary value of the third analogue signal (S3) must therefore overshoot the third reference value (Ref3). Since the third analogue signal (S3), however, is generally a sinusoidal vibration, this overshoot is only expected during the maximum of the wave crests and therefore can only also be checked at that time. The third analogue signal (S3), however, may have an equivalent value. It is therefore also expedient here to check not only the maximum of the wave crests, but also the minima of the wave troughs. The momentary value of the third analogue signal (S3) therefore must not undershoot another third reference value (Ref3). In this regard, it may be expedient to provide two third comparators (C3) with two different third reference values (Ref3), in order to be able to check the correct functioning of the ultrasound transducer (TR) in cooperation with the transmitter (UEB) at predetermined times with correct phase position. The time control of this check may be implemented again either by a separate test apparatus or for example by the digital signal generating unit (DSO) or the control device (CTR).

Figure 7:
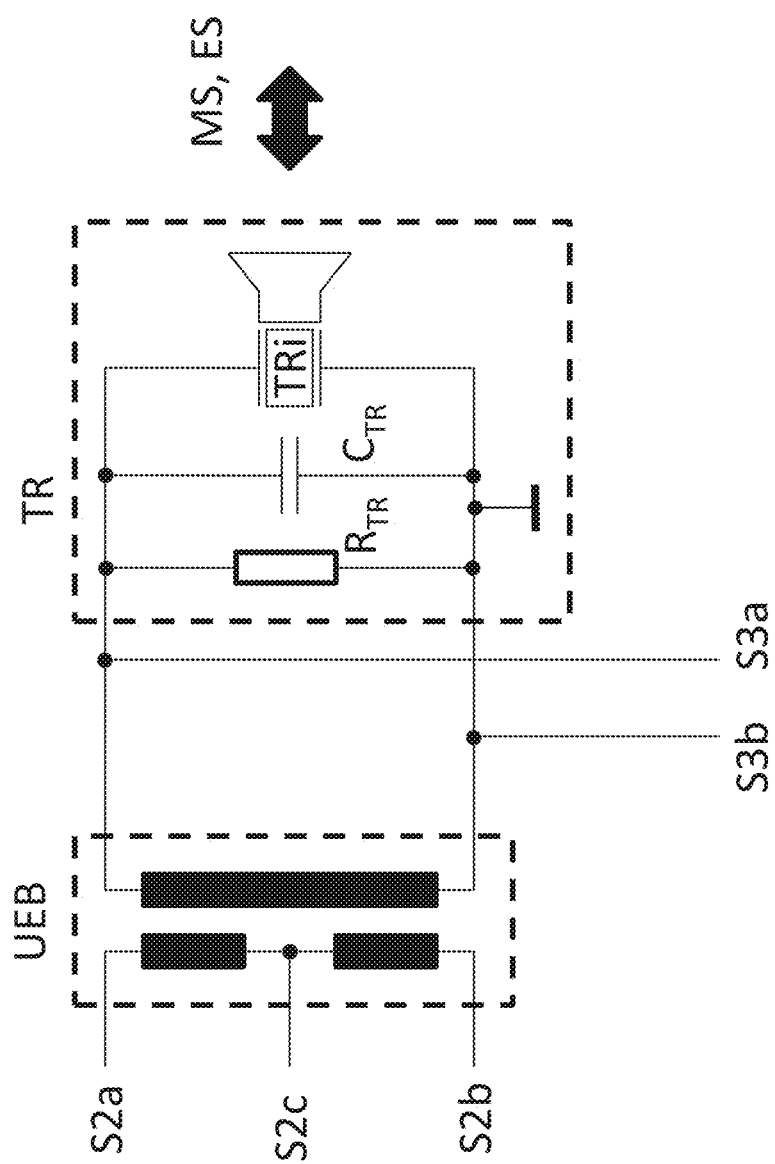
FIG. 7 shows schematically a possible example of the transmitter (UEB) with a three-phase primary side with three primary connections (S2a, S2b, S2c) and two secondary connections (S3a, S3b) on the secondary side and a connected ultrasound transducer (TR) on the secondary side.

FIG. 7 shows schematically a possible example of the transmitter (UEB) with a three-phase primary side with three primary connections (S2a, S2b, S2c) and two secondary connections (S3a, S3b) on the two-phase secondary side and a connected ultrasound transducer (TR) on the secondary side. The ultrasound transducer (TR) comprises, as sub-components, a transducer resistor ($R_{TR}$), a transducer capacitor ($C_{TR}$), and the inner ultrasound transducer (TRi), which comprises the piezoelectric vibration element and emits the output signal (MS) and received the ultrasound receive signal (ES). In this example the transmitter (UEB) on the primary side has a symmetrical centre tap, which is connected to the third sub-signal (S2c) of the second analogue signal (S2). One of the other primary-side connections of the transmitter (UEB) is connected to the first sub-signal (S2a) of the second analogue signal (S2). The third primary-side connection of the transmitter (UEB) is connected to the second sub-signal (S2b) of the second analogue signal (S2). On the secondary side, all components (UEB, $R_{TR}$, $C_{TR}$, TRi) are connected in parallel between the first sub-signal (S3a) of the third analogue signal (S3) and the second sub-signal (S3b) of the third analogue signal (S3). This results in a resonant circuit, the inherent vibration frequency and quality of which are dependent on the secondary-side elements and the primary-side control. The vibration properties of this resonant circuit change in the event of short circuits and line breaks and may be detected.

Figure 8:
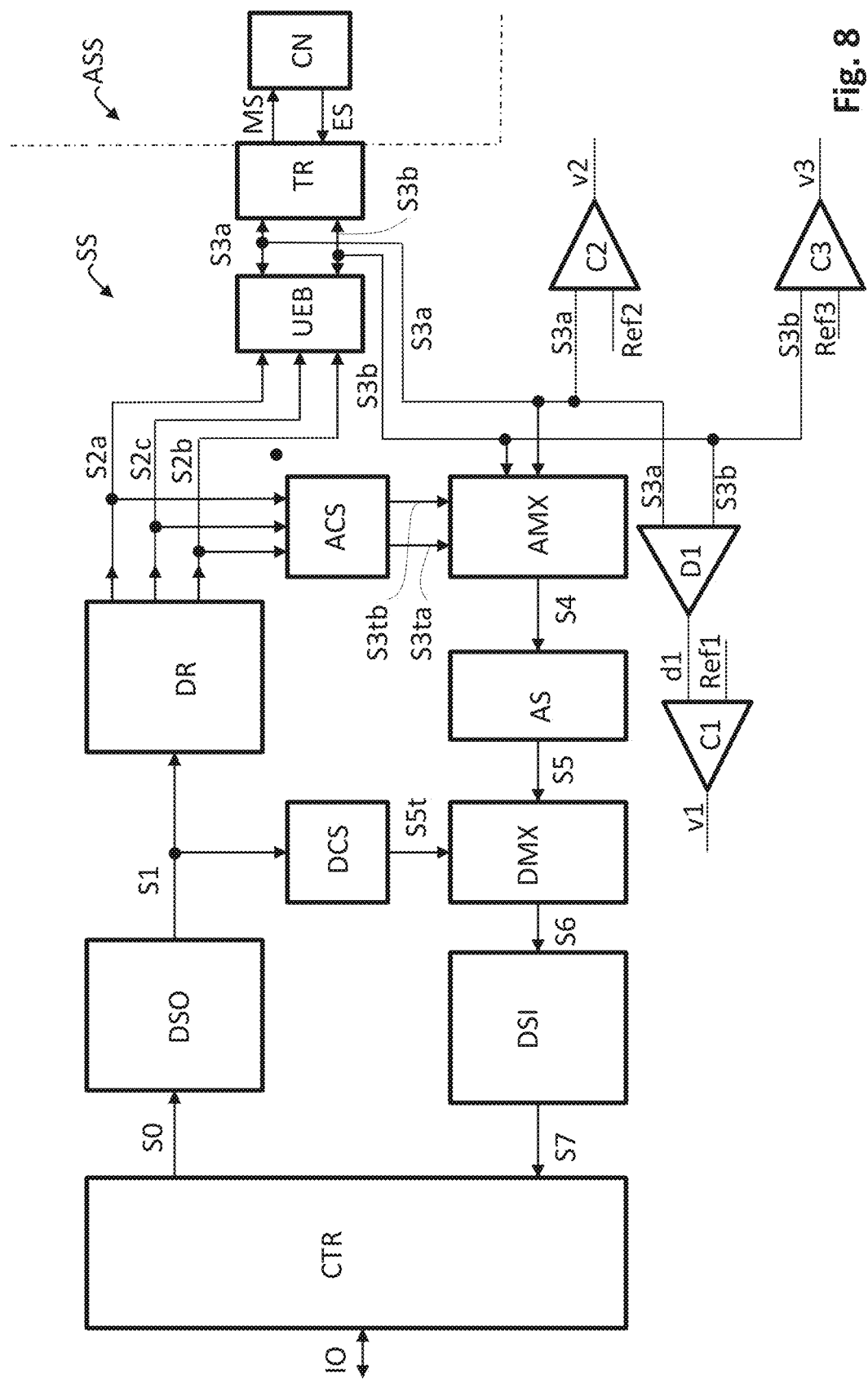
FIG. 8 corresponds to FIG. 2, with the difference that the second analogue signal (S2) is three-phase and the third analogue signal (S3) is two-phase, wherein the third analogue signal (S3) is monitored during operation by means of comparison units.

FIG. 8 corresponds to FIG. 2 with the difference that the second analogue signal (S2) is three-phase and the third analogue signal (S3) is two-phase with a first sub-signal (S3a) and a second sub-signal (S3b), wherein the third analogue signal (S3) is monitored during operation by means of comparison units. In this example the third analogue test signal (S3t) is therefore likewise two-phase, with a first sub-signal (S3ta) and a second sub-signal (S3tb). The analogue channel simulation unit (ACS) then generates the first sub-signal (S3ta) of the third analogue test signal (S3t) and the second sub-signal (S3tb) of the third analogue test signal (S3t) from the first sub-signal (S2a) of the second analogue signal (S2) and the second sub-signal (S2b) of the second analogue signal (S2) and the third sub-signal (S2c) of the second analogue signal (S2) when the measuring system (SS) is in the second test mode. The transmitter (UEB) and ultrasound transducer (TR) should correspond here to FIG. 7 and should be connected accordingly.

A first differential amplifier (D1) forms the first difference signal (d1) for example by establishing a difference from a parameter value of the first sub-signal (S3a) of the third analogue signal (S3) and from a parameter value of the second sub-signal (S3b) of the third analogue signal (S3). For example, this may be a simple establishment of a difference between the momentary values of the electrical potential of the first sub-signal (S3a) of the third analogue signal (S3) and the second sub-signal (S3b) of the third analogue signal (S3) with respect to a reference potential. In this case the first difference signal (d1) constitutes the value of the voltage difference between the momentary values of the electrical reference potential of the first sub-signal (S3a) of the third analogue signal (S3) and the second sub-signal (S3b) of the third analogue signal (S3) with respect to a reference potential. In other applications, instead of comparing electrical potential values with respect to a preferably common reference potential, current values may also be compared.

A first comparator (C1) compares the momentary value of the first difference signal (d1) with a first reference value (Ref1) and forms the first comparison result signal (v1). As before, it may be expedient to detect overshoots at certain times and to detect undershoots at other times within an ultrasound transmission sequence. It may therefore be expedient to provide a plurality of first reference values (Ref1) for these different times and moments in time, which first reference values should preferably be different. A separate first comparator (C1) may optionally be provided for each of these first reference values (Ref1), which comparators each generate an associated first comparison result signal (v1). The first comparison result signals (v1) are preferably assessed by the control device (CTR) or the digital input circuit (DSI). The moments in time at which the first comparison result signals (v1) are valid and should be assessed are preferably defined by the digital signal generating unit (DSO) or the control device (CTR).

A second comparator (C2) compares the momentary value of the first sub-signal (S3a) of the third analogue signal (S3) with a second reference value (Ref2) and forms the second comparison result signal (v2). As before, it may be expedient to detect overshoots at certain times and to detect undershoots at other times within an ultrasound transmission sequence. It may therefore be expedient to provide a plurality of second reference values (Ref2) for these different times and moments in time, which second reference values should preferably be different. A separate second comparator (C2) may optionally be provided for each of these second reference values (Ref2), which comparators each generate an associated second comparison result signal (v2). The second comparison result signals (v2) are preferably assessed by the control device (CTR) or the digital input circuit (DSI). The moments in time at which the second comparison result signals (v2) are valid and should be assessed are preferably defined by the digital signal generating unit (DSO) or the control device (CTR).

A third comparator (C3) compares the momentary value of the second sub-signal (S3b) of the third analogue signal (S3) with a third reference value (Ref3) and forms the third comparison result signal (v3). As before, it may be expedient to detect overshoots at certain times and to detect undershoots at other times, for example within an ultrasound transmission sequence. It may therefore be expedient to provide a plurality of third reference values (Ref3) for these different times and moments in time, which third reference values should preferably be different. A separate third comparator (C3) may optionally be provided for each of these third reference values (Ref3), which comparators each generate an associated third comparison result signal (v3). The third comparison result signals (v3) are preferably assessed by the control device (CTR) or the digital input circuit (DSI). The moments in time at which the third comparison result signals (v3) are valid and should be assessed are preferably defined by the digital signal generating unit (DSO) or the control device (CTR).

Figure 9:
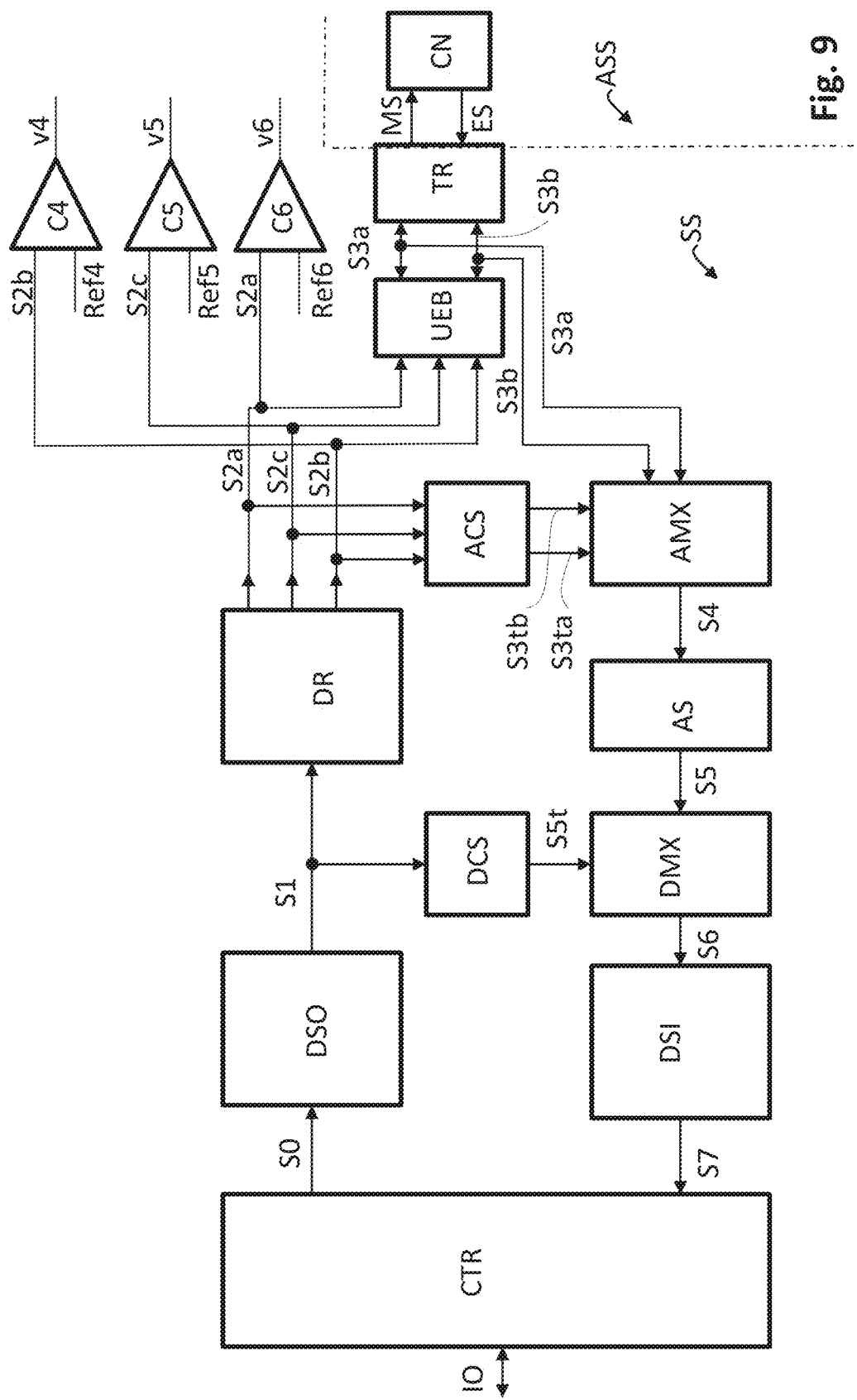
FIG. 9 corresponds to FIG. 2 with the difference that the second analogue signal (S2) is three-phase and is monitored during operation by means of comparison units in a star configuration, and the third analogue signal (S3) is two-phase.

FIG. 9 corresponds to FIG. 2, with the difference that the second analogue signal (S2) is three-phase and is monitored during operation by means of comparison units in a star configuration, and the third analogue signal (S3) is two-phase.

A fourth comparator (C4) compares the momentary value of the second sub-signal (S2b) with a fourth reference value (Ref4) and forms the fourth comparison result signal (v4). As before, it may be expedient to detect overshoots at certain times and to detect undershoots at other times, for example within an ultrasound transmission sequence. It may therefore be expedient to provide a plurality of fourth reference values (Ref4) for these different times and moments in time, which fourth reference values should preferably be different. A separate fourth comparator (C4) may optionally be provided for each of these fourth reference values (Ref4), which comparators each generate an associated fourth comparison result signal (v4). The fourth comparison result signals (v4) are preferably assessed by the control device (CTR) or the digital input circuit (DSI). The moments in time at which the fourth comparison result signals (v4) are valid and should be assessed are preferably defined by the digital signal generating unit (DSO) or the control device (CTR).

A fifth comparator (C5) compares the momentary value of the third sub-signal (S2c) of the second analogue signal (S2) with a fifth reference value (Ref5) and forms the fifth comparison result signal (v5). As before, it may be expedient to detect overshoots at certain times and to detect undershoots at other times, for example within an ultrasound transmission sequence. It may therefore be expedient to provide a plurality of fifth reference values (Ref5) for these different times and moments in time, which fifth reference values should preferably be different. A separate fifth comparator (C5) may optionally be provided for each of these fifth reference values (Ref5), which comparators each generate an associated fifth comparison result signal (v5). The fifth comparison result signals (v5) are preferably assessed by the control device (CTR) or the digital input circuit (DSI). The moments in time at which the fifth comparison result signals (v5) are valid and should be assessed are preferably defined by the digital signal generating unit (DSO) or the control device (CTR).

A sixth comparator (C6) compares the momentary value of the first sub-signal (S2a of the second analogue signal (S2)) with a sixth reference value (Ref6) and forms the sixth comparison result signal (v6). As before, it may be expedient to detect overshoots at certain times and to detect undershoots at other times, for example within an ultrasound transmission sequence. It may therefore be expedient to provide a plurality of sixth reference values (Ref6) for these different times and moments in time, which sixth reference values should preferably be different. A separate sixth comparator (C6) may optionally be provided for each of these sixth reference values (Ref6), which comparators each generate an associated sixth comparison result signal (v6). The sixth comparison result signals (v6) are preferably assessed by the control device (CTR) or the digital input circuit (DSI). The moments in time at which the sixth comparison result signals (v6) are valid and should be assessed are preferably defined by the digital signal generating unit (DSO) or the control device (CTR).

Figure 10:
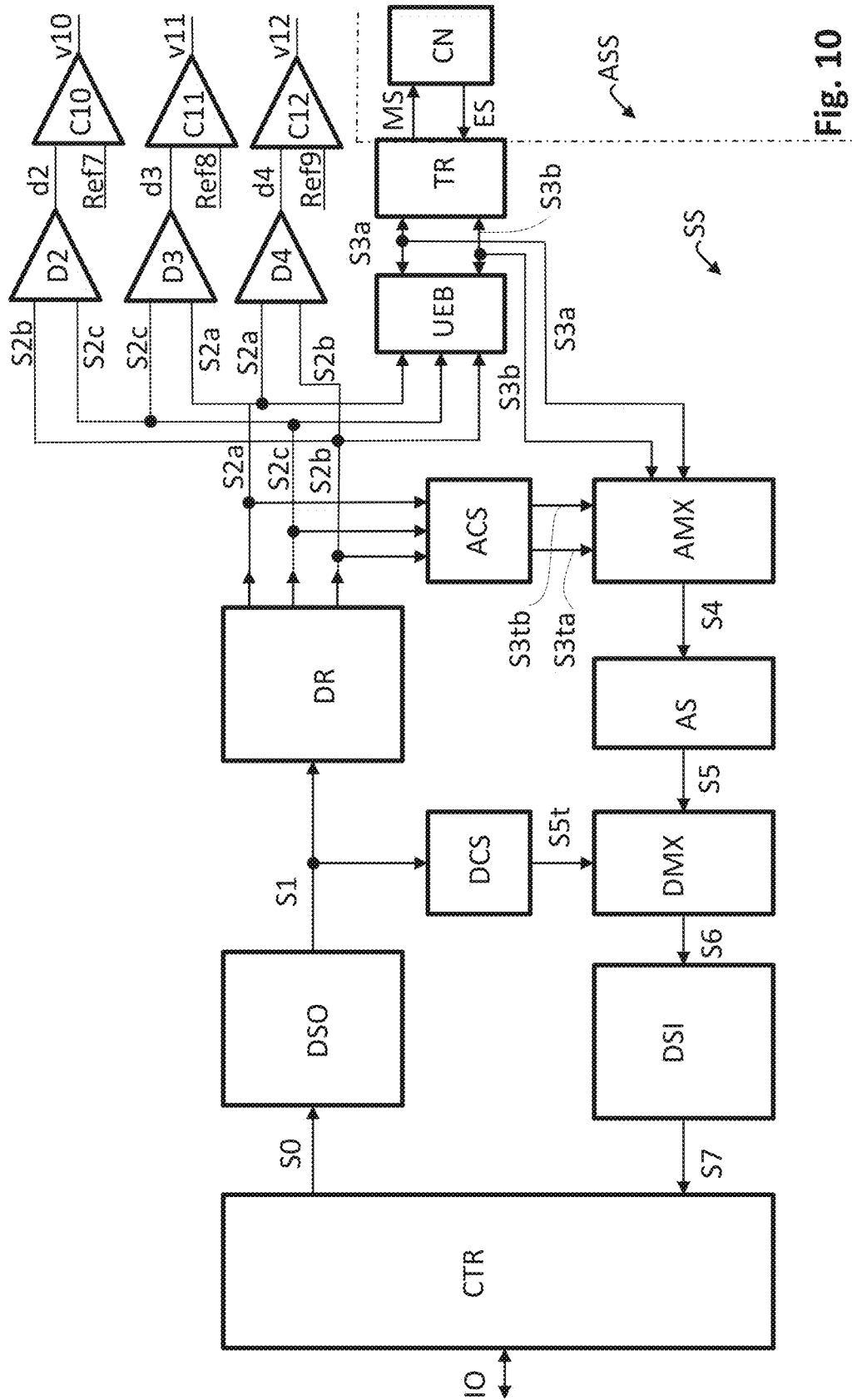
FIG. 10 corresponds to FIG. 2 with the difference that the second analogue signal (S2) is three-phase and is monitored during operation by means of comparison units in a delta configuration, and the third analogue signal (S3) is two-phase.

FIG. 10 corresponds to FIG. 6, with the difference that the second analogue signal (S2) is three-phase and is monitored during operation by means of comparison units in a delta configuration, and the third analogue signal (S3) is two-phase.

A second differential amplifier (D2) forms the second difference signal (d2) for example by establishing a difference from a parameter value of the second sub-signal (S2b) of the second analogue signal (S2) and from a parameter value of the third sub-signal (S2c) of the second analogue signal (S2). For example, this may be a simple establishment of a difference between the momentary values of the electrical potential of the second sub-signal (S2b) of the second analogue signal (S2) and the third sub-signal (S2b) of the second analogue signal (S2) with respect to a reference potential. In this case the second difference signal (d2) constitutes the value of the voltage difference between the momentary values of the electrical potential of the second sub-signal (S2b) of the second analogue signal (S2) and the third sub-signal (S2c) of the second analogue signal (S2) with respect to a reference potential. In other applications, instead of comparing electrical potential values with respect to a preferably common reference potential, current values may also be compared.

A tenth comparator (C10) compares the momentary value of the second difference signal (d2) with a seventh reference value (Ref7) and forms the tenth comparison result signal (v10). As before, it may be expedient to detect overshoots at certain times and to detect undershoots at other times, for example within an ultrasound transmission sequence. It may therefore be expedient to provide a plurality of seventh reference values (Ref7) for these different times and moments in time, which seventh reference values should preferably be different. A separate tenth comparator (C10) may optionally be provided for each of these seventh reference values (Ref7), which comparators each generate an associated tenth comparison result signal (v10). The tenth comparison result signals (v10) are preferably assessed by the control device (CTR) or the digital input circuit (DSI). The moments in time at which the tenth comparison result signals (v10) are valid and should be assessed are preferably defined by the digital signal generating unit (DSO) or the control device (CTR).

A third differential amplifier (D3) forms the third difference signal (d3) for example by establishing a difference from a parameter value of the third sub-signal (S2c) of the second analogue signal (S2) and from a parameter value of the first sub-signal (S2a) of the second analogue signal (S2). For example, this may be a simple establishment of a difference between the momentary values of the electrical potential of the third sub-signal (S2c) of the second analogue signal (S2) and the first sub-signal (S2a) of the second analogue signal (S2) with respect to a reference potential. In this case the third difference signal (d3) constitutes the value of the voltage difference between the momentary values of the electrical potential of the third sub-signal (S2c) of the second analogue signal (S2) and the first sub-signal (S2a) of the second analogue signal (S2) with respect to a reference potential. In other applications, instead of comparing electrical potential values with respect to a preferably common reference potential, current values may also be compared.

A eleventh comparator (C11) compares the momentary value of the third difference signal (d3) with an eighth reference value (Ref8) and forms the eleventh comparison result signal (v11). As before, it may be expedient to detect overshoots at certain times and to detect undershoots at other times, for example within an ultrasound transmission sequence. It may therefore be expedient to provide a plurality of eighth reference values (Ref8) for these different times and moments in time, which eighth reference values should preferably be different. A separate eleventh comparator (C11) may optionally be provided for each of these eighth reference values (Ref8), which comparators each generate an associated eleventh comparison result signal (v11). The eleventh comparison result signals (v11) are preferably assessed by the control device (CTR) or the digital input circuit (DSI). The moments in time at which the eleventh comparison result signals (v11) are valid and should be assessed are preferably defined by the digital signal generating unit (DSO) or the control device (CTR).

A fourth differential amplifier (D4) forms the fourth difference signal (d4) for example by establishing a difference from a parameter value of the first sub-signal (S2a) of the second analogue signal (S2) and from a parameter value of the second sub-signal (S2b) of the second analogue signal (S2). For example, this may be a simple establishment of a difference between the momentary values of the electrical potential of the first sub-signal (S2a) of the second analogue signal (S2) and the second sub-signal (S2b) of the second analogue signal (S2) with respect to a reference potential. In this case the fourth difference signal (d4) constitutes the value of the voltage difference between the momentary values of the electrical potential of the first sub-signal (S2a) of the second analogue signal (S2) and the second sub-signal (S2b) of the second analogue signal (S2) with respect to a reference potential. In other applications, instead of comparing electrical potential values with respect to a preferably common reference potential, current values may also be compared.

A twelfth comparator (C12) compares the momentary value of the fourth difference signal (d4) with a ninth reference value (Ref9) and forms the twelfth comparison result signal (v12). As before, it may be expedient to detect overshoots at certain times and to detect undershoots at other times, for example within an ultrasound transmission sequence. It may therefore be expedient to provide a plurality of ninth reference values (Ref9) for these different times and moments in time, which ninth reference values should preferably be different. A separate twelfth comparator (C12) may optionally be provided for each of these ninth reference values (Ref9), which comparators each generate an associated twelfth comparison result signal (v12). The twelfth comparison result signals (v12) are preferably assessed by the control device (CTR) or the digital input circuit (DSI). The moments in time at which the twelfth comparison result signals (v12) are valid and should be assessed are preferably defined by the digital signal generating unit (DSO) or the control device (CTR).

Figure 11:
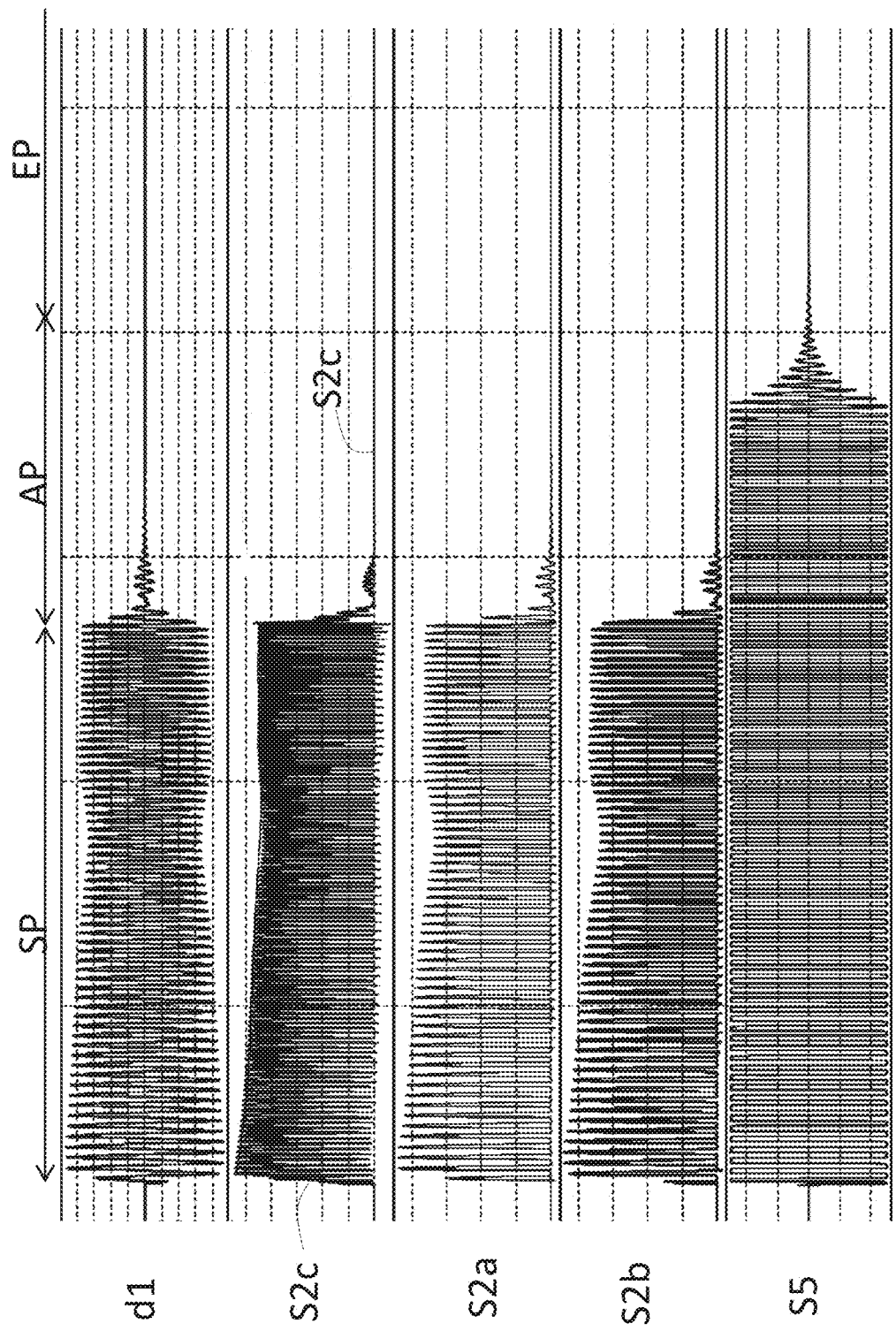
FIG. 11 shows important signals (d1, S2c, S2a, S2b, S5) when transmitting an ultrasound burst in the operating mode.

FIG. 11 shows the temporal course of important signals (d1, S2c, S2a, S2b, S5) during transmission of an ultrasound burst in the operating mode. The following can be clearly seen:
1. the first phase of the transmission frequency, the transmission phase (SP), in which the driver stage drives the ultrasound transducer (TR), and an output signal (MS) is transmitted by the ultrasound transducer; and 2. the second phase of the transmission sequence, that is to say the decay phase, in which the driver stage removes energy from the ultrasound transducer (TR) and damps its mechanical vibration, and
3. the receive phase (EP), in which the ultrasound transducer (TR) can receive an echo of an output signal (MS).

The following are also shown:
1. the first difference signal (d1), which reproduces the differential amplitude of the electrical potential difference between the first sub-signal (S3a) of the third analogue signal (S3) and the second sub-signal (S3b) of the third analogue signal (S3), and
2. the third sub-signal (S2c) of the second analogue signal (S2), which reproduces the level of the electrical potential at the centre tap of the transmitter (UEB), and
3. the first sub-signal (S2a) of the second analogue signal (S2), which reproduces the level of the electrical potential at a first connection of the transmitter (UEB), and
4. the second sub-signal (S2c) of the second analogue signal (S2), which reproduces the level of the electrical potential at a second connection of the transmitter (UEB), and
5. the digitised value of the fifth digital signal (S5), which reproduces the analogue amplified, filtered and digitised value.

Figure 12:
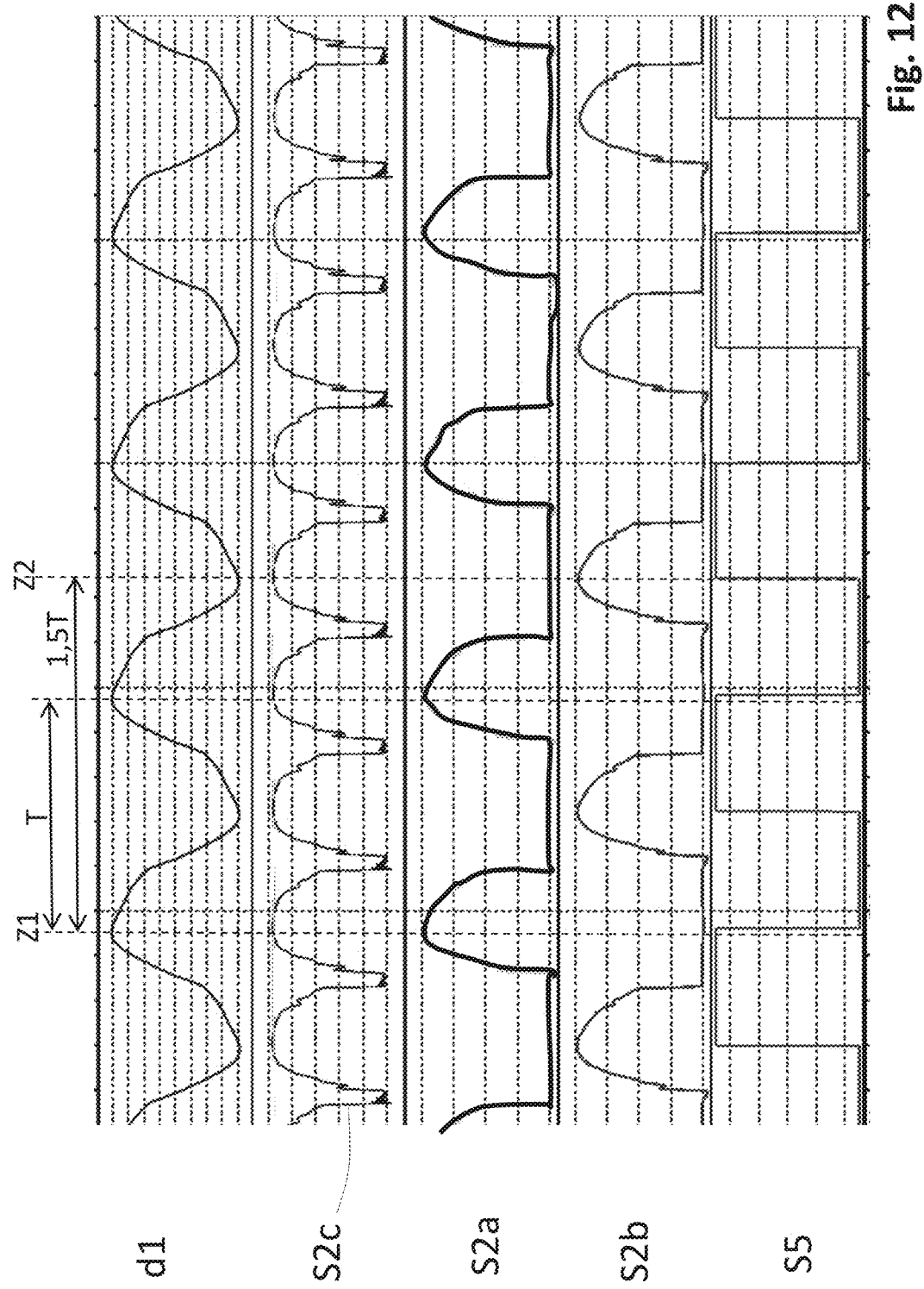
FIG. 12 corresponds to a temporal enlargement of FIG. 11 in the transmission phase (SP)

FIG. 12 corresponds to a temporal enlargement of FIG. 11, wherein the detail in the transmission phase (SP) is temporally localised.

Figure 13:
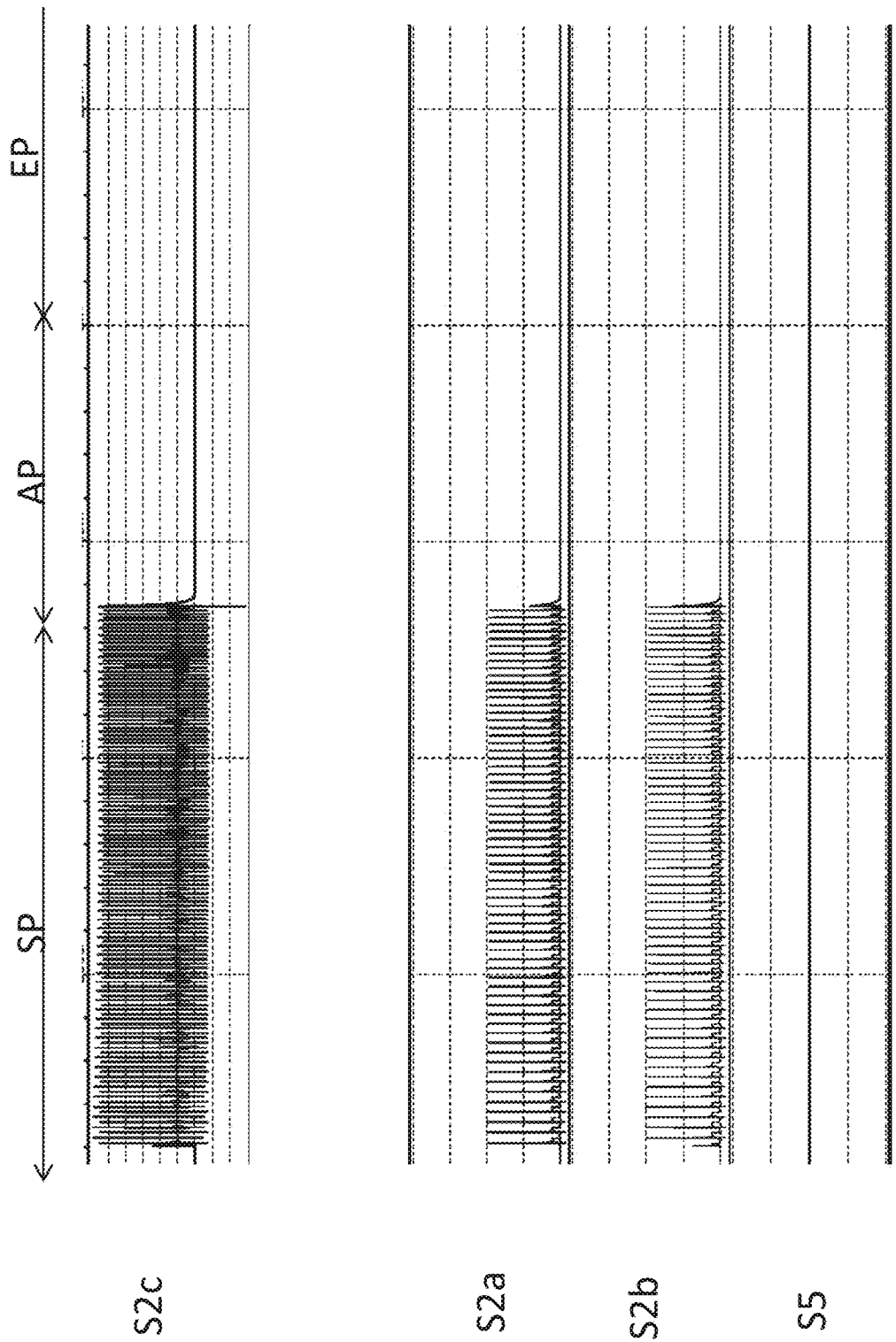
FIG. 13 shows important signals (S2c, S2a, S2b, S5) when transmitting an ultrasound burst in the operating mode, wherein a short circuit is now present at the inner ultrasound transducer (TRi) between the first sub-signal (S3a) of the third analogue signal (S3) and the second sub-signal (S3b) of the third analogue signal (S3)

FIG. 13 shows important signals (S2c, S2a, S2b, S5) when transmitting an ultrasound burst in the operating mode, wherein a short circuit is now present at the inner ultrasound transducer (TRi) between the first sub-signal (S3a) of the third analogue signal (S3) and the second sub-signal (S3b) of the third analogue signal (S3).

Symptoms

The ultrasound transducer does not vibrate correctly. Thus, a frequency measurement and a measurement of the decay time may be taken by the digital input circuit (DSI). With the proposed apparatus, the case of a short-circuited ultrasound transducer (TR), in which the second sub-signal (S3b) of the third analogue signal (S3) is connected to the first sub-signal (S3a) of the third analogue signal (S3), may be identified.

Figure 14:
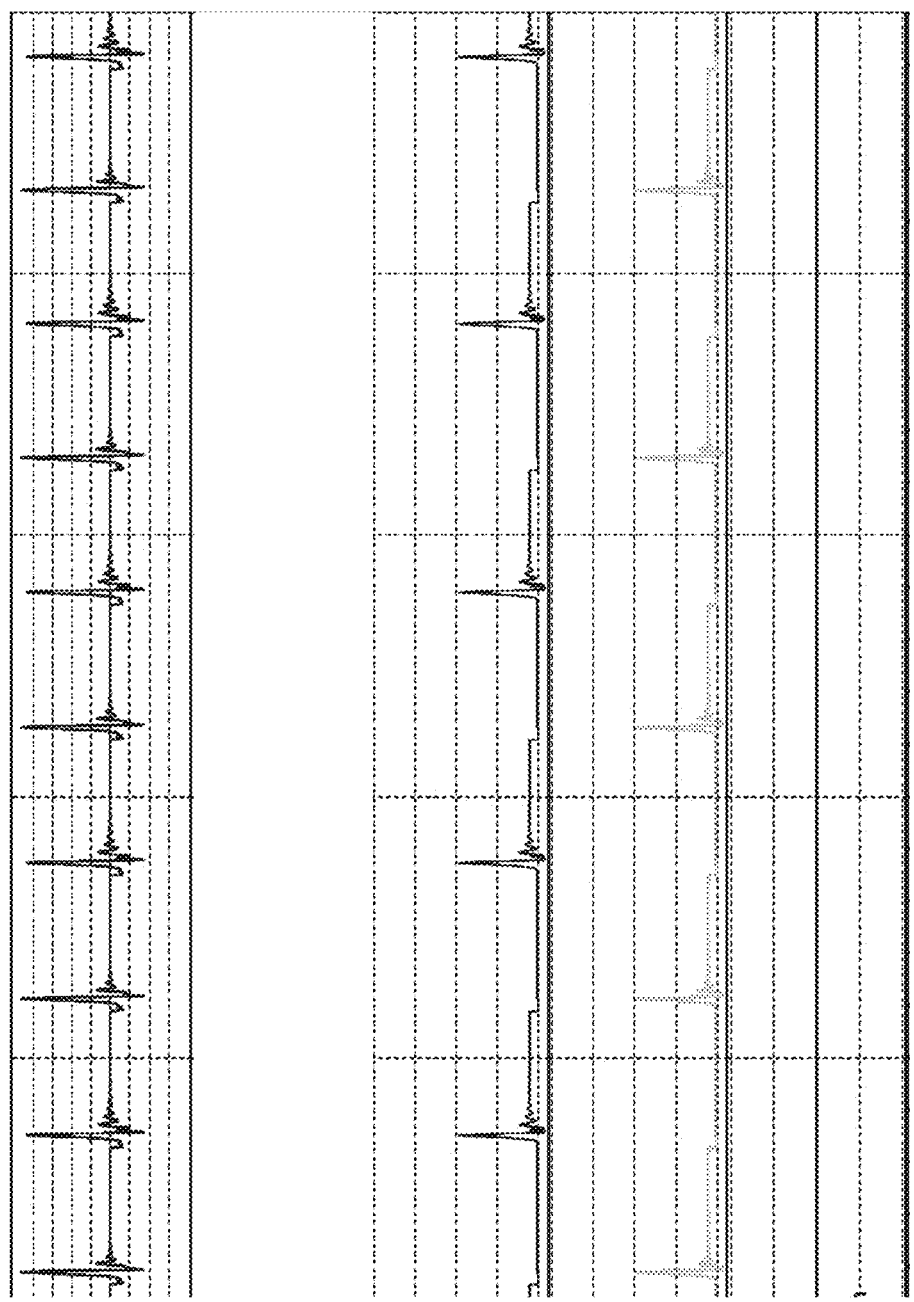
FIG. 14 corresponds to a temporal enlargement of FIG. 13 in the transmission phase (SP)

FIG. 14 corresponds to a temporal enlargement of FIG. 13.

Figure 15:
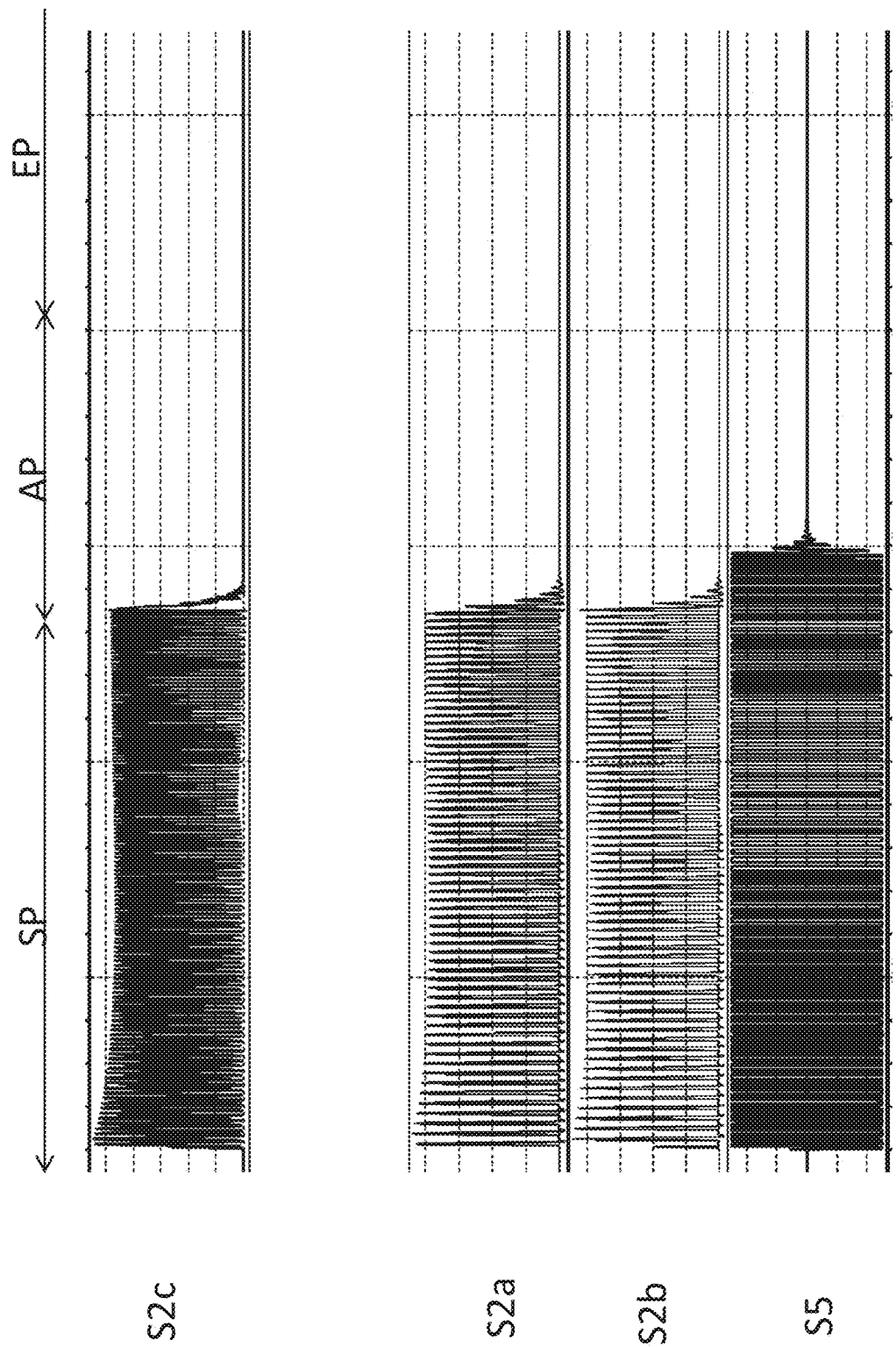
FIG. 15 shows important signals (S2c, S2a. S2b, S5) when transmitting an ultrasound burst in the operating mode, wherein the inner ultrasound transducer (TRi) is now not connected, that is to say the first sub-signal (S3a) of the third analogue signal (S3) or the second sub-signal (S3b) of the third analogue signal (S3) is not connected to the ultrasound transducer (TR)

FIG. 15 shows important signals (S2c, S2a, S2b, S5) when transmitting an ultrasound burst in the operating mode, wherein the inner ultrasound transducer (TRi) is now not connected, that is to say the first sub-signal (S3a) of the third analogue signal (S3) or the second sub-signal (S3b) of the third analogue signal (S3) is not connected to the ultrasound transducer (TR).

Symptoms

The ultrasound transducer does not vibrate correctly. Thus, a measurement of the decay time may be taken by the digital input circuit (DSI). With the proposed apparatus, the case of a non-connected inner ultrasound transducer (TRi) may thus be identified.

Figure 16:
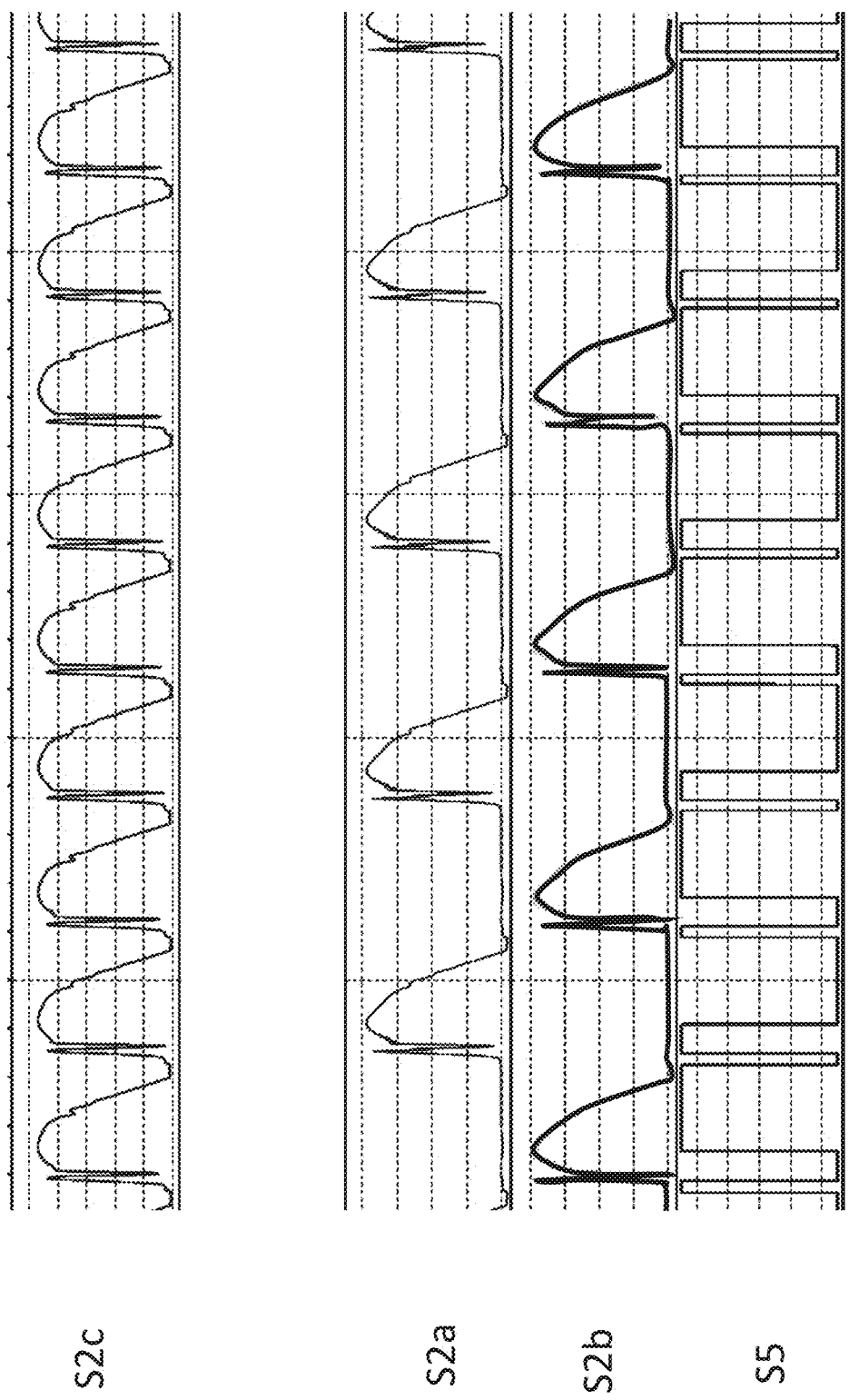
FIG. 16 corresponds to a temporal enlargement of FIG. 15 in the transmission phase (SP)

FIG. 16 corresponds to a temporal enlargement of FIG. 15.

Figure 17:
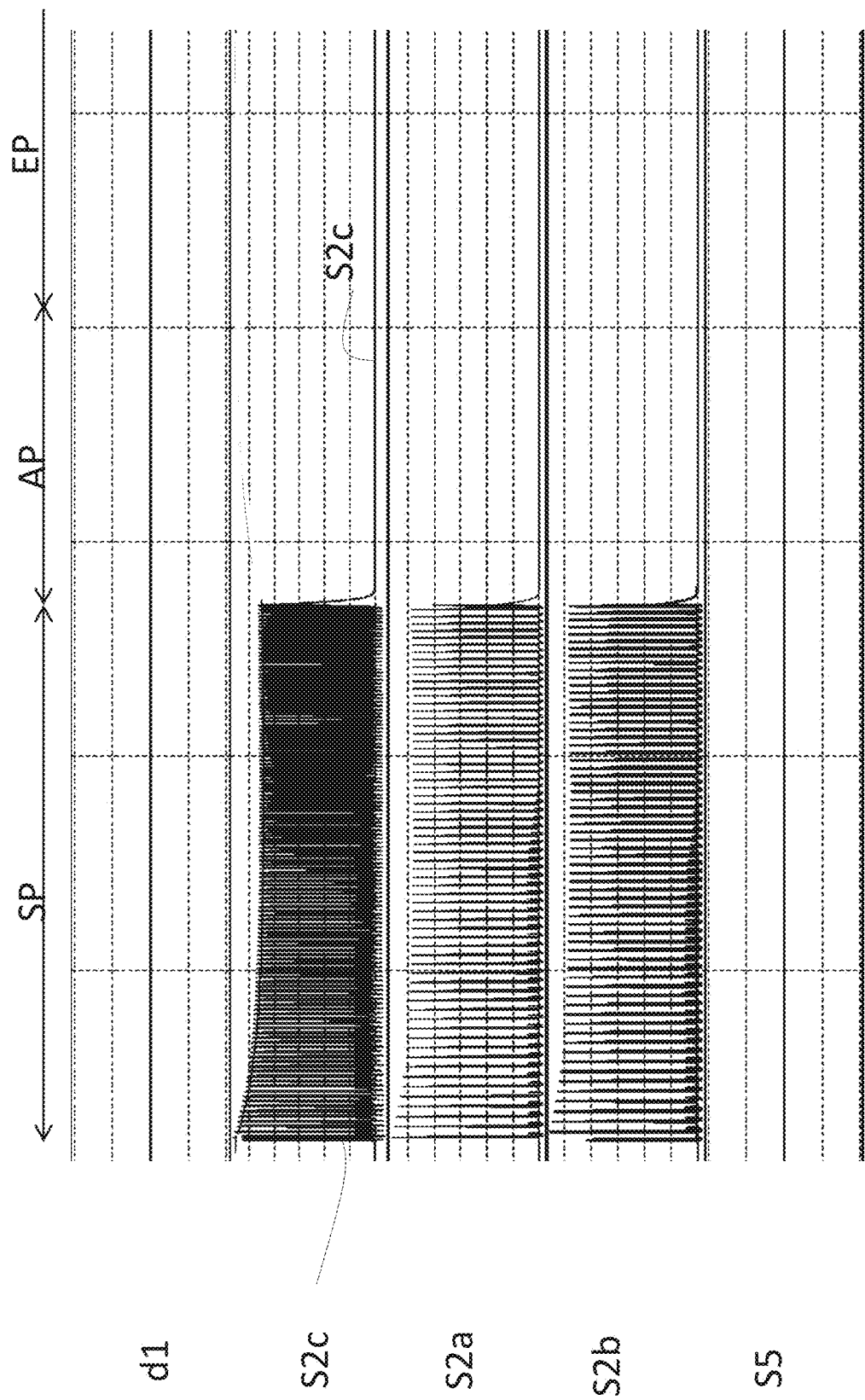
FIG. 17 shows important signals (d1, S2c, S2a, S2b, S5) when transmitting an ultrasound burst in the operating mode, wherein the transmitter (UEB) is now not connected on the secondary side by means of a connection to the third sub-signal (S3a) of the third analogue signal (S3)

FIG. 17 shows important signals (d1, S2c, S2a, S2b, S5) when transmitting an ultrasound burst in the operating mode, wherein the transmitter (UEB) is now not connected on the secondary side by means of a connection to the first sub-signal (S3a) of the third analogue signal (S3).

Symptoms

The non-connected first sub-signal (S3a) of the third analogue signal (S3) means that the inner ultrasound transducer (TRi) is not sufficiently supplied with energy. This error is therefore detectable by an assessment of the decay time and the vibration frequency.

Figure 18:
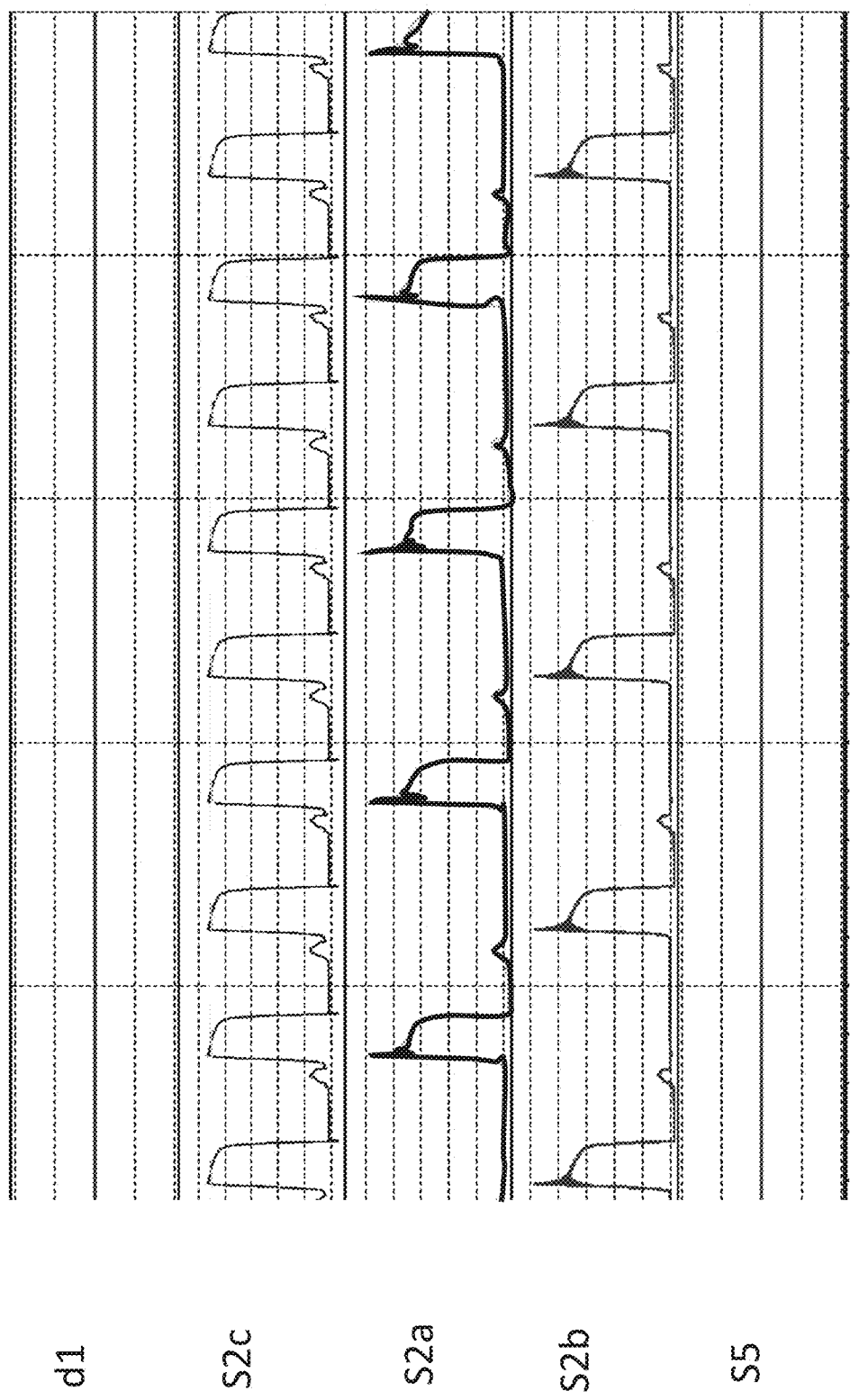
FIG. 18 corresponds to a temporal enlargement of FIG. 17 in the transmission phase (SP)

FIG. 18 corresponds to a temporal enlargement of FIG. 17.

Figure 19:
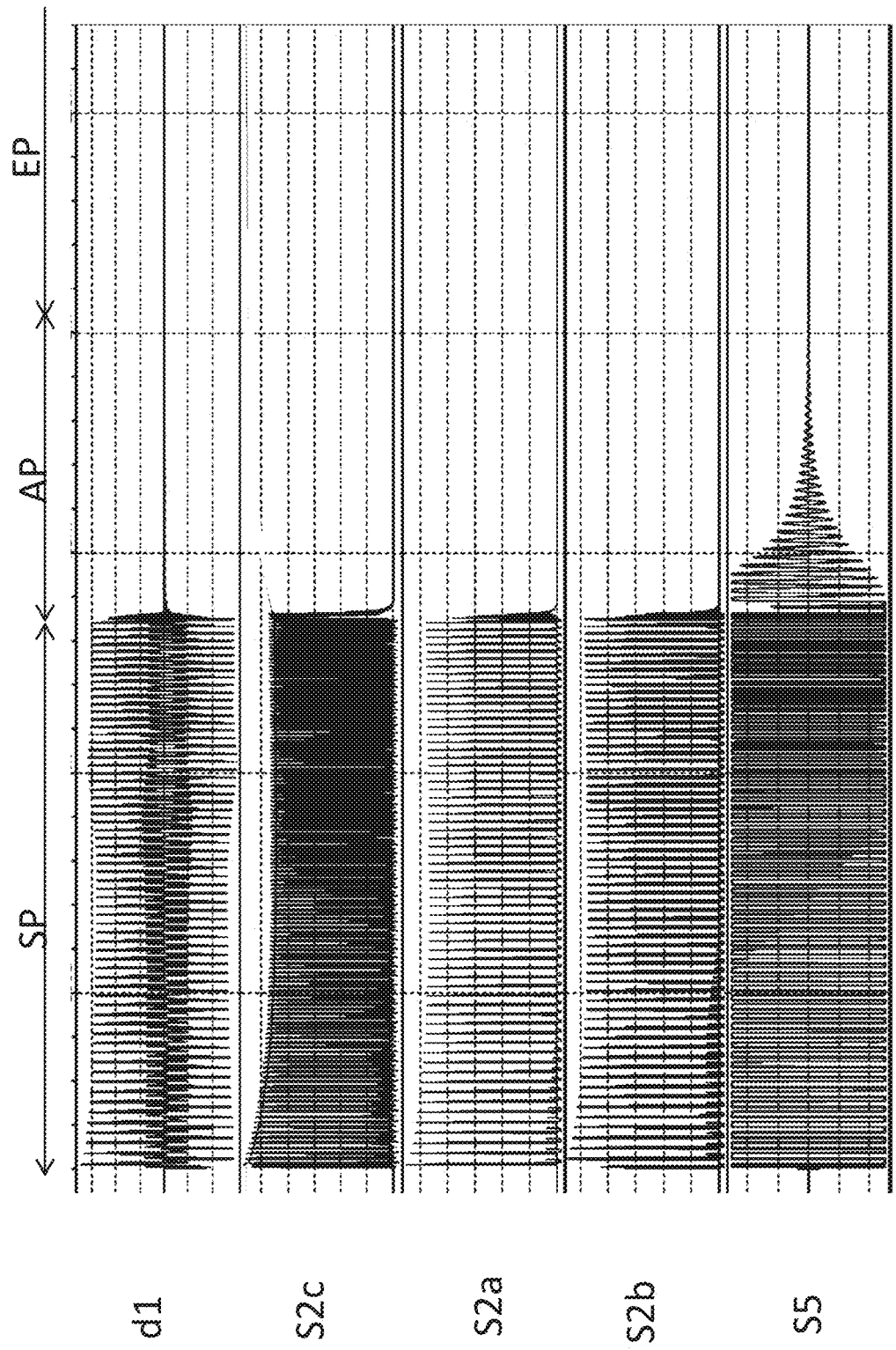
FIG. 19 shows important signals (d1, S2c, S2a, S2b, S5) when transmitting an ultrasound burst in the operating mode, wherein the transmitter (UEB) is now not connected on the secondary side by means of a connection to the second sub-signal (S3b) of the third analogue signal (S3)

FIG. 19 shows important signals (d1, S2c, S2a, S2b, S5) when transmitting an ultrasound burst in the operating mode, wherein the transmitter (UEB) is now not connected on the secondary side by means of a connection to the second sub-signal (S3b) of the third analogue signal (S3).

Symptoms

The non-connected second sub-signal (S3b) of the third analogue signal (S3) means that the inner ultrasound transducer (TRi) is not sufficiently supplied with energy. This error is therefore again detectable by means of an evaluation of the decay time and the vibration frequency.

Figure 20:
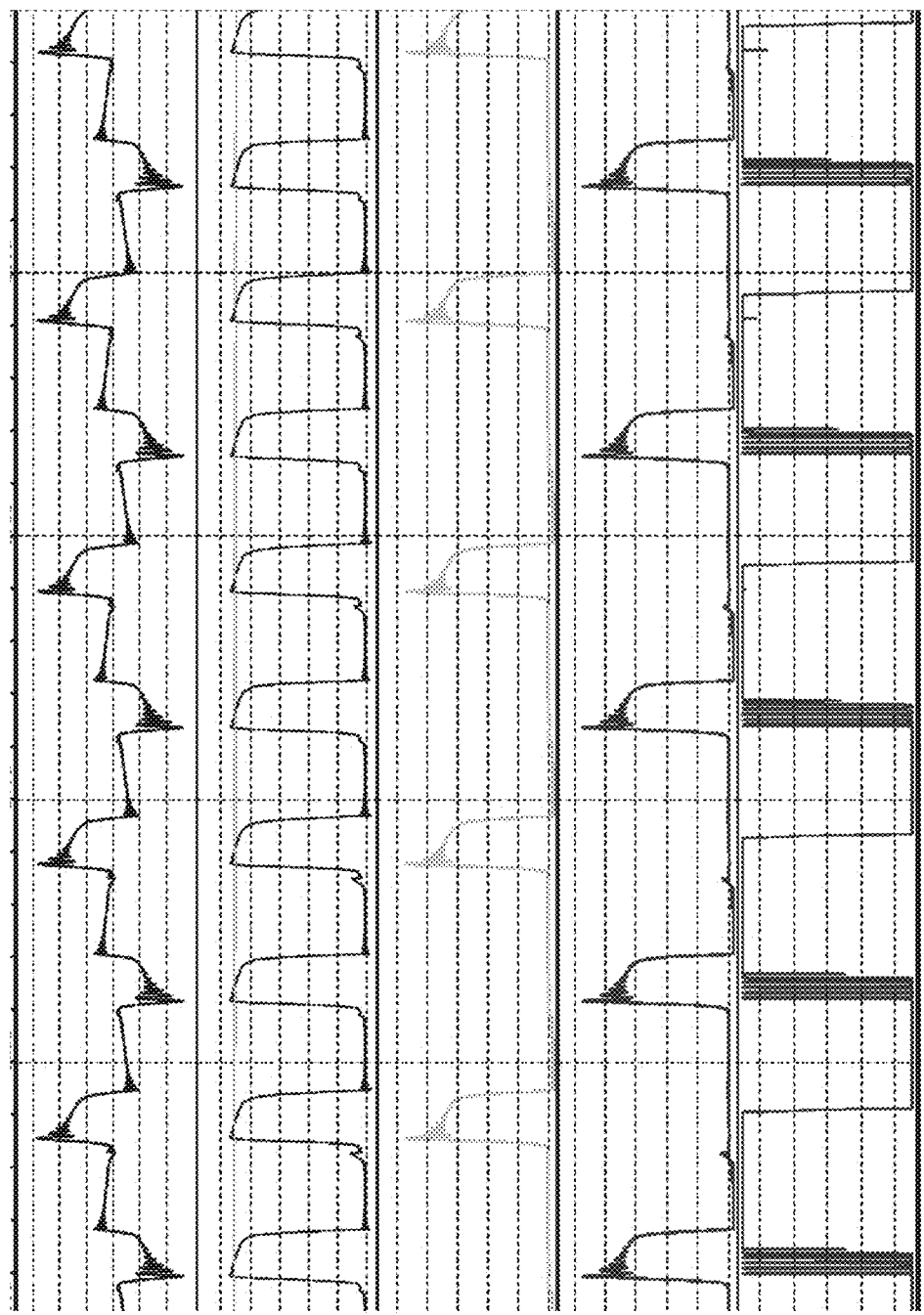
FIG. 20 corresponds to a temporal enlargement of FIG. 19 in the transmission phase (SP)

FIG. 20 corresponds to a temporal enlargement of FIG. 19.

Figure 21:
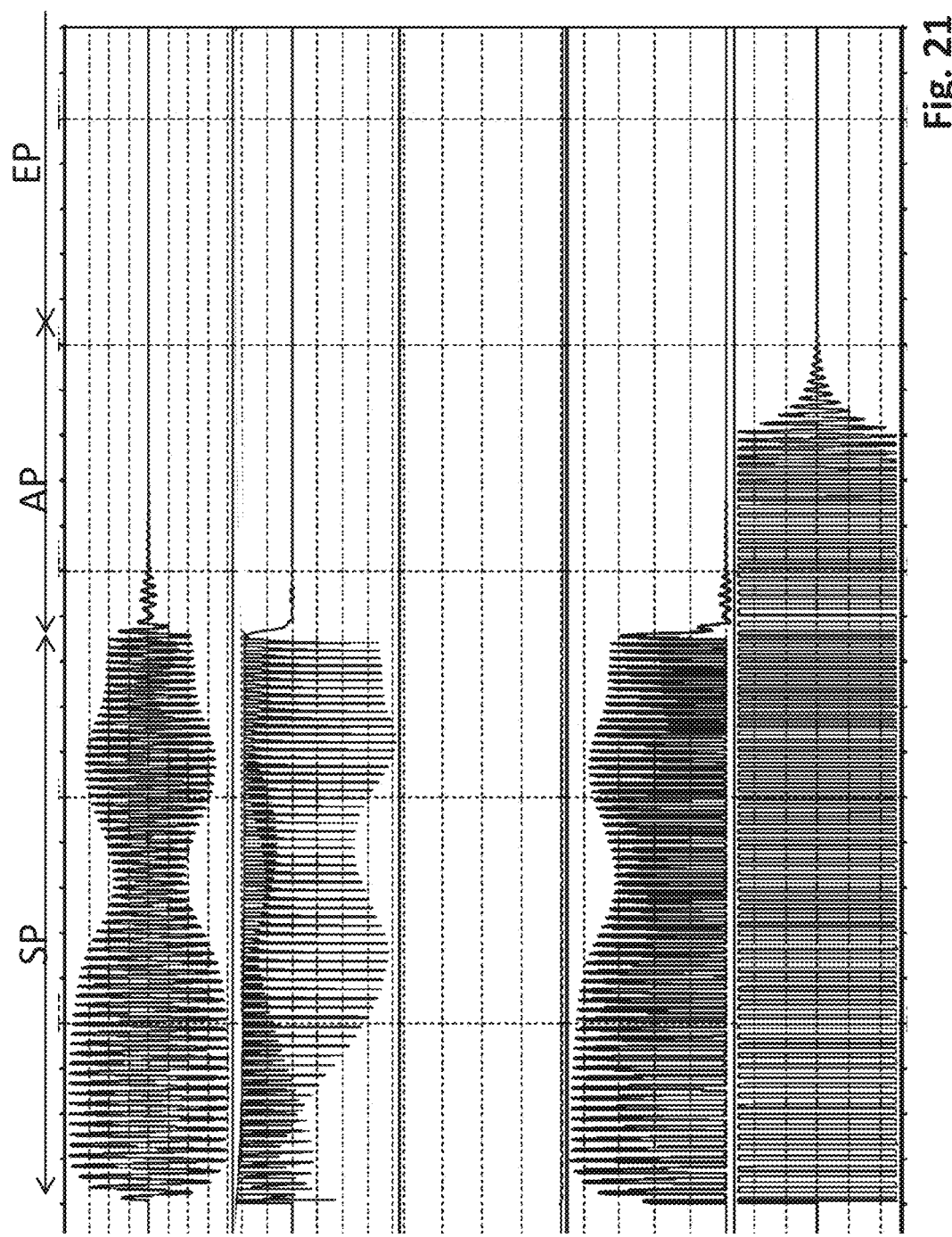
FIG. 21 shows important signals (d1, S2c, S2a, S2b, S5) when transmitting an ultrasound burst in the operating mode, wherein the transmitter (UEB) is now not connected on the primary side by means of a connection to the first sub-signal (S2a) of the second analogue signal (S2)

FIG. 21 shows important signals (d1, S2c, S2a, S2b, S5) when transmitting an ultrasound burst in the operating mode, wherein the transmitter (UEB) is now not connected on the primary side by means of a connection to the first sub-signal (S2a) of the second analogue signal (S2).

Symptoms

The non-connected first sub-signal (S2a) of the second analogue signal (S2) means that the ultrasound transducer (TR) is not sufficiently supplied with energy. This error, however, is not detectable by means of an assessment of the decay time and the vibration frequency.

A sixth comparator (C6) at the first sub-signal (S2a) of the second analogue signal (S2) (see also FIG. 9) may detect the continuous undershooting of this sixth reference value (Ref6) in the transmission phase (SP) and/or in the receive phase (EP) by comparison with a sixth reference (Ref6) and may thus conclude that the transmitter (UEB) is not connected on the secondary side by means of a connection to the first sub-signal (S2a) of the second analogue signal (S2). The setting of the corresponding sixth comparison signal (v6) may be identified by the (system) control device (CTR) or the digital input circuit (DSI). These then issue a corresponding error signal or a corresponding error message.

Figure 22:
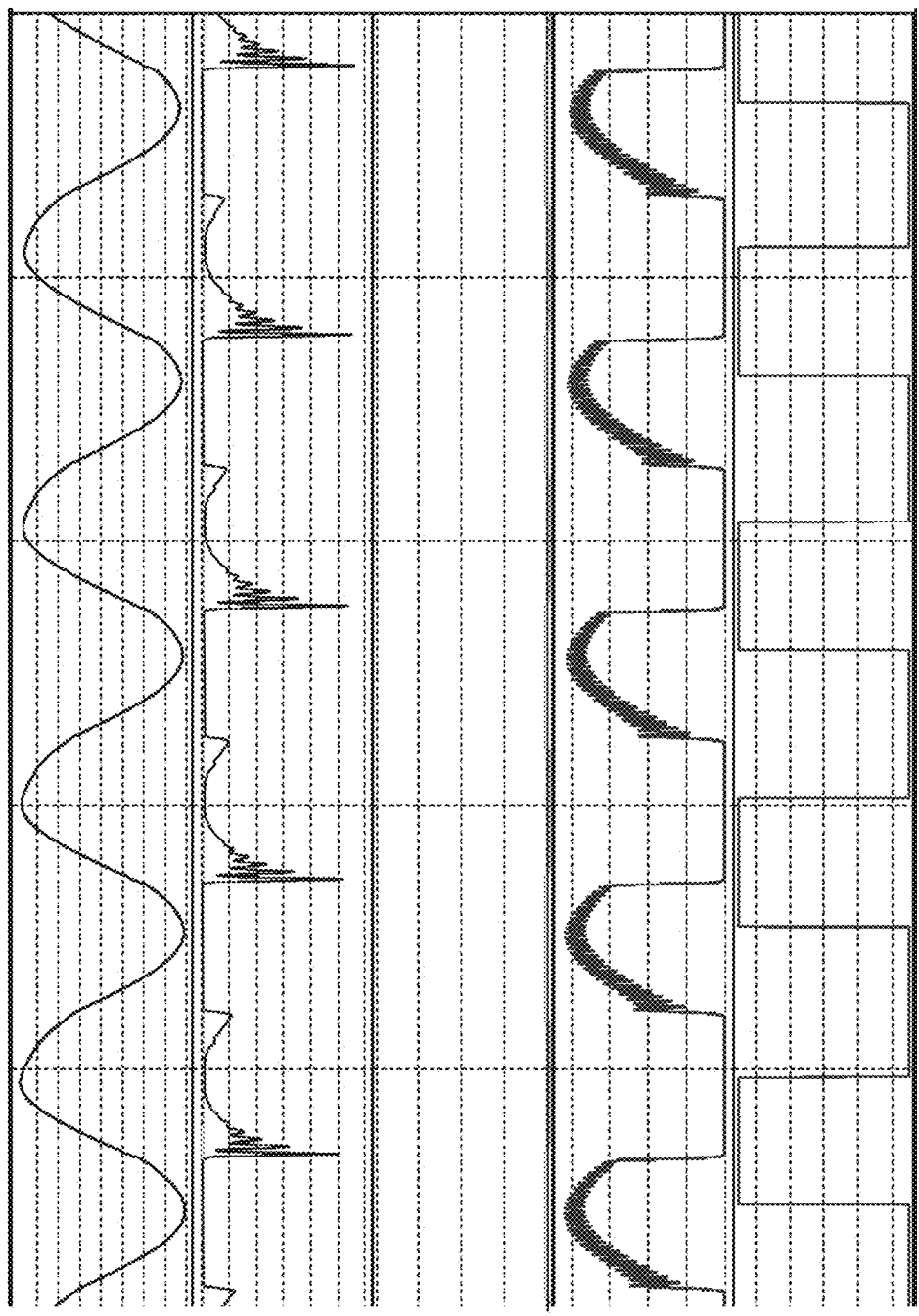
FIG. 22 corresponds to a temporal enlargement of FIG. 21 in the transmission phase (SP)

FIG. 22 corresponds to a temporal enlargement of FIG. 21.

Figure 23:
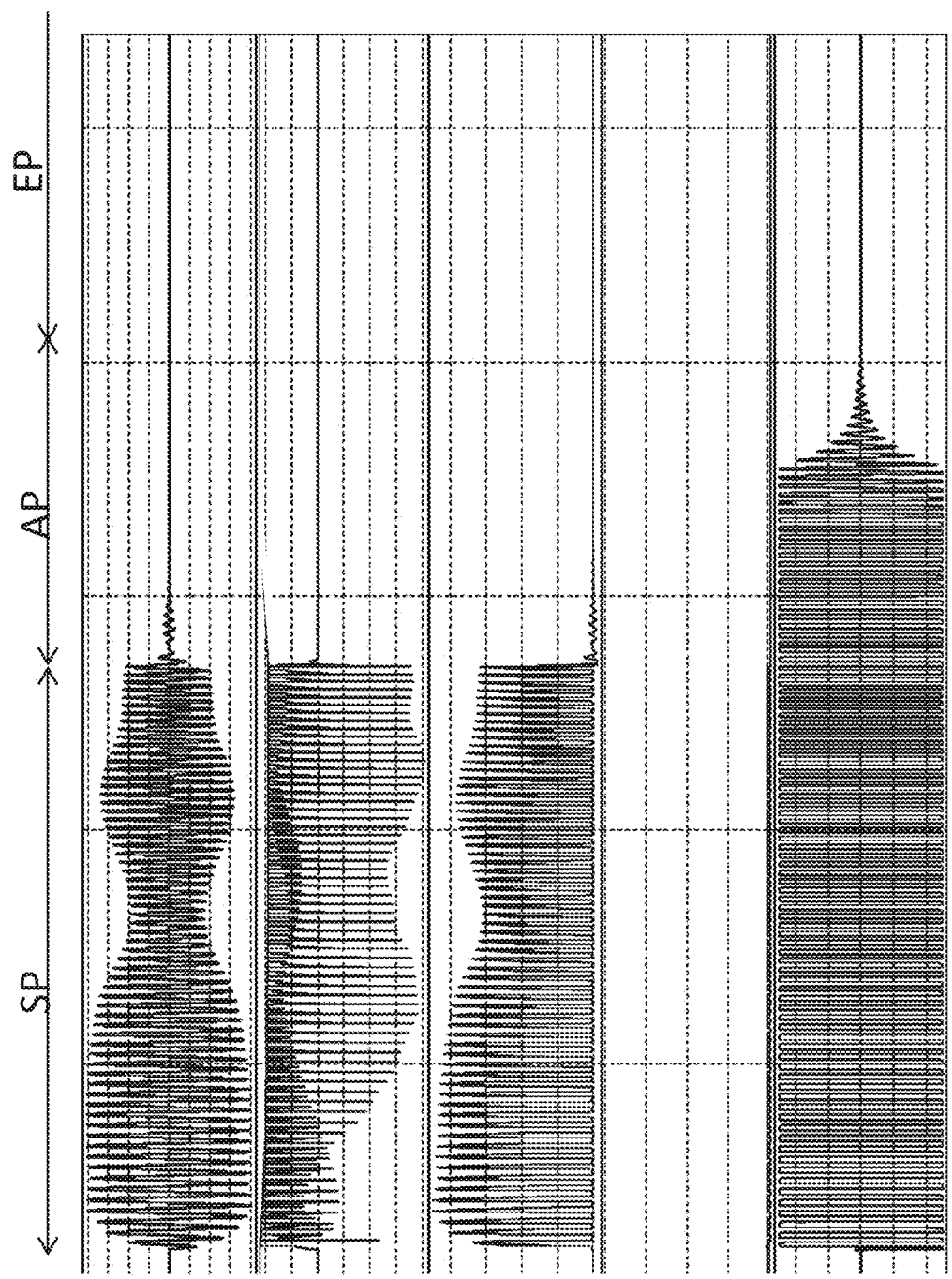
FIG. 23 shows important signals (d1, S2c, S2a, S2b, S5) when transmitting an ultrasound burst in the operating mode, wherein the transmitter (UEB) is now not connected on the primary side by means of a connection to the second sub-signal (S2b) of the second analogue signal (S2)

FIG. 23 shows important signals (d1, S2c, S2a, S2b, S5) when transmitting an ultrasound burst in the operating mode, wherein the transmitter (UEB) is now not connected on the primary side by means of a connection to the second sub-signal (S2b) of the second analogue signal (S2).

Symptoms

The non-connected second sub-signal (S2b) of the second analogue signal (S2) means that the ultrasound transducer (TR) is not sufficiently supplied with energy. This error, however, is not detectable by means of an assessment of the decay time and the vibration frequency.

A fourth comparator (C4) at the second sub-signal (S2b) of the second analogue signal (S2) (see also FIG. 9) may detect the continuous undershooting of this fourth reference value (Ref4) in the transmission phase (SP) and/or in the receive phase (EP) by comparison with a fourth reference (Ref4) and may thus conclude that the transmitter (UEB) is not connected on the secondary side by means of a connection to the second sub-signal (S2b) of the second analogue signal (S2). The setting of the corresponding fourth comparison signal (v4) may be identified by the (system) control device (CTR) or the digital input circuit (DSI). These then preferably issue a corresponding error signal or a corresponding error message.

Figure 24:
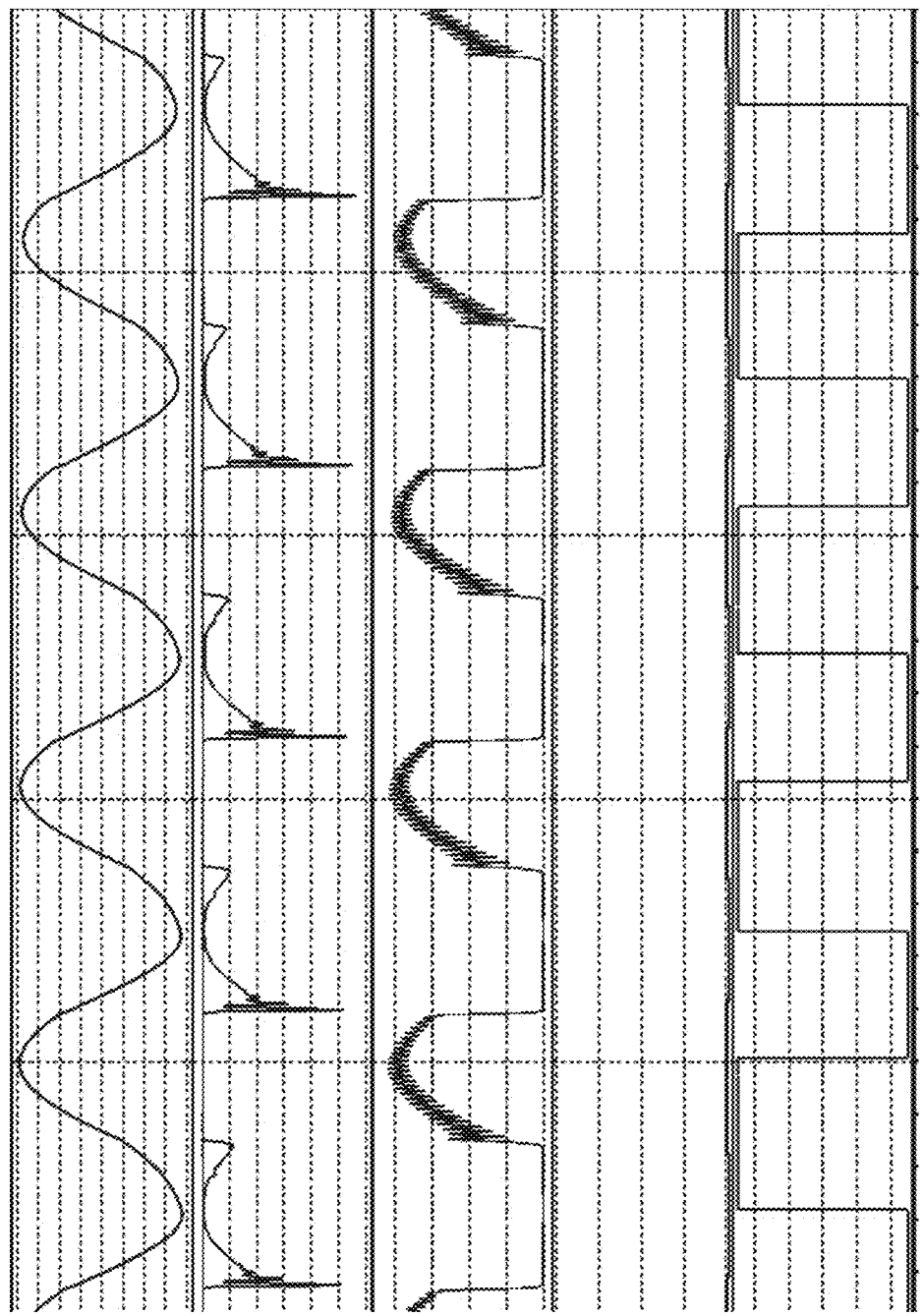
FIG. 24 corresponds to a temporal enlargement of FIG. 23 in the transmission phase (SP)

FIG. 24 corresponds to a temporal enlargement of FIG. 23.

Figure 25:
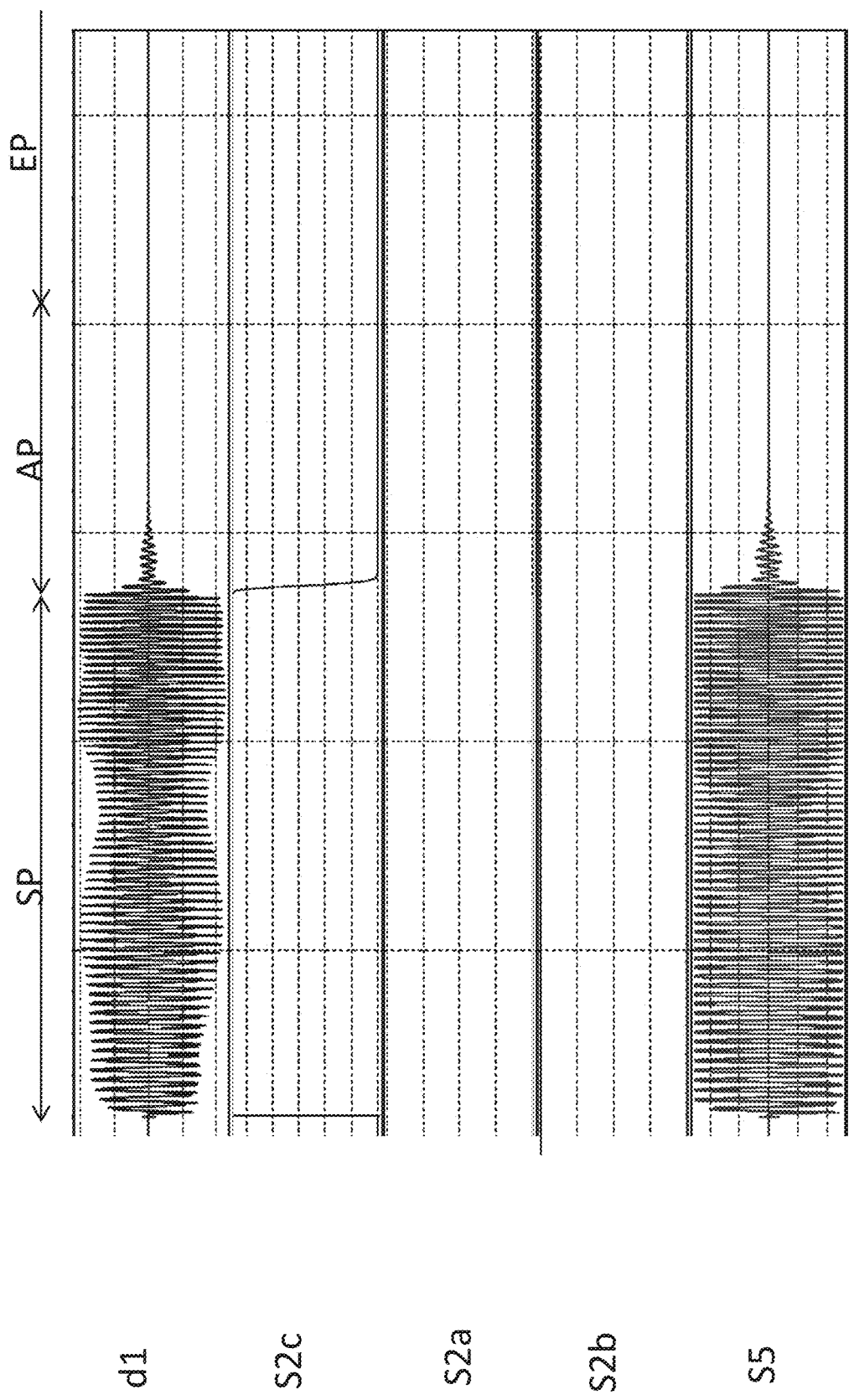
FIG. 25 shows important signals (d1, S2c, S2a, S2b, S5) when transmitting an ultrasound burst in the operating mode, wherein the transmitter (UEB) is now not connected on the primary side by means of its middle connection to the third sub-signal (S2c) of the second analogue signal (S2)

FIG. 25 shows important signals (d1, S2c, S2a, S2b, S5) when transmitting an ultrasound burst in the operating mode, wherein the transmitter (UEB) is not connected on the primary side by means of its middle connection to the third sub-signal (S2c) of the second analogue signal (S2).

Symptoms

The non-connected third sub-signal (S2c) of the second analogue signal (S2) means that the inner ultrasound transducer (TRi) is not sufficiently supplied with energy. This error is detectable by an assessment of the decay time and the vibration frequency.

Figure 26:
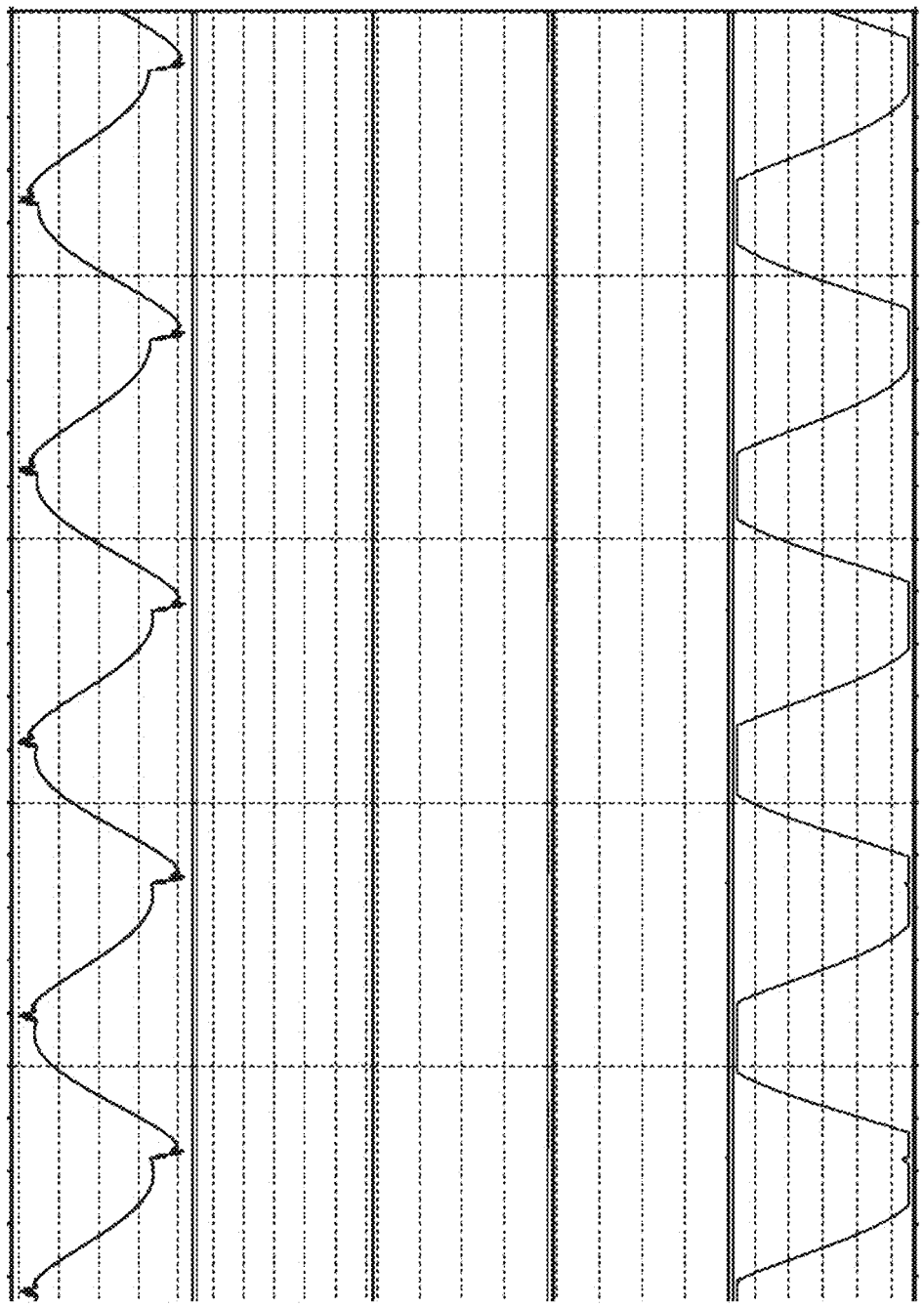
FIG. 26 corresponds to a temporal enlargement of FIG. 25 in the transmission phase (SP)

FIG. 26 corresponds to a temporal enlargement of FIG. 25.

Figure 27:
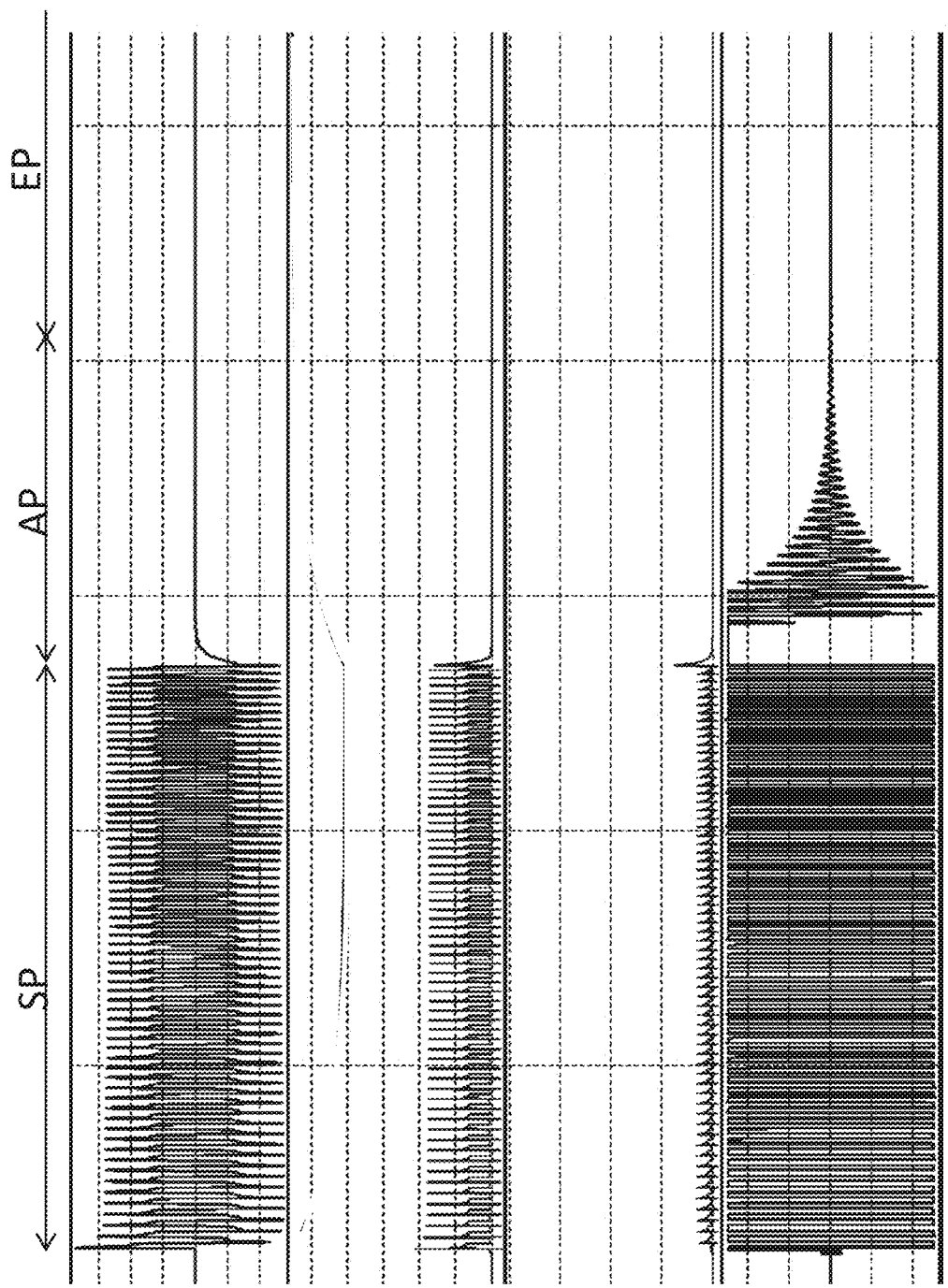
FIG. 27 shows important signals (d1, S2c, S2a, S2b, S5) when transmitting an ultrasound burst in the operating mode, wherein on the primary side two connections of the transmitter (UEB), specifically the third sub-signal (S2c) of the second analogue signal (S2) and first sub-signal (S2a) of the second analogue signal (S2), are short-circuited.

FIG. 27 shows important signals (d1, S2c, S2a, S2b, S5) when transmitting an ultrasound burst in the operating mode, wherein on the primary side two connections of the transmitter (UEB), specifically the third sub-signal (S2c) of the second analogue signal (S2) and first sub-signal (S2a) of the second analogue signal (S2), are short-circuited.

Symptoms

The fact that the third sub-signal (S2c) of the second analogue signal (S2) is short-circuited with the first sub-signal (S2a) of the second analogue signal (S2) means that the ultrasound transducer (TR) is not sufficiently supplied with energy. This error is detectable by an assessment of the decay time and the vibration frequency.

The amplitude at the second sub-signal (S2b) of the second signal (S2) is also reduced by this short-circuit and may therefore be identified by a fourth comparator (C4) by means of comparison with a fourth reference (Ref4).

A fourth comparator (C4) at the second sub-signal (S2b) of the second analogue signal (S2) (see also FIG. 9) may detect the continuous undershooting of this fourth reference value (Ref4) in the transmission phase (SP) and/or in the receive phase (EP) by comparison with a fourth reference (Ref4) and may thus conclude that the third sub-signal (S2c) of the second analogue signal (S2) and the first sub-signal (S2a) of the second analogue signal (S2) might be short-circuited. The setting of the corresponding fourth comparison signal (v4) may be identified by the (system) control device (CTR) or the digital input circuit (DSI). These then issue a corresponding error signal or a corresponding error message. It should be noted here that the various error cases may be better separated by a plurality of different fourth reference values (Ref4) and possibly further forth comparators (C4).

Figure 28:
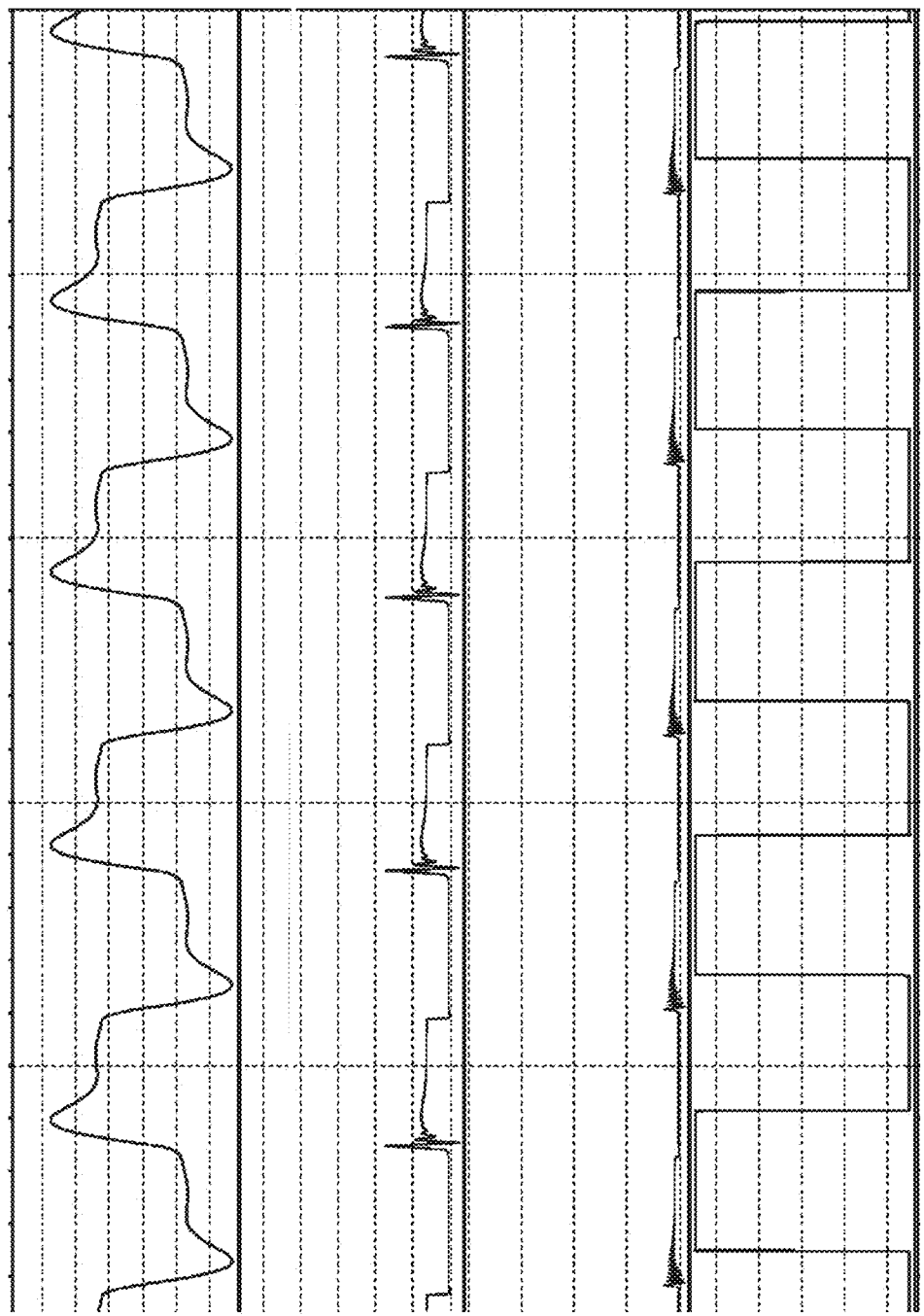
FIG. 28 corresponds to a temporal enlargement of FIG. 27 in the transmission phase (SP)

FIG. 28 corresponds to a temporal enlargement of FIG. 27.

Figure 29:
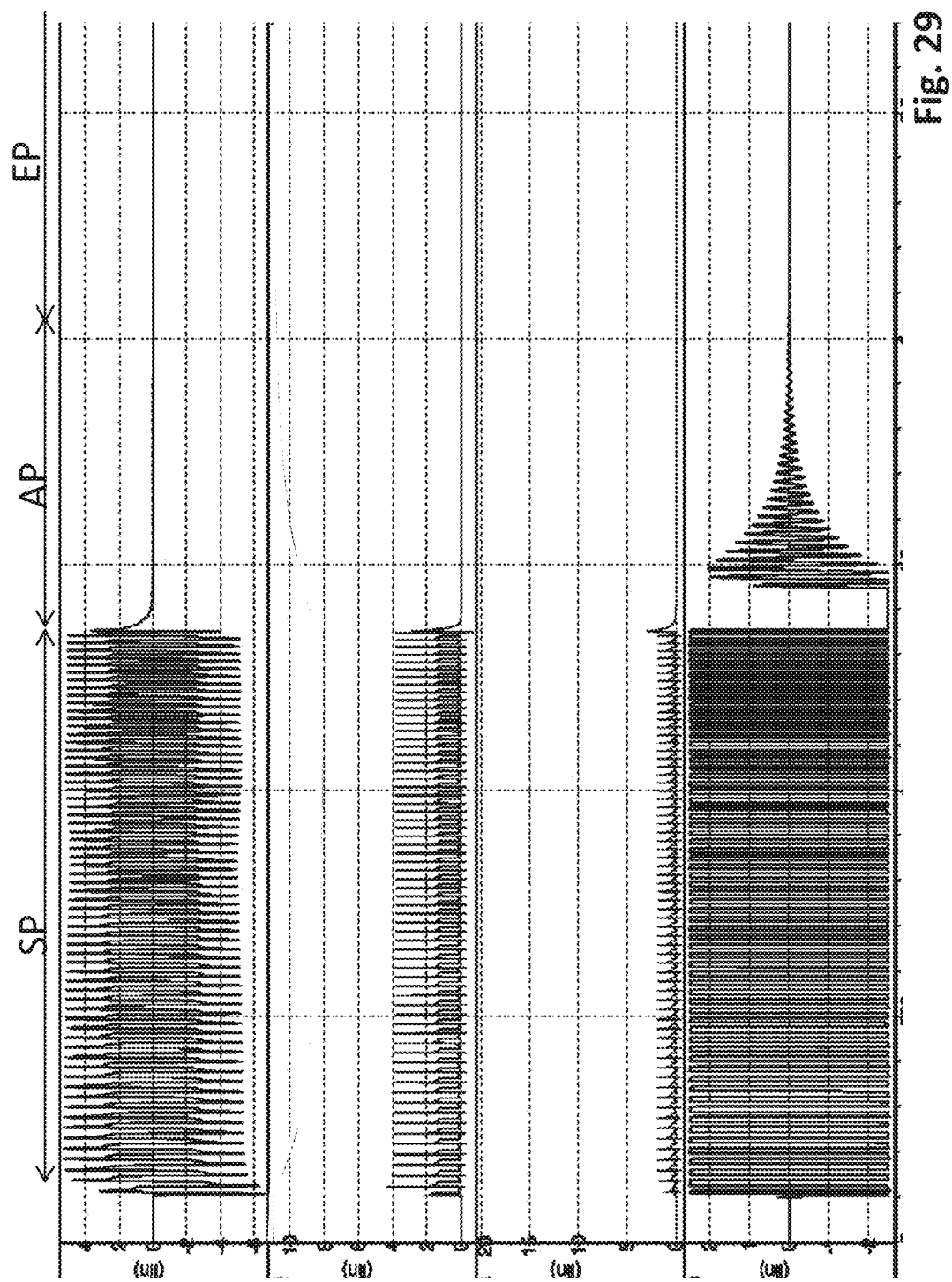
FIG. 29 shows important signals (d1, S2c, S2a, S2b, S5) when transmitting an ultrasound burst in the operating mode, wherein on the primary side two connections of the transmitter (UEB), specifically the third sub-signal (S2c) of the second analogue signal (S2) and second sub-signal (S2b) of the second analogue signal (S2), are short-circuited.

FIG. 29 shows important signals (d1, S2c, S2a, S2b, S5) when transmitting an ultrasound burst in the operating mode, wherein on the primary side two connections of the transmitter (UEB), specifically the third sub-signal (S2c) of the second analogue signal (S2) and second sub-signal (S2b) of the second analogue signal (S2), are short-circuited.

Symptoms

The fact that the third sub-signal (S2c) of the second analogue signal (S2) and the second sub-signal (S2b) of the second analogue signal (S2) are short-circuited with one another means that the ultrasound transducer (TR) is not sufficiently supplied with energy. This error is detectable by an assessment of the decay time and the vibration frequency.

The amplitude at the first sub-signal (S2a) of the second signal (S2) his likewise reduced by this short-circuit and may therefore be identified by a sixth comparator (C6) by means of comparison with a sixth reference (Ref6).

A sixth comparator (C6) at the first sub-signal (S2a) of the second analogue signal (S2) (see also FIG. 9) may detect the continuous undershooting of this sixth reference value (Ref6) in the transmission phase (SP) and/or in the receive phase (EP) by comparison with a sixth reference (Ref6) and may thus conclude that the third sub-signal (S2c) of the second analogue signal (S2) and the second sub-signal (S2b) of the second analogue signal (S2) might be short-circuited. The setting of the corresponding sixth comparison signal (v6) may be identified by the (system) control device (CTR) or the digital input circuit (DSI). These then issue a corresponding error signal or a corresponding error message. It should be noted here that the various error cases may be better separated by a plurality of different sixth reference values (Ref6) and possibly further sixth comparators (C6).

Figure 30:
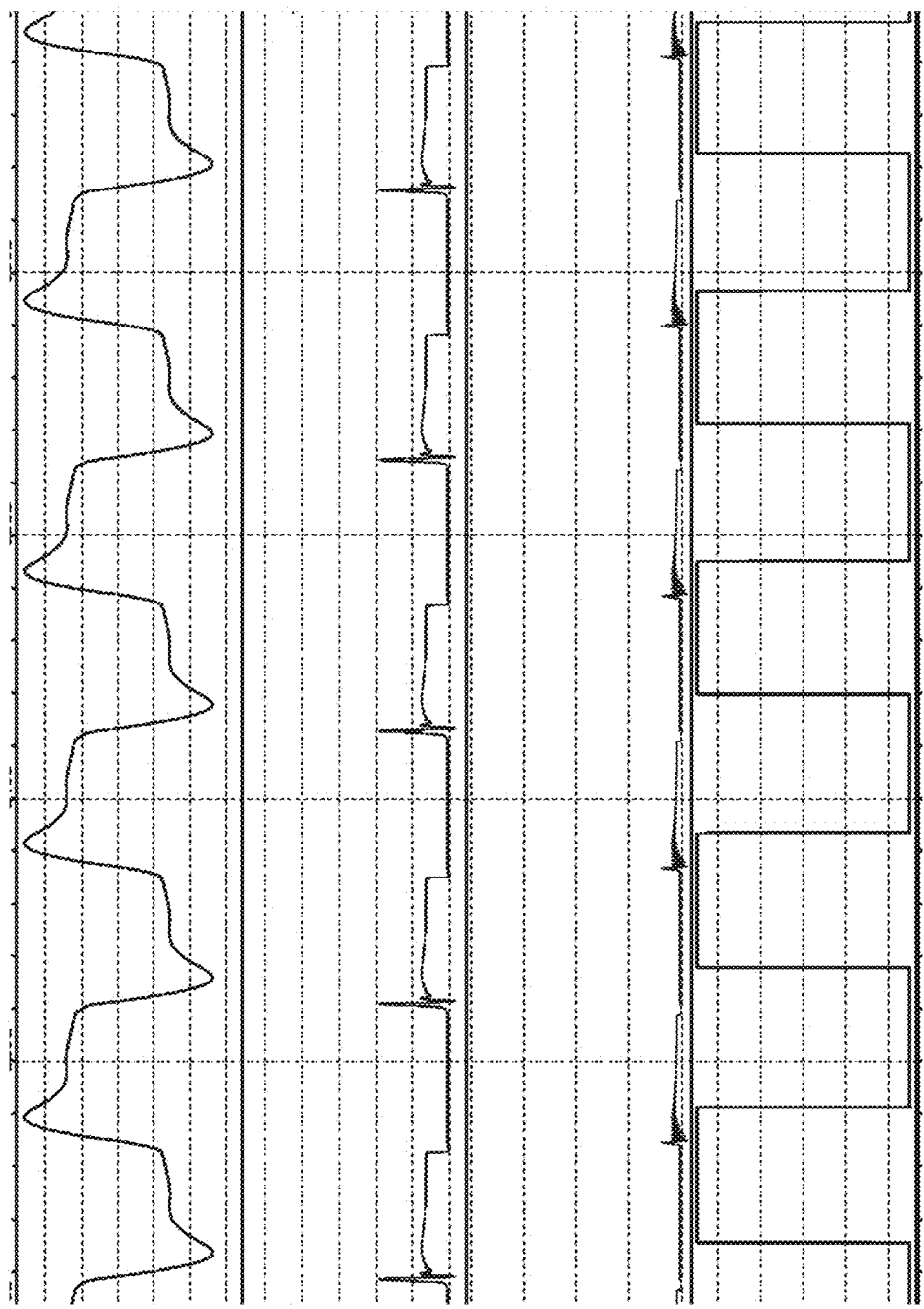
FIG. 30 corresponds to a temporal enlargement of FIG. 29 in the transmission phase (SP)

FIG. 30 corresponds to a temporal enlargement of FIG. 29.

Figure 31:
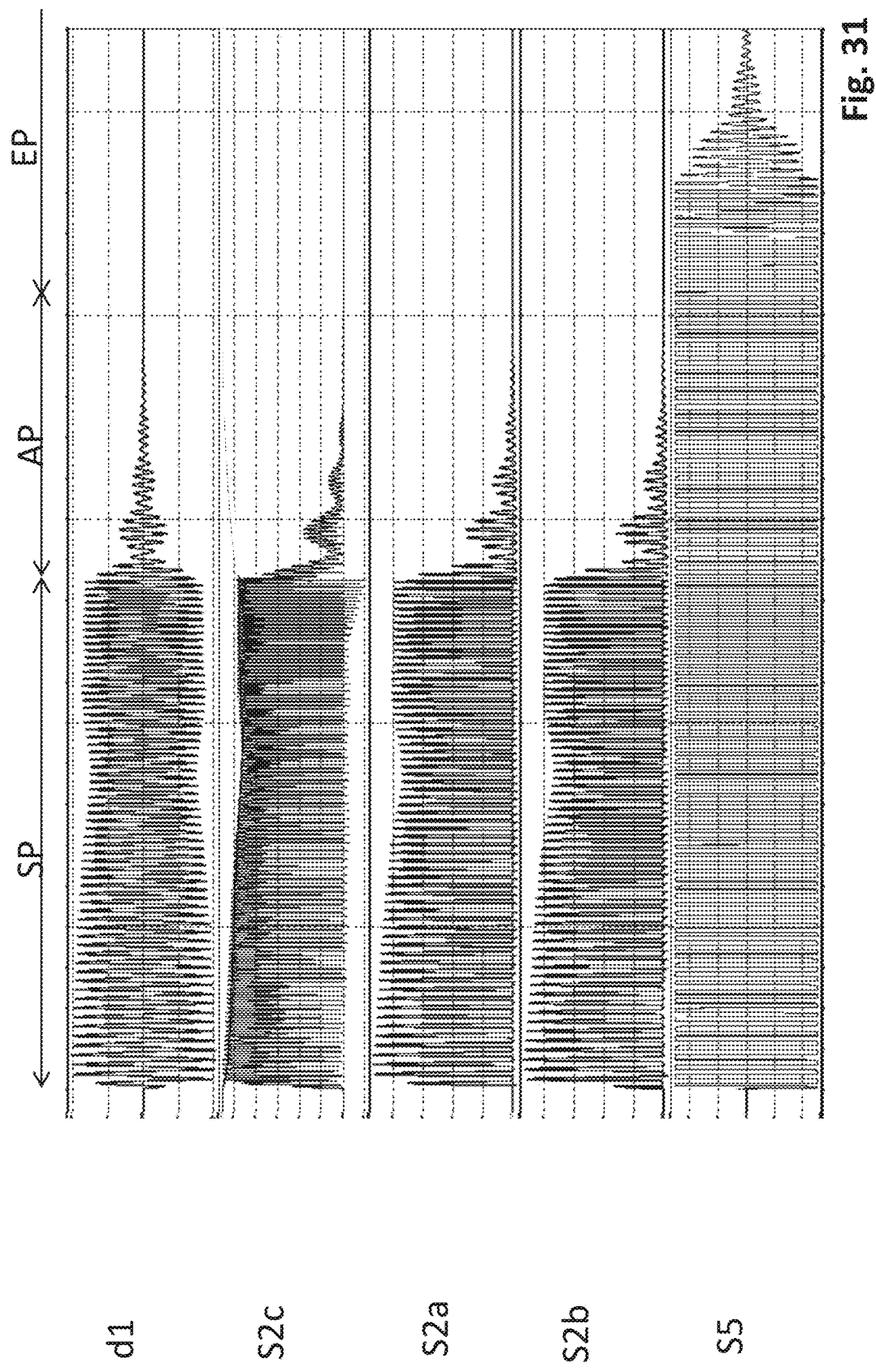
FIG. 31 shows important signals (d1, S2c, S2a, S2b, S5) when transmitting an ultrasound burst in the operating mode, wherein the transducer resistor ($R_{TR}$) is not connected on the secondary side, that is to say either the first sub-signal (S3a) of the third analogue signal (S3) or the second sub-signal (S3b) of the third analogue signal (S3) is not connected to the transducer resistor ($R_{TR}$)

FIG. 31 shows important signals (d1, S2c, S2a, S2b, S5) when transmitting an ultrasound burst in the operating mode, wherein the transducer resistor ($R_{TR}$) is not connected on the secondary side, that is to say either the first sub-signal (S3a) of the third analogue signal (S3) or the second sub-signal (S3b) of the third analogue signal (S3) is not connected to the transducer resistor ($R_{TR}$).

The non-connected transducer resistor ($R_{TR}$) means that the ultrasound transducer (TR) may not reduce the vibration energy stored in it with the start of the decay phase (AP) as quickly as intended. This error is therefore easily detectable by an assessment of the decay time.

Figure 32:
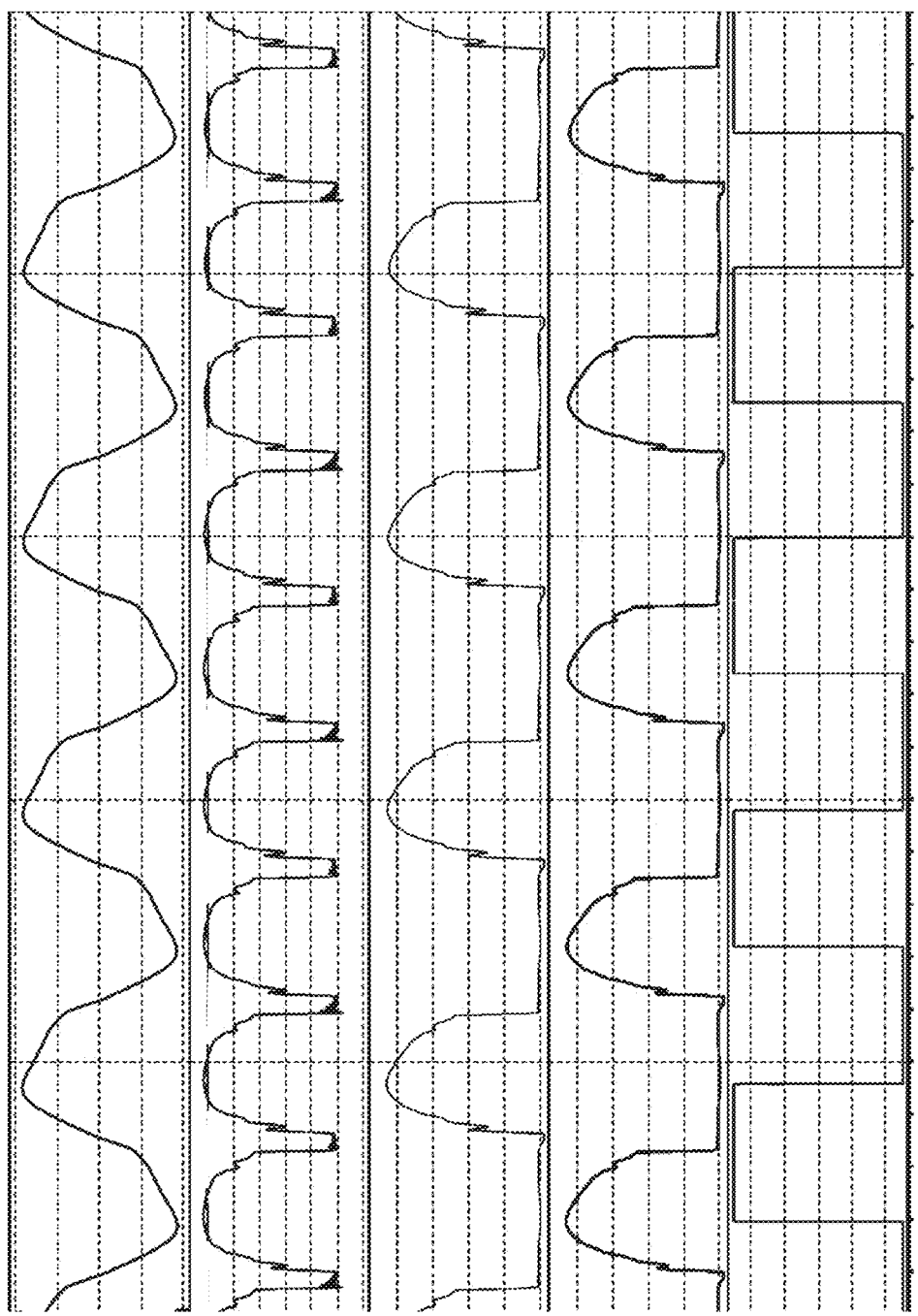
FIG. 32 corresponds to a temporal enlargement of FIG. 31 in the transmission phase (SP)

FIG. 32 corresponds to a temporal enlargement of FIG. 31.

Figure 33:
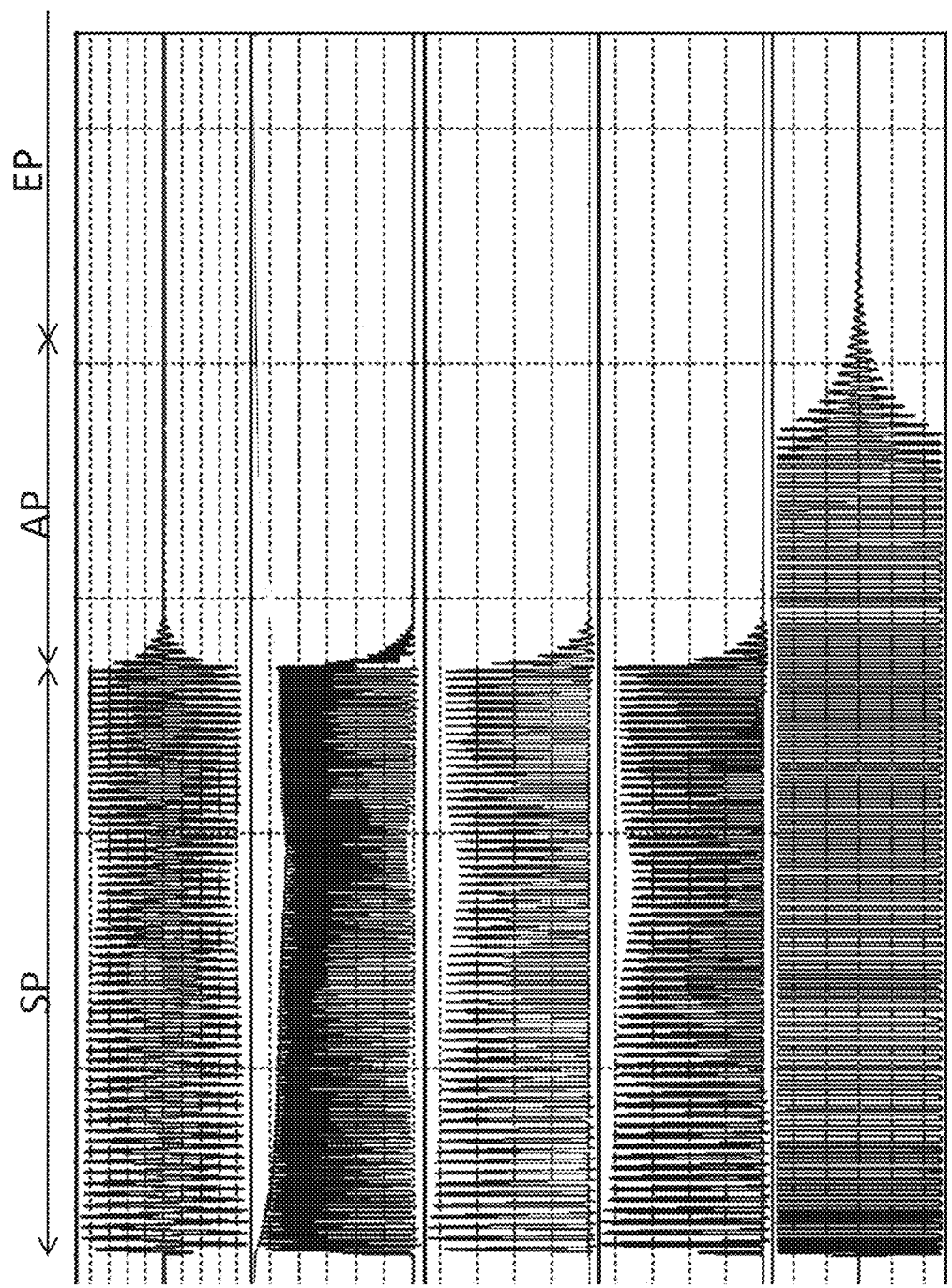
FIG. 33 shows important signals (d1, S2c, S2a, S2b, S5) when transmitting an ultrasound burst in the operating mode, wherein the transducer capacitor ($C_{TR}$) is not connected on the secondary side, that is to say either the first sub-signal (S3a) of the third analogue signal (S3) or the second sub-signal (S3b) of the third analogue signal (S3) is not connected to the transducer capacitor ($C_{TR}$)

FIG. 33 shows important signals (d1, S2c, S2a, S2b, S5) when transmitting an ultrasound burst in the operating mode, wherein the transducer capacitor ($C_{TR}$) is not connected on the secondary side, that is to say either the first sub-signal (S3a) of the third analogue signal (S3) or the second sub-signal (S3b) of the third analogue signal (S3) is not connected to the transducer capacitor ($C_{TR}$).

The non-connected transducer capacitor ($C_{TR}$) results in signal changes that are only detectable with difficulty. The vibration frequency is easily lowered. These changes, however, are only so minimal that these errors therefore are not reliably detectable by an assessment of the decay time or the decay frequency.

Detectability, however, may be attained in other ways. To this end, it is necessary to look at FIG. 34 in detail.

Figure 34:
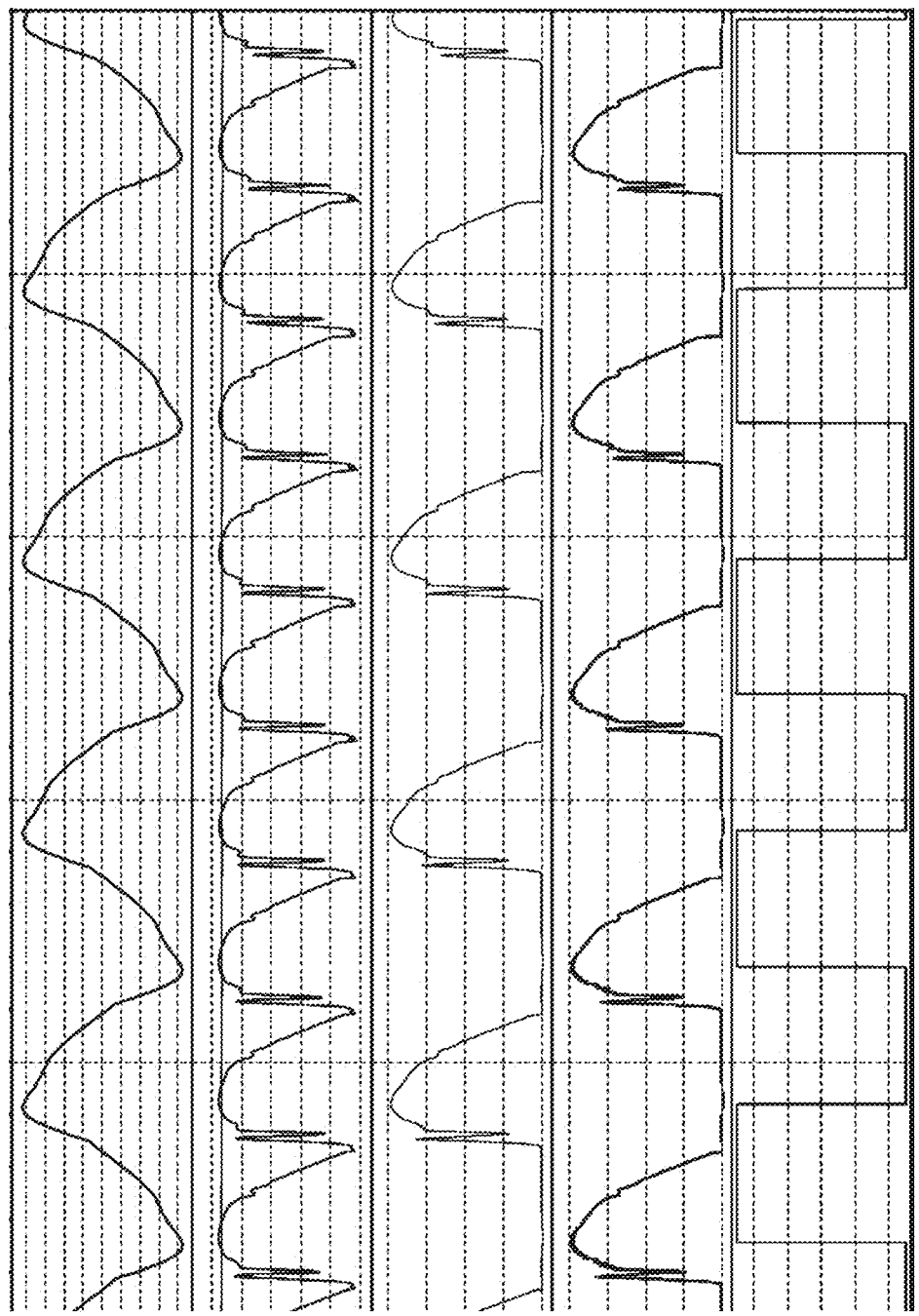
FIG. 34 corresponds to a temporal enlargement of FIG. 33 in the transmission phase (SP)

FIG. 34 corresponds to a temporal enlargement of FIG. 33.

The biggest difference between the normal case of FIG. 12 and the image in FIG. 34 is that the signal at the centre tap of the transmitter (UEB), that is to say the third sub-signal (S2c) of the second analogue signal (S2), in contrast to the normal case (see FIG. 11), is no longer symmetrical in triangular fashion, and instead has a more sawtooth-shaped profile. For example, a transformation into another signal area is therefore expedient for detection of this error. Such a transformation may be, for example, a Fourier transformation, a discrete Fourier transformation, a Laplace transformation, or a wavelet transformation, etc. For example, it is also conceivable to generate a sawtooth reference signal and a triangular signal of identical frequency by means of a PLL and to multiply the third sub-signal (S2c) of the second signal (S2) by these two signals during the transmission phase and then to subject them to low-pass filtering, that is to say consequently to form a scalar product from these two (see also FIGS. 50 to 53). The multiplication by the sawtooth signal should give a result of zero with correct phase position of the generated sawtooth signal, whereas the multiplication by the triangular signal should give a value different from zero with correct phase position of the generated sawtooth signal. (Merely for the sake of completeness: a triangular signal is understood to mean a signal with a temporal amplitude profile, wherein this temporal amplitude profile is characterised by a direct succession of triangular voltage profiles of the signal in question, and wherein these triangles should be approximately isosceles triangles (see also signal A2c_b in FIG. 51). A sawtooth signal is understood to mean a signal with a temporal amplitude profile, wherein this temporal amplitude profile is characterised by a direct succession of triangular voltage profiles of the signal in question, and wherein one limb of such a triangle is significantly steeper than the other limb (see also signal A2c_a in FIG. 51). This steeper limb is preferably almost vertical with respect to the time axis. This calculation may be performed easily in the analogue input circuit (AS) as analogue mixer or in the digital input circuit (DSI)).

In this way, a first value for the non-straight signal component in the third sub-signal (S2c) of the second signal (S2) and a second value for the straight signal component in the third sub-signal (S2c) of the second signal (S2) may be determined.

A corresponding comparison apparatus may compare the first value with an associated reference value for the non-straight signal component and may prompt the issuing of an error signal if this first value lies above the associated reference value for the non-straight signal component.

A further corresponding comparison apparatus may compare the second value with an associated reference value for the straight signal component and may prompt the issuing of an error signal if this second value lies below the associated reference value for the straight signal component. This concept is developed in the descriptions of FIGS. 50 to 53.

Figure 35:
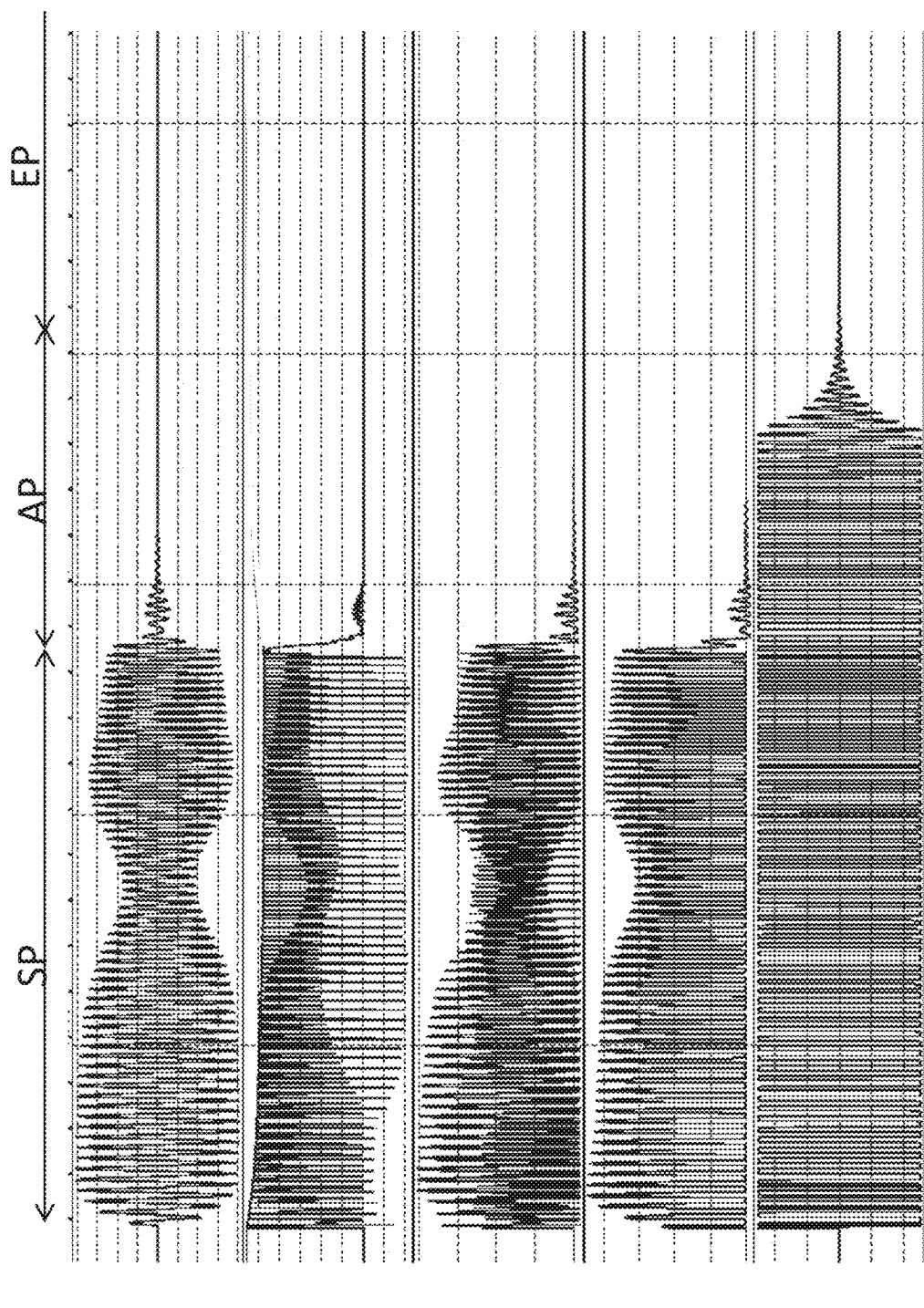
FIG. 35 shows important signals (d1, S2c, S2a, S2b, S5) when transmitting an ultrasound burst in the operating mode, wherein on the primary side there is no control of the driver for the first sub-signal (S2a) of the second analogue signal (S2) in the driver stage (DR)

FIG. 35 shows important signals (d1, S2c, S2a, S2b, S5) when transmitting an ultrasound burst in the operating mode, wherein on the primary side there is no control of the driver for the first sub-signal (S2a) of the second analogue signal (S2) in the driver stage (DR).

This error may occur for example when the driver transistor for the first sub-signal (S2a) of the second signal (S2) in the driver unit (DR) is not functioning. This transistor is then unable to pull the first sub-signal (S2a) of the second analogue signal (S2) to ground.

One possibility for ascertaining this error is to check this "pulling to ground" of the relevant transistor a few µs after this transistor has been switched on, with the aid of the sixth comparator (C6). To this end, the sixth comparator (C6) (see FIG. 9) compares the voltage level at the first sub-signal (S2a) of the second signal (S2) with a sixth reference value (Ref6). If this is not undershot at this moment in time shortly after the switching on of the transistor, there is thus an error present.

Another possibility lies again in the analysis of the straight and non-straight signal component, as presented in the description of FIG. 34, however now it is the first sub-signal (S2a) of the second analogue signal (S2) that is analysed.

A further possibility lies in the fact that, on account of the symmetry of the apparatus, the signal profile of the first sub-signal (S2a) of the second signal (S2) and the signal profile of the second sub-signal (S2b) of the second signal (S2) must be the same as one another apart from a phase shift of 180° (a transmitter (UEB) according to FIG. 7 is presupposed). It is therefore conceivable, in one or more periods, to detect one or more values of the signal profile of the first sub-signal (S2a) of the second signal (S2) at certain moments in time and to detect, phase-shifted by 180° thereto at the corresponding moments in time, one or more values of the signal profile of the second sub-signal (S2b) of the second signal (S2) at certain moments in time and to then calculate and sum the differences of the corresponding pairs formed in each case of a value of the signal profile of the first sub-signal (S2a) of the second signal (S2) and a value of the signal profile of the second sub-signal (S2b) of the second signal (S2) at the corresponding moments in time. If the difference or the value of the difference overshoots a predetermined value, the symmetry of the apparatus is thus disrupted, and an error signal may be triggered. This calculation is preferably performed in the digital input circuit (DSI) or in the control device (CTR). Such an apparatus is then suitable for detecting the symmetry of two sub-signals (S2a, S2b) of the second analogue signal (S2). This concept will be explained in greater detail in conjunction with FIG. 49.

Figure 36:
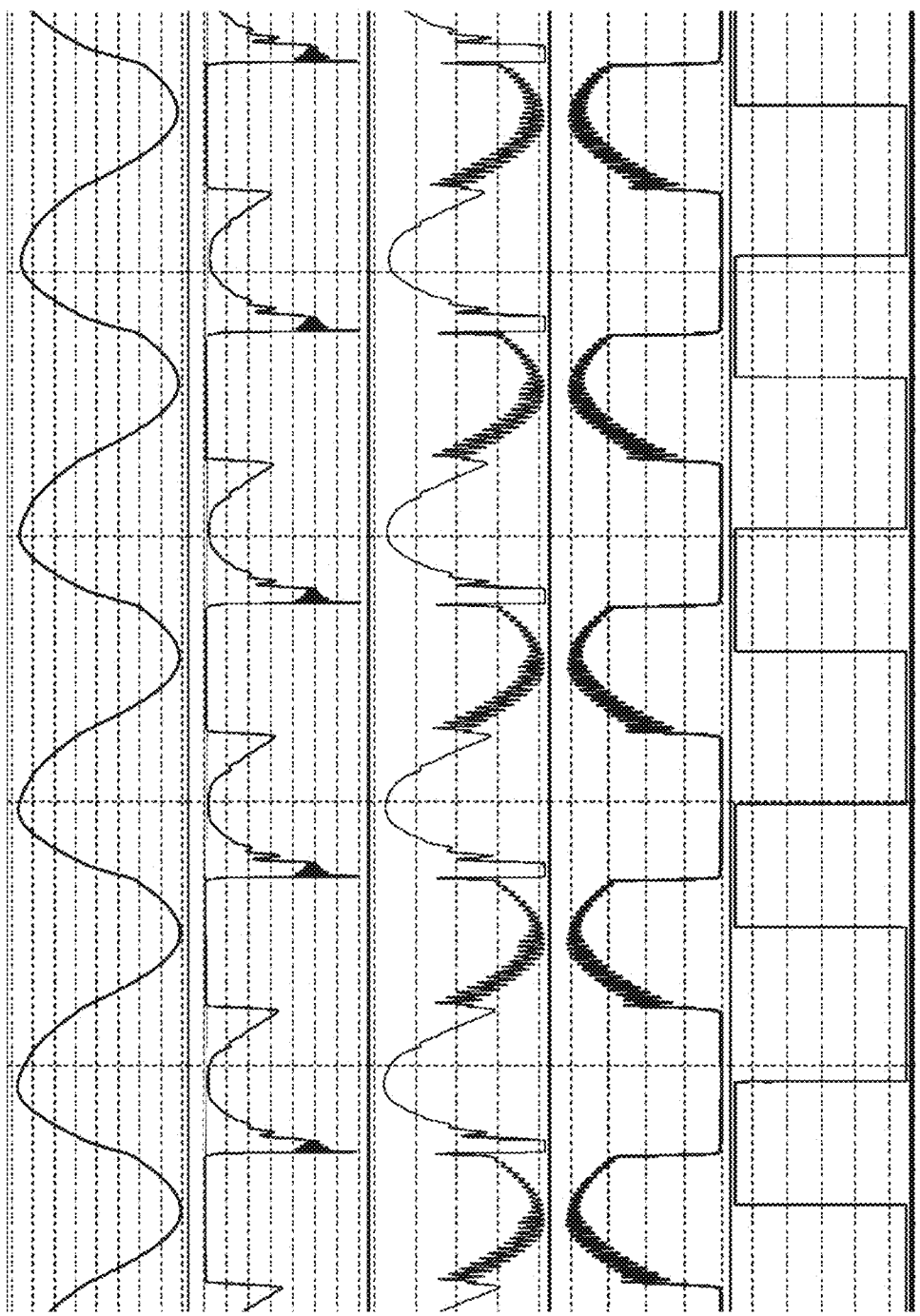
FIG. 36 corresponds to a temporal enlargement of FIG. 35 in the transmission phase (SP)

FIG. 36 corresponds to a temporal enlargement of FIG. 35.

Figure 37:
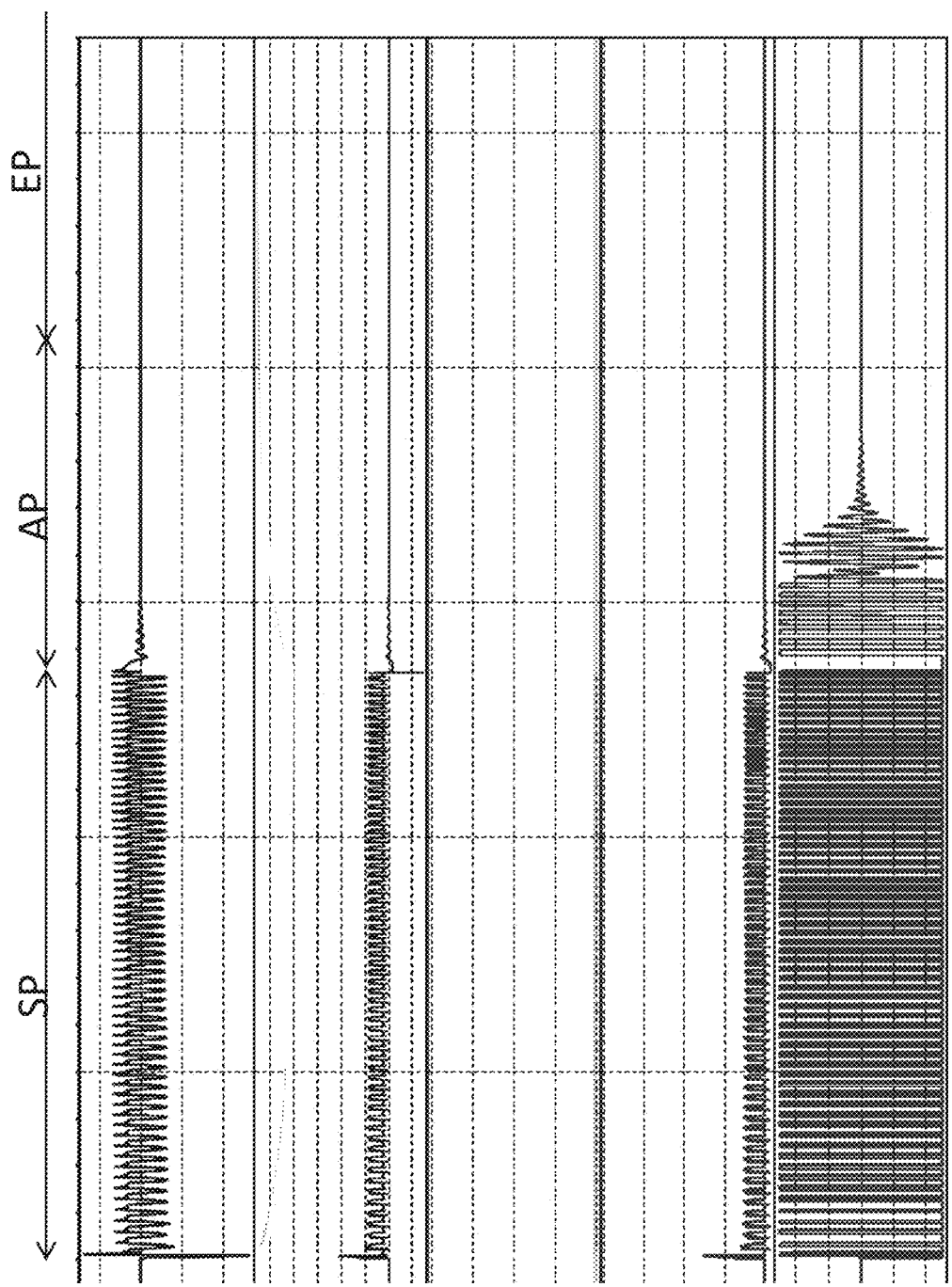
FIG. 37 shows important signals (d1, S2c, S2a, S2b, S5) when transmitting an ultrasound burst in the operating mode, wherein on the primary side the driver for the first sub-signal (S2a) of the second analogue signal (S2) is short-circuited to ground in the driver stage (DR)

FIG. 37 shows important signals (d1, S2c, S2a, S2b, S5) when transmitting an ultrasound burst in the operating mode, wherein on the primary side the driver for the first sub-signal (S2a) of the second analogue signal (S2) is short-circuited to ground in the driver stage (DR).

Symptoms

The driver short-circuited to ground on the primary side for the first sub-signal (S2a) of the second analogue signal (S2) in the driver stage (DR) means that the ultrasound transducer (TR) is not sufficiently supplied with energy. This error is detectable by an assessment of the decay time and the vibration frequency.

Figure 38:
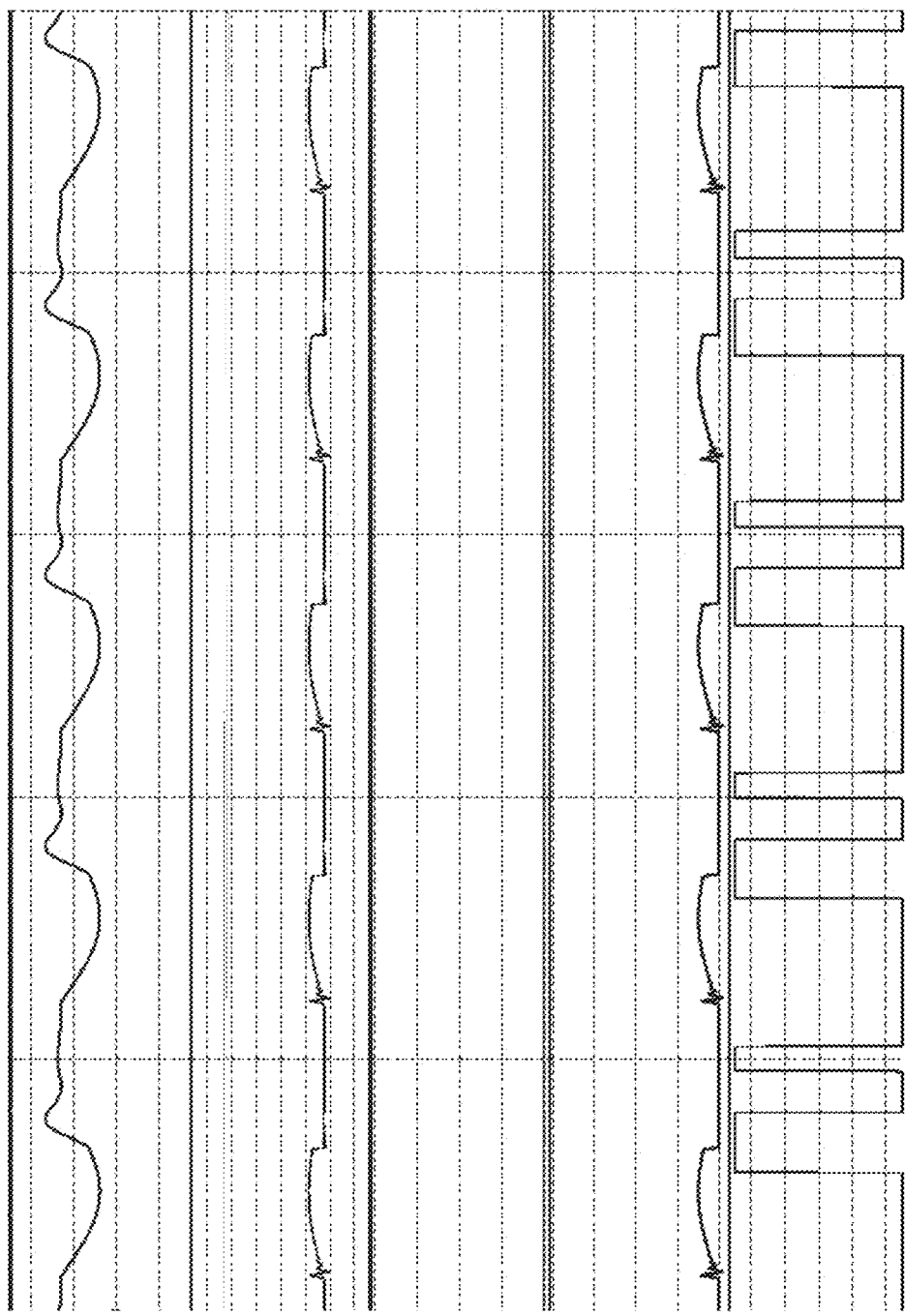
FIG. 38 corresponds to a temporal enlargement of FIG. 37 in the transmission phase (SP)

FIG. 38 corresponds to a temporal enlargement of FIG. 37.

Figure 39:
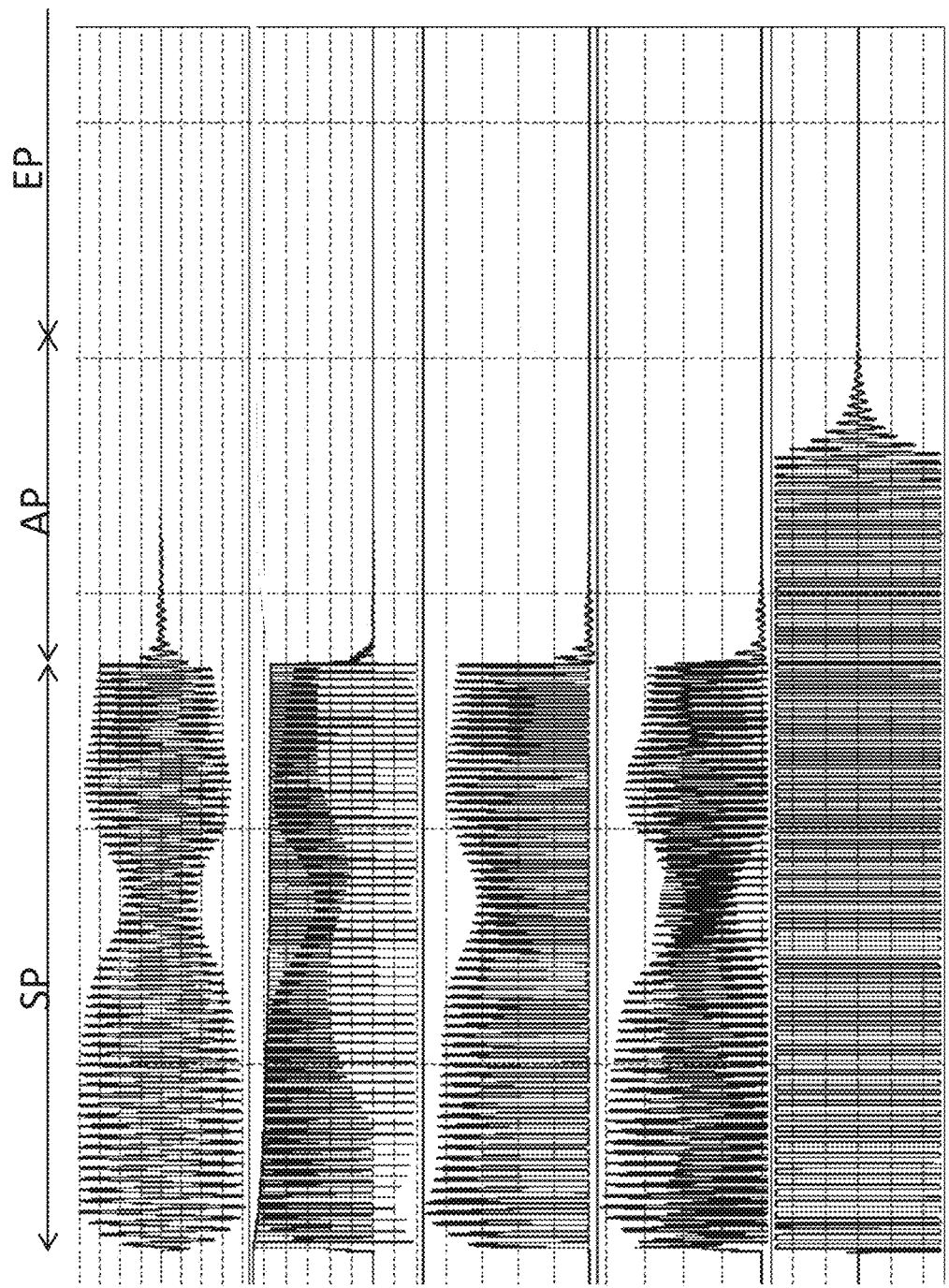
FIG. 39 shows important signals (d1, S2c, S2a, S2b, S5) when transmitting an ultrasound burst in the operating mode, wherein on the primary side there is no control of the driver for the second sub-signal (S2b) of the second analogue signal (S2) in the driver stage (DR)

FIG. 39 shows important signals (d1, S2c, S2a, S2b, S5) when transmitting an ultrasound burst in the operating mode, wherein on the primary side there is no control of the driver for the second sub-signal (S2b) of the second analogue signal (S2) in the driver stage (DR).

This error may occur for example if the driver transistor for the second sub-signal (S2b) of the second signal (S2) in the driver unit (DR) is not functioning. This transistor is then unable to Paul the second sub-signal (S2b) of the second analogue signal (S2) to ground.

One possibility for ascertaining this error is to check this "pulling to ground" of the relevant transistor a few µs after this transistor has been switched on, with the aid of the fourth comparator (C4). To this end, the fourth comparator (C4) (see FIG. 9) compares the voltage level at the second sub-signal (S2b) of the second signal (S2) with a fourth reference value (Ref4). If this is not undershot at this moment in time shortly after the switching on of the transistor, there is thus an error present.

Another possibility lies again in the analysis of the straight and non-straight signal component, as presented in the description of FIG. 34, however now it is the second sub-signal (S2b) of the second analogue signal (S2) that is analysed.

A further possibility lies in the fact that, on account of the symmetry of the apparatus, the signal profile of the first sub-signal (S2a) of the second signal (S2) and the signal profile of the second sub-signal (S2b) of the second signal (S2) must be the same as one another apart from a phase shift of 180° (a transmitter (UEB) according to FIG. 7 is presupposed). It is therefore conceivable, in one or more periods, to detect one or more values of the signal profile of the first sub-signal (S2a) of the second signal (S2) at certain moments in time and to detect, phase-shifted by 180° thereto at the corresponding moments in time, one or more values of the signal profile of the second sub-signal (S2b) of the second signal (S2) at certain moments in time and to then calculate and sum the differences of the corresponding pairs formed in each case of a value of the signal profile of the first sub-signal (S2a) of the second signal (S2) and a value of the signal profile of the second sub-signal (S2b) of the second signal (S2) at the corresponding moments in time. If the difference or the value of the difference overshoots a predetermined value, the symmetry of the apparatus is thus disrupted, and an error signal may be triggered. This calculation is preferably performed in the digital input circuit (DSI) or in the control device (CTR). Such an apparatus is then suitable for detecting the symmetry of two sub-signals (S2a, S2b) of the second analogue signal (S2). This concept will be explained in greater detail in conjunction with FIG. 49.

Figure 40:
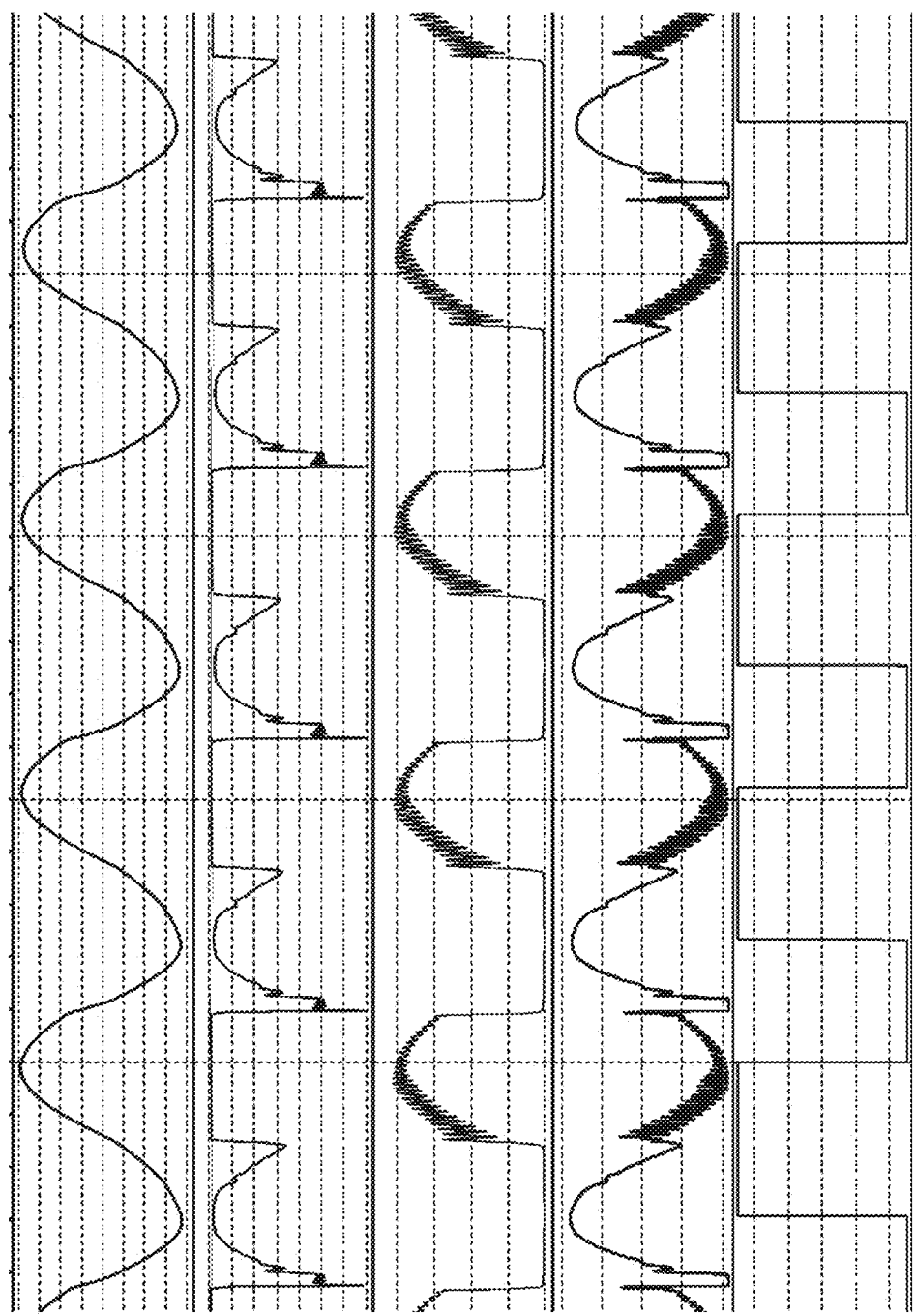
FIG. 40 corresponds to a temporal enlargement of FIG. 39 in the transmission phase (SP)

FIG. 40 corresponds to a temporal enlargement of FIG. 39.

Figure 41:
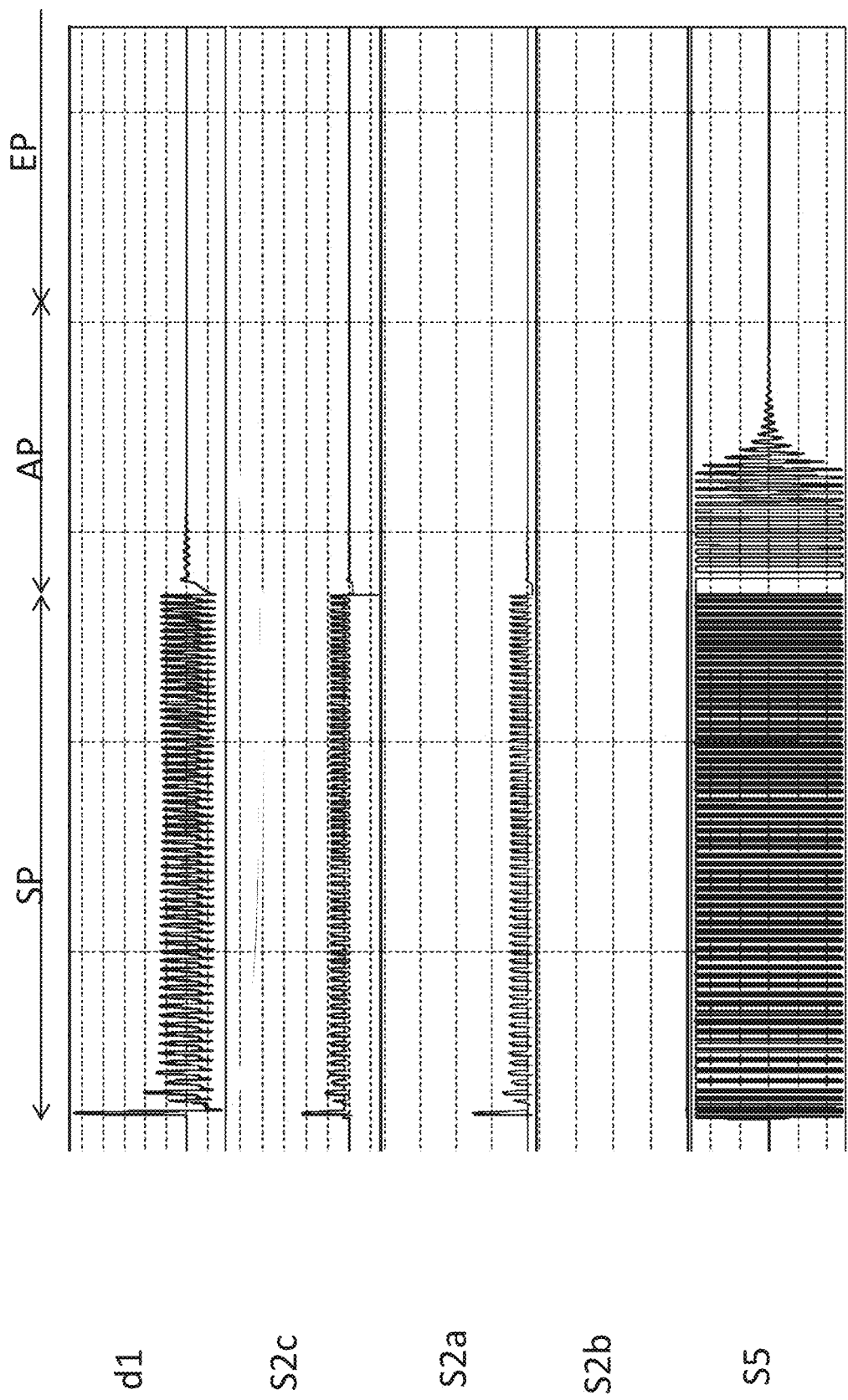
FIG. 41 shows important signals (d1, S2c, S2a, S2b, S5) when transmitting an ultrasound burst in the operating mode, wherein on the primary side the driver for the second sub-signal (S2b) of the second analogue signal (S2) is short-circuited to ground in the driver stage (DR)

FIG. 41 shows important signals (d1, S2c, S2a, S2b, S5) when transmitting an ultrasound burst in the operating mode, wherein on the primary side the driver for the second sub-signal (S2b) of the second analogue signal (S2) is short-circuited to ground in the driver stage (DR).

Symptoms

The driver short-circuited to ground on the primary side for the second sub-signal (S2b) of the second analogue signal (S2) in the driver stage (DR) means that the ultrasound transducer (TR) is not sufficiently supplied with energy. This error is detectable by an assessment of the decay time and the vibration frequency.

Figure 42:
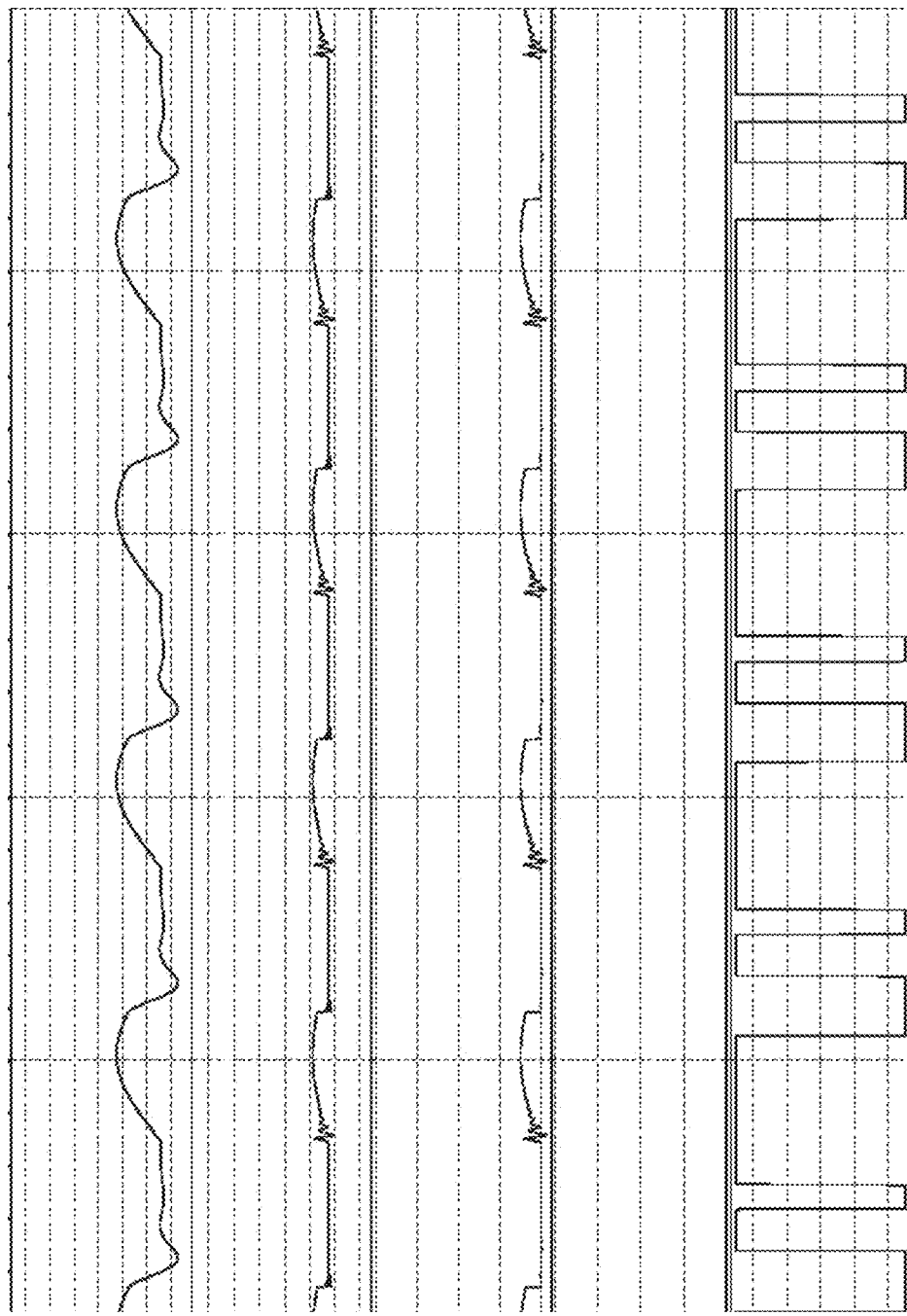
FIG. 42 corresponds to a temporal enlargement of FIG. 41 in the transmission phase (SP)

FIG. 42 corresponds to a temporal enlargement of FIG. 41.

Figure 43:
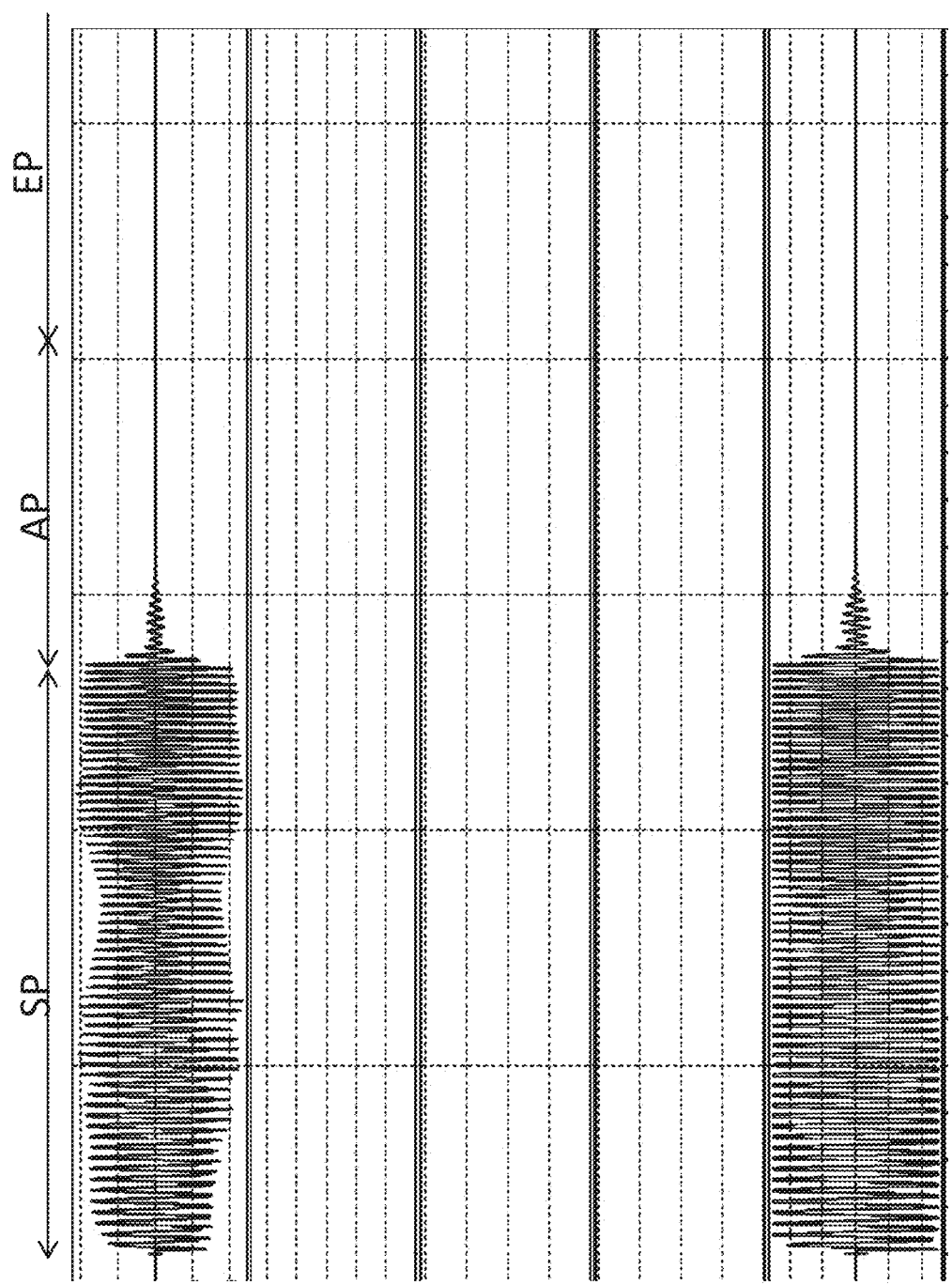
FIG. 43 shows important signals (d1, S2c, S2a, S2b, S5) when transmitting an ultrasound burst in the operating mode, wherein on the primary side there is no control of the driver for the third sub-signal (S2c) of the second analogue signal (S2) in the driver stage.

FIG. 43 shows important signals (d1, S2c, S2a, S2b, S5) when transmitting an ultrasound burst in the operating mode, wherein on the primary side there is no control of the driver for the third sub-signal (S2c) of the second analogue signal (S2) in the driver stage (DR).

The resultant error image may be detected both by an assessment of the decay time and by a measurement with the aid of a sixth comparator (C6) at the first sub-signal (S2a) of the second analogue signal (S2).

Figure 44:
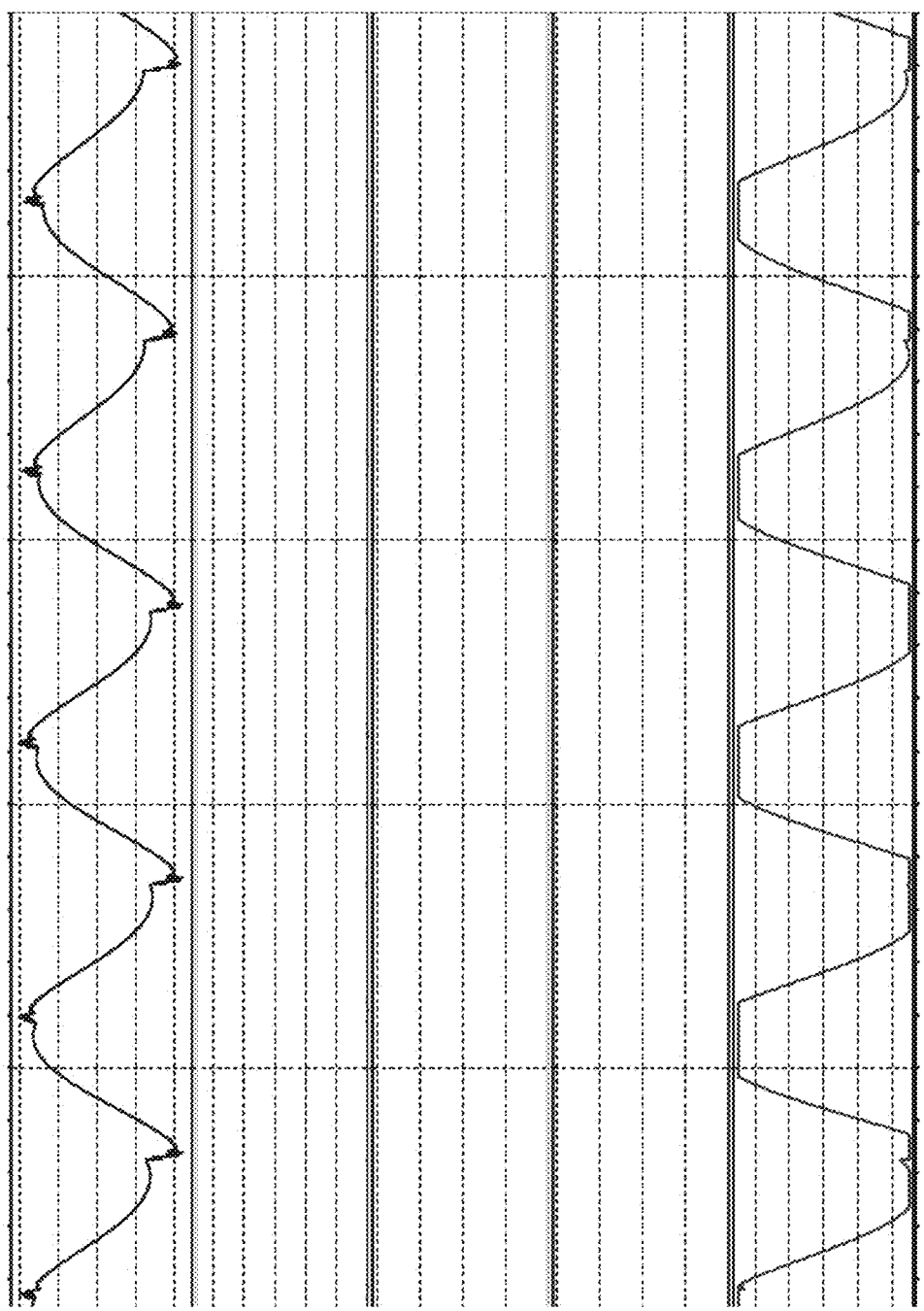
FIG. 44 corresponds to a temporal enlargement of FIG. 43 in the transmission phase (SP)

FIG. 44 corresponds to a temporal enlargement of FIG. 43.

Figure 45:
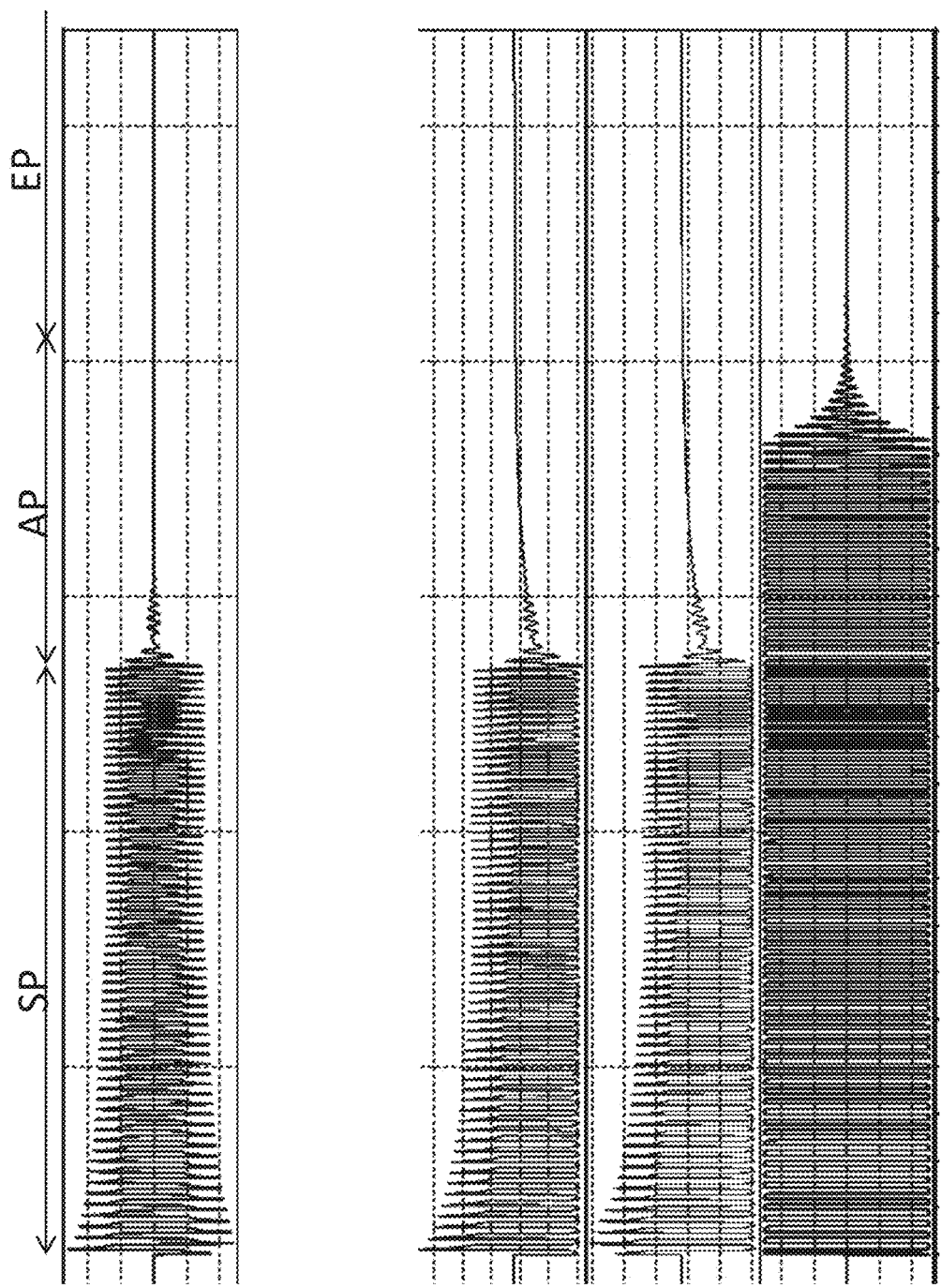
FIG. 45 shows important signals (d1, S2c, S2a, S2b, S5) when transmitting an ultrasound burst in the operating mode, wherein on the primary side the driver for the third sub-signal (S2c) of the second analogue signal (S2) is short-circuited to ground in the driver stage (DR)

FIG. 45 shows important signals (d1, S2c, S2a, S2b, S5) when transmitting an ultrasound burst in the operating mode, wherein on the primary side the driver for the third sub-signal (S2c) of the second analogue signal (S2) is short-circuited to ground in the driver stage (DR).

In the event of a low-resistance short circuit of the driver transistor, the transmission current is significantly increased. This may be detected on the basis of the decay time.

Detection by a sixth comparator (C6), however, by comparison of the first sub-signal (S2a) of the second signal (S2) with a sixth reference value (Ref6) in the receive phase (EP) is particularly advantageous. In the normal case the level there is zero. In this error case the level there is increased. This may be detected by assessing the sixth comparison signal (v6) generated during the comparison and may be used as a triggering event for generating an error signal by the digital input circuit (DSI) or the (system) control device (CTR).

Detection by a fourth comparator (C4), however, by comparison of the second sub-signal (S2b) of the second signal (S2) with a fourth reference value (Ref4) in the receive phase (EP) is also advantageous. In the normal case the level there is zero. In this error case the level there is increased. This may be detected by assessing the fourth comparison signal (v4) generated during the comparison and may be used as a triggering event for generating an error signal by the digital input circuit (DSI) or the (system) control device (CTR).

Figure 46:
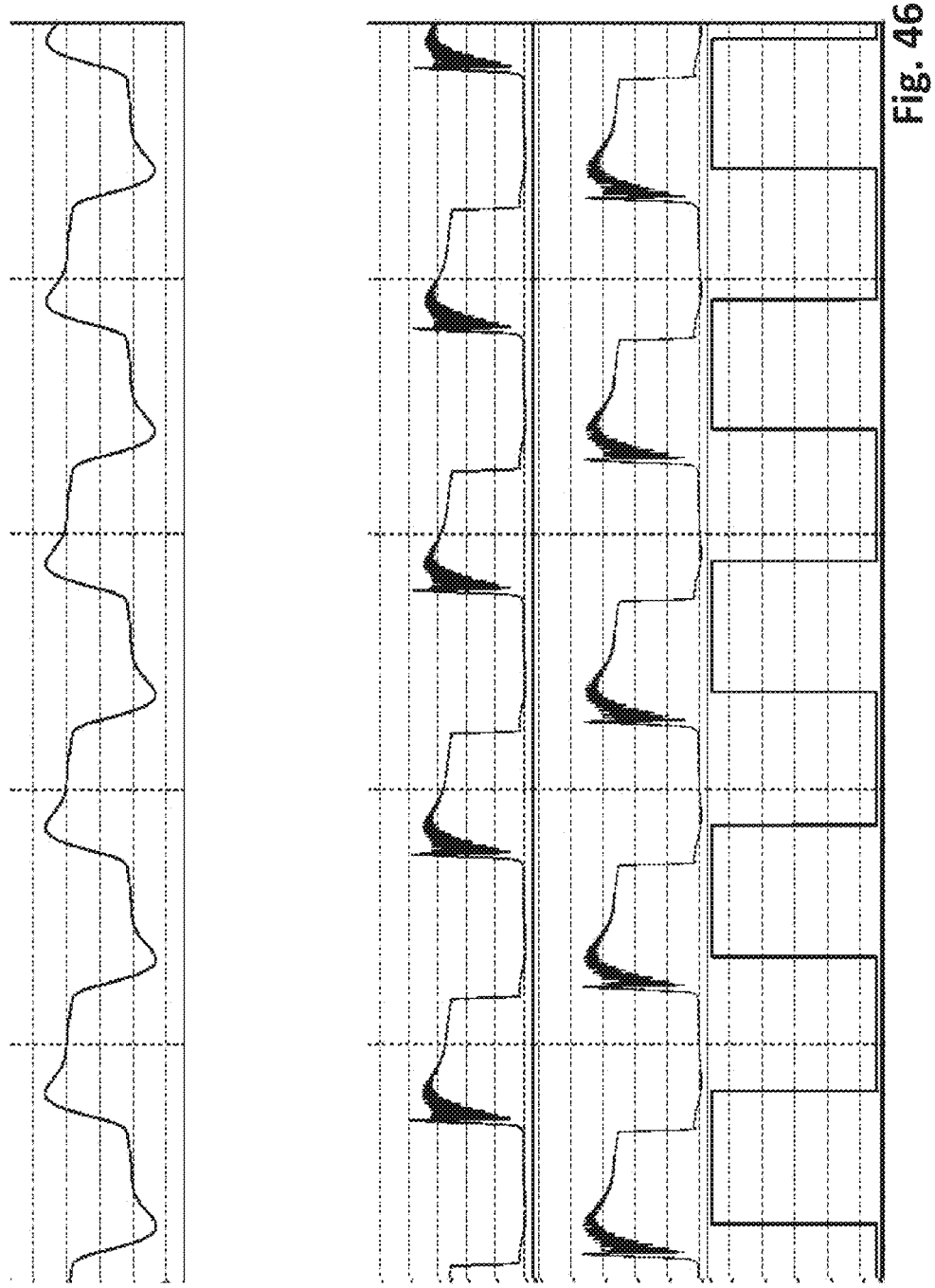
FIG. 46 corresponds to a temporal enlargement of FIG. 45 in the transmission phase (SP)

FIG. 46 corresponds to a temporal enlargement of FIG. 45.

Figure 47:
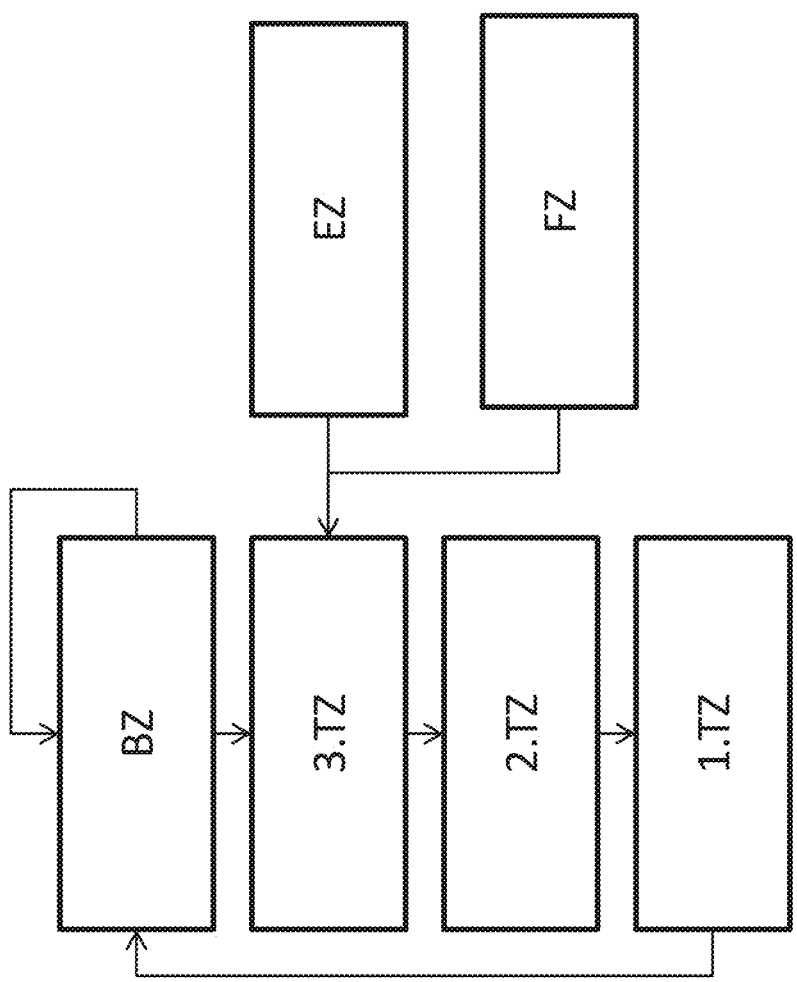
FIG. 47 shows the preferred test procedure.

FIG. 47 shows the preferred test procedure of a self-test of the proposed measuring system (SS). Once the proposed measuring system (SS) has been switched on or reset, the proposed measuring system (SS) is in a switched-on mode (EZ). In this switched-on mode (EZ), the proposed measuring system (SS) preferably does not output any measured values, but only status messages regarding the progress of the switch-on procedure via the data interface (IO).

The proposed measuring system (SS) then changes into the third test mode (3.TZ). In this mode, the proposed measuring system (SS) tests the correct functioning of the digital signal generating unit (DSO) and of the digital input circuit (DSI). The signal profile corresponds here to FIG. 5. The digital signal generating unit (DSO) generates predetermined test patterns and test sequences. In particular, critical safety-relevant error cases may be simulated. In this regard, it may then be checked whether the digital input circuit (DSI) responds correctly in safety-relevant fashion and correctly detects the simulated safety-relevant errors. Conversely, the signal generation by the digital signal generating unit (DSO) may be checked. In this way, the digital signal generating unit (DSO) and digital input circuit (DSI) check, preferably in accordance with requirements of the control device (CTR), all test cases for the digital signal path. If an error occurs, the proposed measuring system (SS) thus preferably changes into an error mode (FZ), which may not be left easily and in which there are typically no measured values or measurement results forwarded to superordinate units without special marking.

In this regard, the switched-on mode (EZ) is incidentally a specific error mode (FZ). A plurality of error modes may thus also be provided, which are assumed depending on the determined error. The purely digital test has the advantage that here the gates may be precisely checked, and therefore the failure of individual gates is identifiable. The test coverage of the self-test of these circuit parts is increased.

If, however, all checks in the third test mode (3.TZ) are performed successfully, the proposed measuring system thus switches into the second test mode (2.TZ). The internal signal path of the proposed measuring system (SS) is hereby now modified such that it corresponds to FIG. 4. The internal signal path of the proposed measuring system (SS) here by now also comprises the analogue circuit parts. If an error now occurs, this may thus be attributed to the analogue circuit parts, since the digital circuit parts have already been deemed to be "error-free". As before, the digital signal generating unit (DSO) and the digital input circuit (DSI) in this way again check, preferably in accordance with specifications by the control device (CTR), all test cases for the analogue and digital signal path, which are now combined. If an error occurs, the proposed measuring system (SS) thus preferably changes back into an error mode (FZ) which may not be easily left and in which there are typically no measured values or measurement results forwarded to superordinate units without special marking. The digital signal generating unit (DSO) again generates predetermined test patterns and test sequences which are tailored to this combined analogue/digital signal path in the second test mode. In particular, critical safety-relevant error cases may again be simulated. In this regard, it may then be checked whether the digital input circuit (DSI) in combination with the analogue input circuit (AS) responds correctly in safety-relevant fashion and correctly detects the simulated safety-relevant errors. Conversely, the signal generation may check whether the digital signal generating unit (DSO) and the driver stage (DR) function correctly. Furthermore, various safety-relevant configurations of a possible subsequent transmission channel may be simulated, and the simulation results may be assessed.

If, however, all checks in the second test mode (2.TZ) are performed successfully, the proposed measuring system (SS) thus changes into the first test mode (1.TZ). The internal signal path of the proposed measuring system (SS) is now hereby modified such that it corresponds to FIG. 3. The signal path thus now comprises also the measuring unit (TR), that is to say typically the ultrasound transducer (TR), and the measuring channel (CN).

The digital signal generating unit (DSO) now generates test signals and test patterns, which, once they have passed through the signal path and reach the measuring unit (TR), that is to say the ultrasound transducer (TR), interact therewith. The response signal of the measuring unit (TR), that is to say the ultrasound transducer (TR), is fed into the returning signal path and, once it has passed through this signal path, is assessed by the digital input circuit (DSI).

In addition, it is expedient, especially in this first test mode (1.TZ), to monitor the signals of the measuring unit (TR), that is to say the ultrasound transducer (TR), for example by comparators or other apparatuses. Here as well, the digital signal generating unit (DSO) may generate particularly critical test signals and test patterns for particularly safety-relevant cases. If an error occurs, the proposed measuring system thus changes back into an error mode (FZ). The checks may include, for example, amplitudes, amplitude differences (with and without phase shift) and signal components such as harmonic components.

Figure 48:
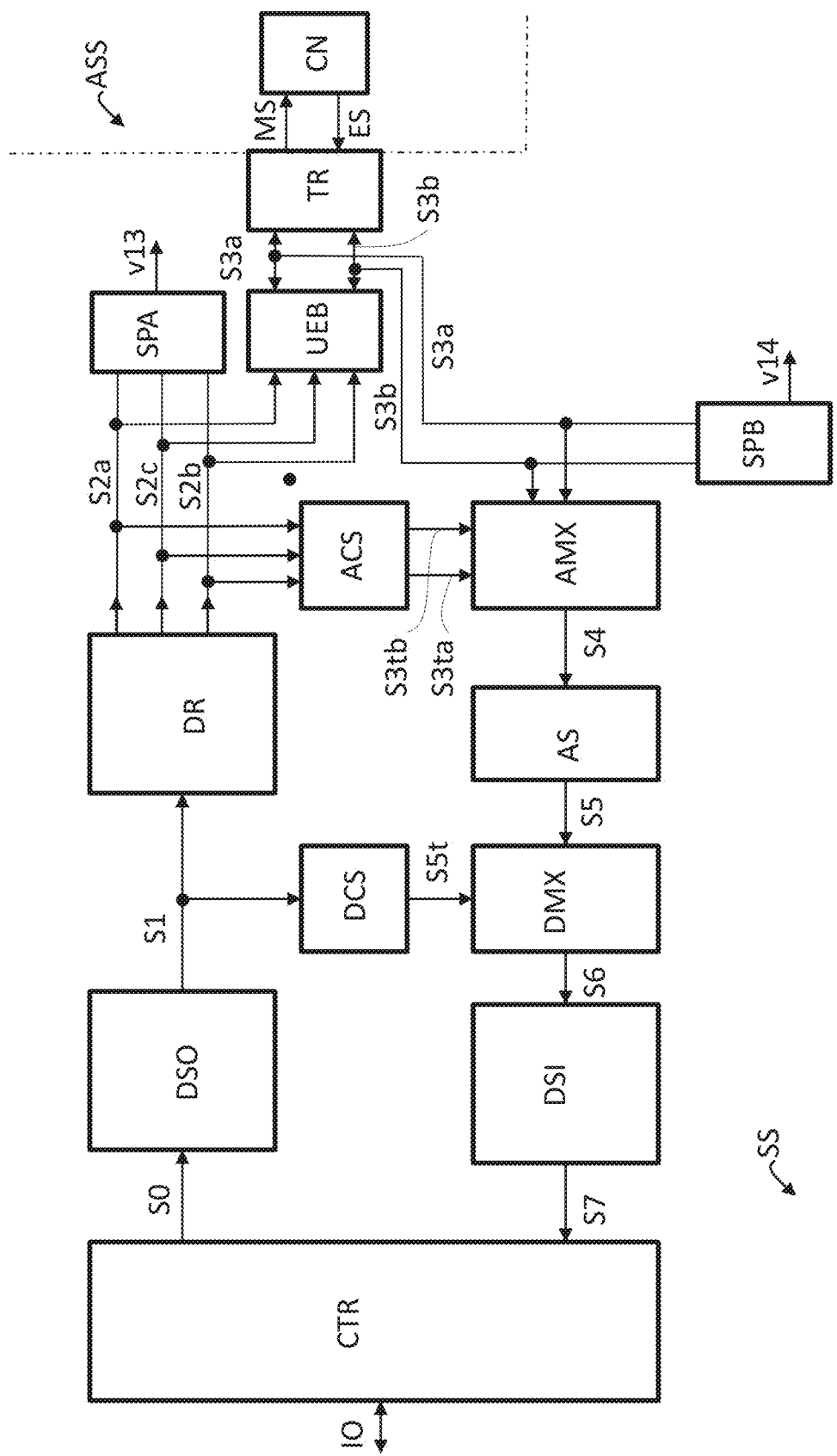
FIG. 48 shows the apparatus with use of a symmetry check.

FIG. 48 corresponds to the greatest possible extent to FIG. 8, with the difference that FIG. 48 does not comprise the comparators (C1, C2, C3) or the difference amplifier (D1). These, however, may be combined with FIG. 48. FIG. 48 makes use of the fact that the measuring unit (TR), that is to say the ultrasound transducer (TR), and the transmitter (UEB) are generally embodied symmetrically. This symmetry, in reality, is not perfect, and therefore the symmetry comparison must be provided with a threshold value.

In FIG. 48 a first symmetry checking apparatus (SBA) is therefore provided, which checks the symmetry of two or more sub-signals (S2a, S2b, S2c) of the second analogue signal (S2) and generates a corresponding thirteenth comparison result signal (v13) depending on the result of this comparison. The first symmetry checking apparatus (SBA) preferably implements internal phase shifts in such a way that the resultant shifted sub-signals should match.

Furthermore, a second symmetry checking apparatus (FPB) is provided in FIG. 48 and checks the symmetry of two (or possibly more—not discussed here) sub-signals (S3a, S3b) of the third analogue signal (S3) and generates a corresponding fourteenth comparison result signal (v14) depending on the result of this comparison. The second symmetry checking apparatus (FPB) preferably likewise implements internal phase shifts as appropriate, in such a way that the resultant shifted sub-signals should match. This check preferably takes place only in the transmission phase (SP). A phase shift of 180° corresponds here to an inversion, for example by an inverting amplifier with amplification −1. In this regard, such an inverting amplifier is also a phase shifter in the sense of this disclosure when a phase shift of 180° is required.

Figure 49:
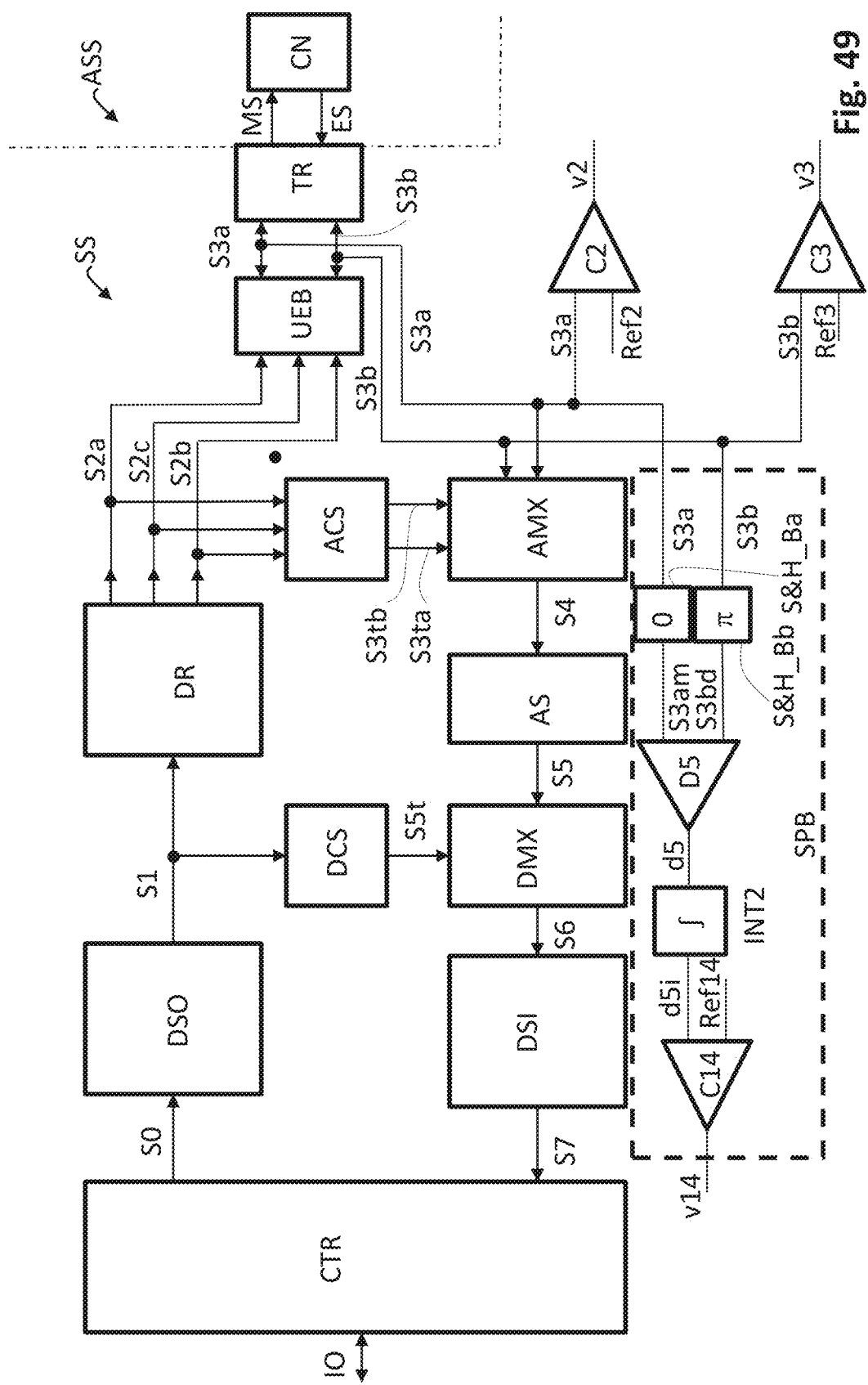
FIG. 49 shows the apparatus corresponding to FIG. 48 with a specific example of a symmetry check for the secondary side of the transmitter (UEB)

FIG. 49 shows the apparatus corresponding to FIG. 48 with specific exemplary example of a symmetry check for the secondary side of the transmitter (UEB). The second symmetry checking apparatus (SPB) is connected to the first sub-signal (S3a) of the third analogue signal (S3) and the second sub-signal (S3b) of the third analogue signal (S3). A precondition for the use of this second symmetry checking apparatus (SPB) is that, firstly, the signal path part formed of transmitter (UEB), ultrasound transducer (TR) and ultrasound channel (CN) is constructed absolutely symmetrically and, secondly, is loaded symmetrically by the analogue multiplexer (AMX) and the analogue input circuit (AS), and, thirdly, is controlled symmetrically by the driver stage (DR) and the first sub-signal (S2a) of the second analogue signal (S2), the second sub-signal (S2b) of the second analogue signal (S2) and the third sub-signal (S2c) of the second analogue signal (S2). A preferred exemplary symmetrical control by these sub-signals of the second analogue signal (S2) may be inferred from FIG. 12. The second symmetry checking apparatus (SPB) is marked in FIG. 49 by a dashed box. It comprises a first phase shifter (S&H_Ba), which is preferably embodied as a holding circuit, and at a first moment in time (Z1) buffers the momentary value of the first sub-signal (S3a) Of the third analogue signal (S3) and outputs it as first sub-signal (S3am) of the third buffered signal (S3m). It comprises a second phase shifter (S&H_Bb), which is likewise preferably embodied as a holding circuit, and at a second moment in time (Z2) buffers the momentary value of the second sub-signal (S3b) of the third analogue signal (S3) and outputs it as second sub-signal (S3bm) of the third buffered signal (S3m). It is now presupposed that the first sub-signal (S3a) of the third analogue signal (S3) and the second sub-signal (S3b) of the third analogue signal (S3) are periodic and have a vibration period (T), wherein the first sub-signal (S3a) of the third analogue signal (S3) is phase-shifted in relation to the second sub-signal (S3b) of the third analogue signal (S3) by 180° (=n), that is to say is the inversion thereof. The temporal distance between the first moment in time (Z1) and the second moment in time (Z2) is selected such that it corresponds to the value (n+0.5)*T, wherein n is a positive integer or zero. A fifth difference amplifier (D5) forms the fifth difference signal (d5) from the first sub-signal (S3am) of the third buffered signal (S3m) and the second sub-signal (S3bm) of the third buffered signal (S3m). A second integrator (INT2), which may also be a low-pass filter, integrates the fifth difference signal (d5) to form an integrated fifth difference signal (d5i). The second integrator (INT2) is preferably deleted again after m clock periods (T), wherein m is a positive integer. The fifth difference signal (d5) is preferably rectified, such that only the amplitude of the fifth difference signal (d5) is integrated. The integrated fifth difference signal (d5i) is then a measure for the asymmetry within the m clock periods (T). A fourteenth comparator (C-14) compares the integrated fifth difference signal (d5i) with a 14 reference value (Ref14) and generates the fourteenth comparison result signal (v14). This is assessed typically by the digital input circuit (DSI) and/or the control device (CTR), which generate an error message as appropriate. This check is preferably performed only in the transmission phase (SP).

If the integrated fifth difference signal (d5i) is intended to represent a minimum measure for the symmetry, the fifth difference signal (d5i), multiplied by −1, must be output by the fifth difference amplifier (D5) and the second integrator (INT2) not deleted again after m clock periods (T), but instead preloaded to a positive preload value. If the integrated fifth difference signal (d5i) undershoots the fourteenth reference value (Ref14), the fourteenth comparator (C14) thus generates the fourteenth comparison result signal (v14), so as to signal an inadequate symmetry.

Figure 50:
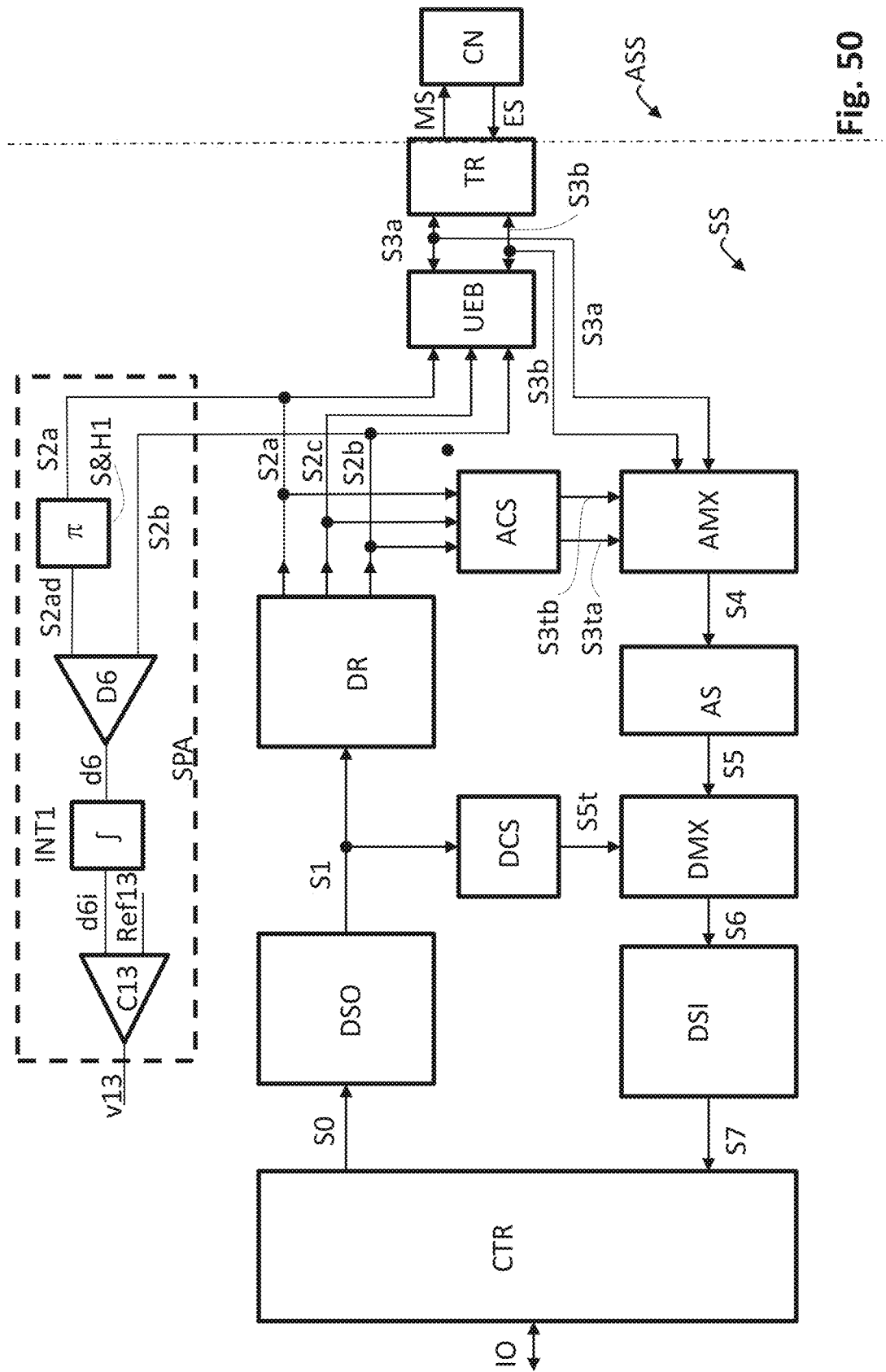
FIG. 50 shows the apparatus corresponding to FIG. 48 with a specific example of a symmetry check for the primary side of the transmitter (UEB)

FIG. 50 shows the apparatus corresponding to FIG. 48 with specific example of a symmetry check for the primary side of the transmitter (UEB). The first symmetry checking apparatus (SPA) is connected to the first sub-signal (S2a) of the second analogue signal (S2) and the second sub-signal (S2b) of the second analogue signal (S2). A precondition for the use of this first symmetry checking apparatus (SPA) is that, firstly, the signal path part formed of transmitter (UEB), ultrasound transducer (TR) and ultrasound channel (CN) is constructed absolutely symmetrically and, secondly, is loaded symmetrically by the analogue multiplexer (AMX) and the analogue input circuit (AS), and, thirdly, is controlled symmetrically by the driver stage (DR) and the first sub-signal (S2a) of the second analogue signal (S2), the second sub-signal (S2b) of the second analogue signal (S2) and the third sub-signal (S2c) of the second analogue signal (S2) in the normal case. A preferred exemplary symmetrical control by these sub-signals of the second analogue signal (S2) may be inferred from FIG. 12. The first symmetry checking apparatus (SPA) is marked in FIG. 50 by a dashed box. It comprises a first phase shifter (S&H_Aa), which is preferably embodied as a holding circuit, and at a first moment in time (Z1) buffers the momentary value of the first sub-signal (S2a) Of the second analogue signal (S2) and outputs it as first sub-signal (S2am) of the second buffered signal (S2m). It comprises a second phase shifter (S&H_Ab), which is likewise preferably embodied as a holding circuit, and at a second moment in time (Z2) buffers the momentary value of the second sub-signal (S2b) of the second analogue signal (S2) and outputs it as second sub-signal (S2bm) of the second buffered signal (S2m). It is now presupposed that the first sub-signal (S2a) of the second analogue signal (S2) and the second sub-signal (S2b) of the second analogue signal (S2) are periodic and have a vibration period (T), wherein the first sub-signal (S2a) of the second analogue signal (S2) is phase-shifted in relation to the second sub-signal (S2b) of the second analogue signal (S2) by 180° (=n), that is to say is the inversion thereof. The temporal distance between the first moment in time (Z1) and the second moment in time (Z2) is selected such that it corresponds to the value (n+0.5)*T, wherein n is a positive integer or zero. A sixth difference amplifier (D6) forms the sixth difference signal (d6) from the first sub-signal (S2am) of the second buffered signal (S2m) and the second sub-signal (S2bm) of the second buffered signal (S2m). A second integrator (INT1), which may also be a low-pass filter, integrates the sixth difference signal (d6) to form an integrated sixth difference signal (d6i). The first integrator (INT1) is preferably deleted again after m clock periods (T), wherein m is a positive integer. The sixth difference signal (d6) is preferably rectified, such that only the amplitude of the sixth difference signal (d6) is integrated. The integrated sixth difference signal (d6i) is then a measure for the asymmetry within the m clock periods (T). A thirteenth comparator (C13) compares the integrated sixth difference signal (d6i) with a thirteenth reference value (Ref13) and generates the thirteenth comparison result signal (v13). This is assessed typically by the digital input circuit (DSI) and/or the control device (CTR), which generate an error message as appropriate. This check is preferably performed only in the transmission phase (SP).

If the integrated sixth difference signal (d6i) is intended to represent a minimum measure for the symmetry, the sixth difference signal (d6i), multiplied by −1, must be output by the sixth difference amplifier (D6) and the first integrator (INT1) not deleted again after m clock periods (T), but instead preloaded to a positive preload value. If the integrated sixth difference signal (d6i) undershoots the thirteenth reference value (Ref13), the thirteenth comparator (C13) thus generates the thirteenth comparison result signal (v13), so as to signal an inadequate symmetry.

Figure 51:
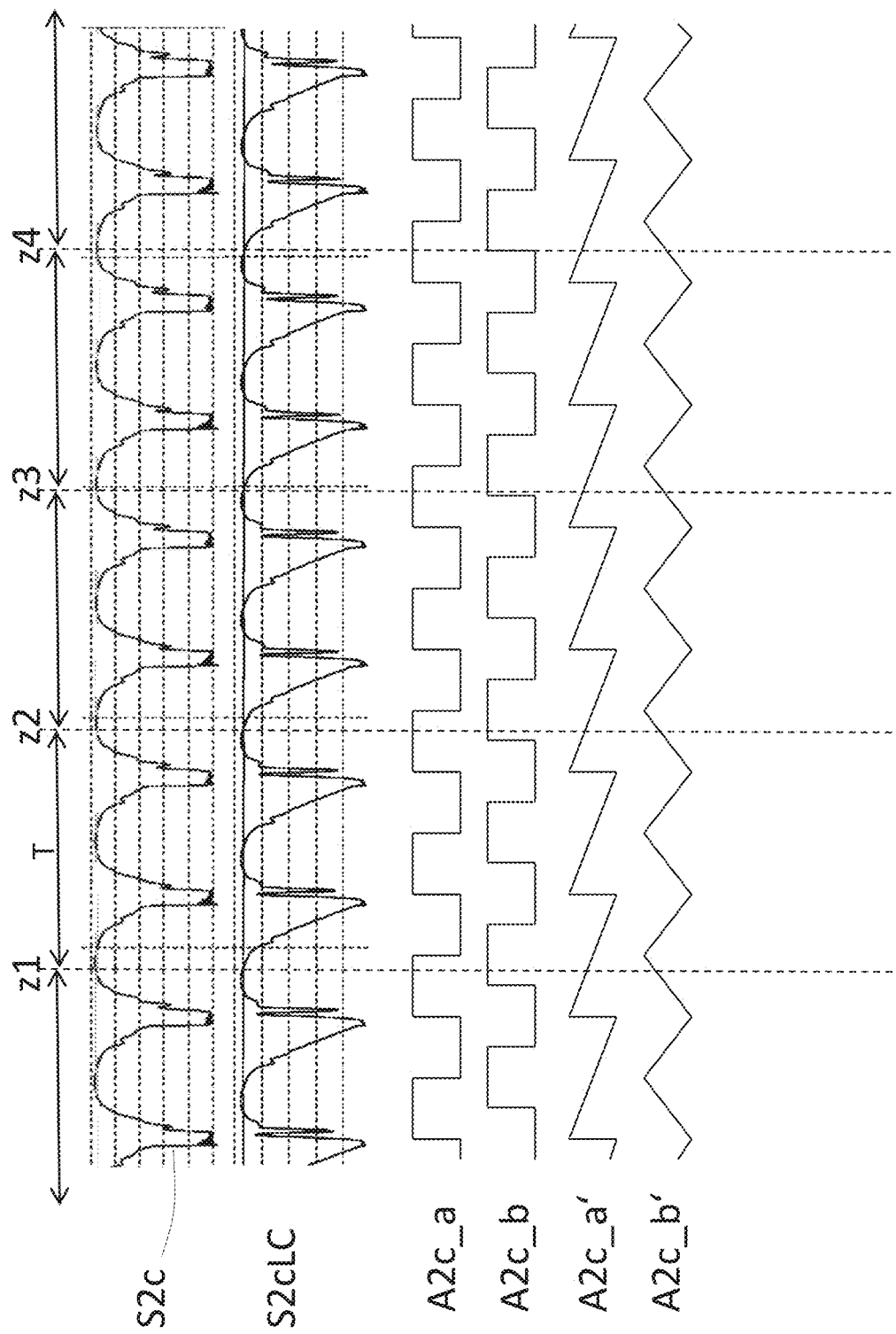
FIG. 51 compares, by way of example, the undisturbed third sub-signal (S2c) of the second analogue signal (S2) (see also FIG. 11) with the disturbed third sub-signal (S2c) of the second analogue signal (S2) with a capacitor disconnection of the transducer capacitor ($C_{TR}$) (see FIG. 34) and shows exemplary analysis signals.

FIG. 51 compares, by way of example, the undisturbed third sub-signal (S2c) of the second analogue signal (S2) (see also FIG. 11) with the disturbed third sub-signal (S2c) of the second analogue signal (S2) with a capacitor disconnection of the transducer capacitor ($C_{TR}$) (see FIG. 34) and shows exemplary analysis signals.

It can be seen that the symmetrical form of the undisturbed third sub-signal (S2c) of the second analogue signal (S2) converts into a more sawtooth-shaped form in the form of the disturbed third sub-signal (S2cLC) of the second analogue signal (S2) by the disconnection of the transducer capacitor ($C_{TR}$). The disturbed third sub-signal (S2cLC) of the second analogue signal (S2) clearly has a harmonic. The basic concept for detecting this error is therefore to generate two coefficients by forming, periodically, a first scalar product between a suitable first internal analysis signal (A_a) and the signal (ZA) to be analysed on the one hand and by forming, periodically, a second scalar product between a suitable second internal analysis signal (A_a) and the signal (ZA) to be analysed on the other hand, that is to say a first internal coefficient signal (s3a) and a second internal coefficient signal (s3b), and by comparing these with one another and, in the event of deviations from the expected value, generating an internal comparison signal (v_X), which may then be assessed by the control device (CTR) and/or the digital input circuit (DSI) in order to generate an error message. In the specific case of FIG. 51, two possible analysis signals for analysis of the second sub-signal (S2c) of the second analogue signal (S2) are proposed by way of example. The first analysis signal pair consists of two digital signals, which may be generated preferably and particularly easily in the digital signal generating unit (DSO). These are a first exemplary analysis signal (A2c_a) for the coefficient monitoring in the coefficient monitoring sub-apparatus (KUE2c) for the third sub-signal (S2c) of the second analogue signal (S2) and a second exemplary analysis signal (A2c_b) for the coefficient monitoring in the coefficient monitoring sub-apparatus (KUE2c) for the third sub-signal (S2c) of the second analogue signal (S2). The first exemplary analysis signal (A2c_a) in this example is more similar to the disturbed third signal (S2cLC) of the second analogue signal (S2). The second exemplary analysis signal (A2c_b) in this example is more similar to the undisturbed third sub-signal (S2c) of the second analogue signal (S2). In this example the first exemplary analysis signal (A2c_a) is phase-shifted by −90° in relation to the second exemplary analysis signal (A2c_b). In this example, these are glass sinusoidal-like and cosinusoidal-like signals. When developing the proposal it was identified that a disconnection of the transducer capacitor ($C_{TR}$) changes the configuration of the inherent vibration frequencies of the system, which is still symmetrical per se, formed of the transmitter (UEB), transducer resistor ($R_{TR}$), "transducer capacitor ($C_{TR}$)" and in a transducer (TRi), such that no longer is only the fundamental vibration present, but other vibration modes are then also excited. If sinusoidal-shaped and cosinusoidal-shaped signals were used, the first internal coefficient signal (s3a) and the second internal coefficient signal (s3b) would correspond the Fourier coefficients.

Figure 52:
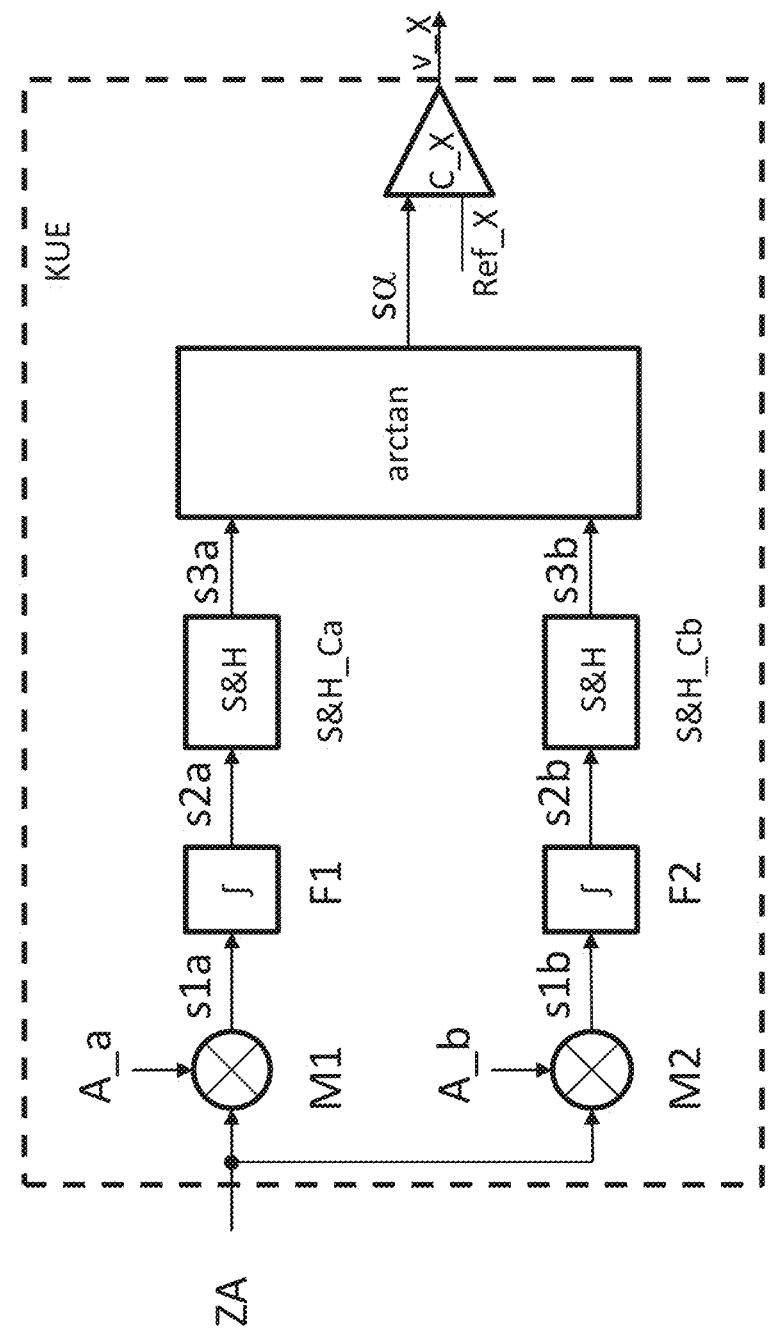
FIG. 52 shows, by way of example, a possible inner structure of an analogue coefficient-monitoring sub-apparatus (KUE)

Furthermore, FIG. 52 shows an alternative pair of possible analysis signals. What are shown are an alternative first exemplary analysis signal (A2c_a') for the coefficient monitoring in the coefficient monitoring sub-apparatus (KUE2c) for the third sub-signal (S2c) of the second analogue signal (S2) and an alternative second exemplary analysis signal (A2c_b') for the coefficient monitoring in the coefficient monitoring sub-apparatus (KUE2c) for the third sub-signal (S2c) of the second analogue signal (S2). The alternative first exemplary analysis signal (A2c_a') in this example is a sawtooth signal and is thus more similar to the disturbed third sub-signal (S2cLC) of the second analogue signal (S2). The alternative second exemplary analysis signal (A2c_b') in this example is a triangular signal and is thus more similar to the undisturbed third sub-signal (S2c) of the second analogue signal (S2). In contrast to the previous example, however, in relation to the implementation of the scalar products proposed in FIG. 52, the alternative first exemplary analysis signal (A2c_a') for the coefficient monitoring in the coefficient monitoring sub-apparatus (KUE2c) for the third sub-signal (S2c) of the second analogue signal (S2) and the alternative second exemplary analysis signal (A2c_b') for the coefficient monitoring in the coefficient monitoring sub-apparatus (KUE2c) for the third sub-signal (S2c) of the second analogue signal (S2) are no longer orthogonal to one another. Rather, they contain components of one another in respect of this scalar product. The analysis signals may also be understood as a stringing together of analysis-signal-specific wavelets.

The alternative first exemplary analysis signal (A2c_a') for the coefficient monitoring in the coefficient monitoring sub-apparatus (KUE2c) for the third sub-signal (S2c) of the second analogue signal (S2) then consists of a temporal stringing together of individual sawtooth-shaped wavelets, wherein one wavelet would comprise one tooth.

The alternative second exemplary analysis signal (A2c_b') the coefficient monitoring in the coefficient monitoring sub-apparatus (KUE2c) for the third sub-signal (S2c) of the second analogue signal (S2) then consists of a temporal stringing together of individual triangular wavelets, wherein one wavelet would comprise an isosceles triangle.

Depending on the purpose of the analysis, other wavelets may also be selected. Since errors at the transmitter (UEB), the transducer resistor ($R_{TR}$), the transducer capacitor ($C_{TR}$) and the inner transducer (TRi) do not always destroy the symmetry, the change to the spectral properties of the combination of these components may be monitored in this way.

It is thus possible, inter alia, to reliably detect largely symmetrical transmitter short circuits of the transmitter (UEB), deviations of the effective resistance of the transducer resistor ($R_{TR}$), changes to the effective capacitance of the transducer capacitor (CTR) and changes to the impedance of the inner ultrasound transducer (TRi) if these have effects on relevant spectral properties of the combination of these components.

FIG. 52 shows, by way of example, a possible inner structure of an analogue coefficient-monitoring sub-apparatus (KUE). Other implementations are possible. The signal to be analysed (ZA) is multiplied in this example by the first multiplier (M1) by the first internal analysis signal (A_a) to give the first filter input signal (s1a) and in the second multiplier (M2) to give the second filter input signal (sib). The first analysis signal (A_a) for example may assimilate the normal operating case, whereas the second analysis signal (A_b) for example may assimilate a defective operating case. The first filter input signal (s1a) is filtered by the first filter (F1) to give the first filter output signal (s2a). The first filter (F1) is preferably an integrator or low-pass filter. The second filter input signal (sib) is filtered by the second filter (F2) to give the second filter output signal (s2b). The first filter (F1) is preferably an integrator or low-pass filter. The first internal sample-and-hold unit (S&H_Ca) samples the first internal filter output signal (S2a) at the temporal end (FIG. 51: for example moments in time z1, z2, z3, z4) of one or more complete periods T of the signal to be analysed (ZA) (see FIG. 1) and thus forms the first internal coefficient signal (S3a). The second internal sample-and-hold unit (S&H_Cb) samples the second internal filter output signal (S2b) at the temporal end (FIG. 51: for example moments in time z1, 22, 23, z4) of one or more complete periods T of the signal to be analysed (ZA) (see FIG. 51), and thus forms the second internal coefficient signal (S3b).

These samples are preferably taken only in the transmission phase (SP) or at selected time periods within the transmission phase (SP). The first internal sample-and-hold unit (S&H_Ca) and of the second internal sample-and-hold unit (S&H_Cb) are controlled preferably by the digital signal generating unit (DSO).

The angle calculation unit (arctan) generates the angle signal (sa) from the first internal coefficient signal (S3a) and the second internal coefficient signal (S3b). The angle signal (sα) preferably represents the arctan or the acrccot of the ratio of the level of the first internal coefficient signal (S3a) and of the second internal coefficient signal (S3b). Approximations and other assessments (for example simple division, etc.) are conceivable.

The internal comparator (C_X) compares the level of the angle signal (sa) with the internal reference value (Ref_X). Depending on the result of this comparison, the internal comparator (C_X) generates an internal comparison result signal (V_X).

Figure 53:
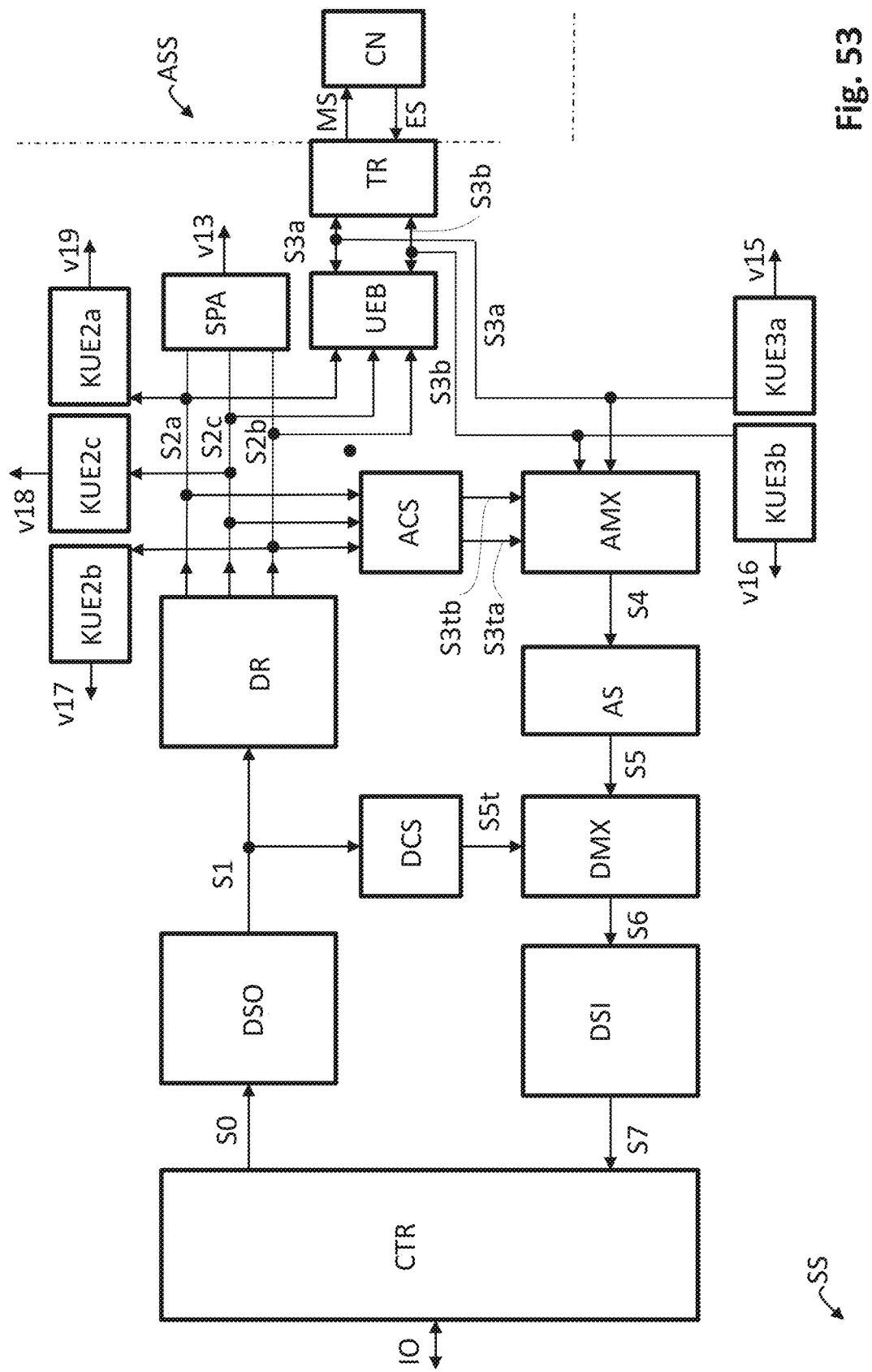
FIG. 53 corresponds to FIG. 8, wherein the level monitorings are not shown. Instead, possible coefficient-monitoring sub-apparatuses are shown.

FIG. 52 shows an exemplary structure for the realisation of the corresponding coefficient monitoring sub-apparatuses with the reference signs KUE2a, KUE2b, KUE2c, KUE3a and KUE3b in FIG. 53. Other realizations, in particular partially and wholly digital realizations, for example as a program in signal processors, are conceivable.

It is, of course, conceivable to use more than two analysis signals (A_a, A_b) and to generate more than two coefficient signals via more than two parallel signal paths accordingly and to perform more comparisons accordingly, which leads to many more comparison result signals, which, again, may be assessed by the control device (CTR) and/or the digital receive circuit (DSI) and may be used for the generation of error messages.

FIG. 53 corresponds to FIG. 8, wherein the level monitorings are not shown. Instead, possible coefficient-monitoring sub-apparatuses are shown, with the reference signs KUE2a, KUE2b, KUE2c, KUE3a and KUE3b in FIG. 53. Different comparison result signals are generated (v15, v16, v17, v18, v19) depending on the monitored signal and are preferably assessed by the digital input circuit (DSI) and/or the (system) control device, which trigger an error message as appropriate.

Figure 54:
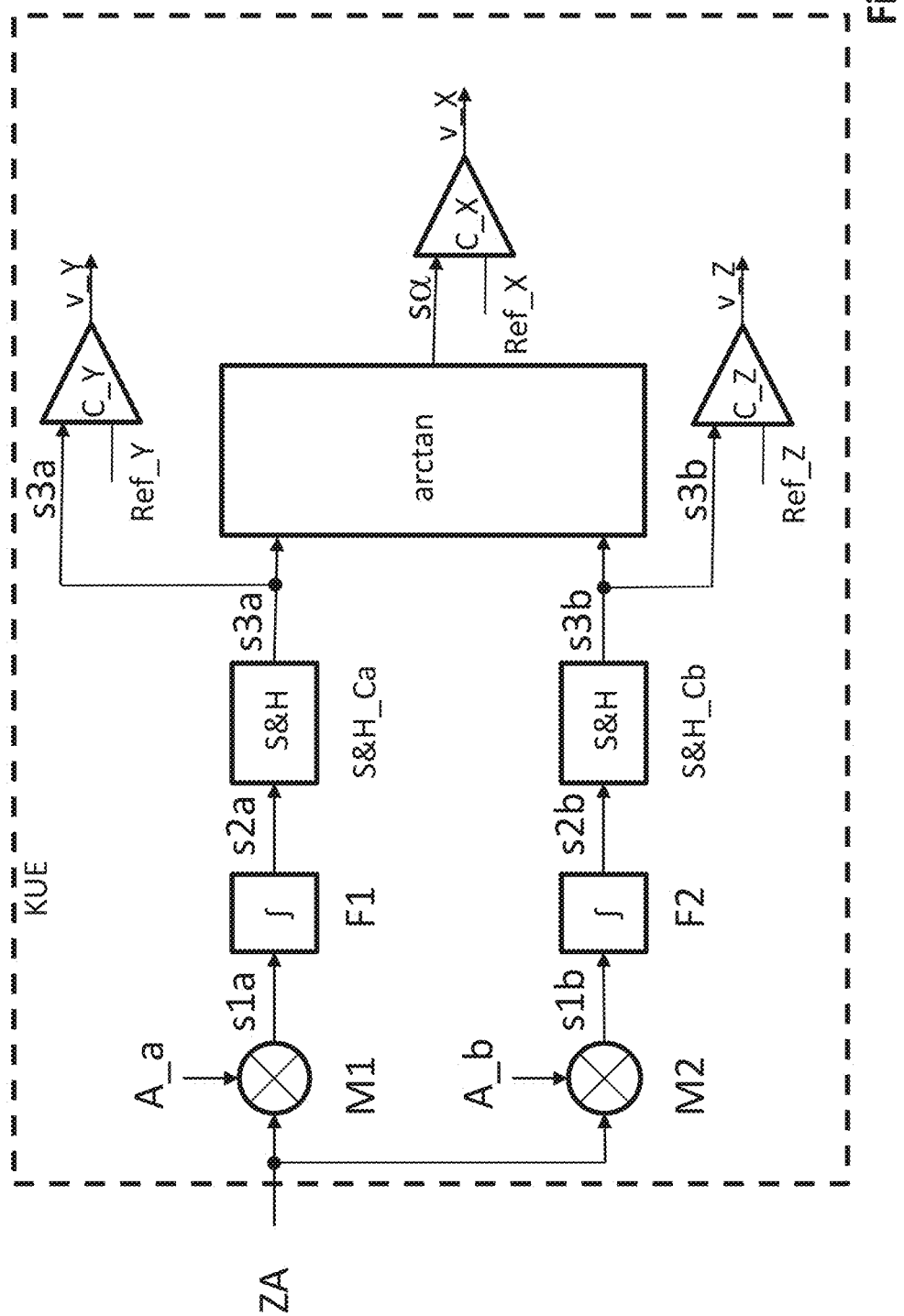
FIG. 54 corresponds to FIG. 52, wherein two comparators for additional monitoring of the two internal coefficient signals are now provided.

FIG. 54 corresponds to FIG. 52, wherein two comparators for additional monitoring of the two internal coefficient signals, i.e. for the first internal coefficient signal (s3a) and the second internal coefficient signal (s3b), are now provided. Three comparison result signals (V_X, V_Y, V_Z) are now generated instead of just one comparison result signal (V_X). FIG. 54 thus shows, by way of example, a further possible inner structure of an analogue coefficient monitoring sub-apparatus (KUE).

A second internal comparator (C_Y) compares the first internal coefficient signal (s3a) with a second internal reference value (R_Y). Depending on the comparison result, the second internal comparator (C_Y) generates a second internal comparison result signal (V_Y), which, as before, is assessed typically by the control device (CTR) and/or the digital input circuit (DSI), so as to generate an error message as appropriate.

A third internal comparator (C_Z) compares the second internal coefficient signal (s3b) with a third internal reference value (R_Z). Depending on the comparison result, the third internal comparator (C_Z) generates a third internal comparison result signal (V_Z), which, as before, is assessed typically by the control device (CTR) and/or the digital input circuit (DSI), so as to generate an error message as appropriate.

Figure 55:
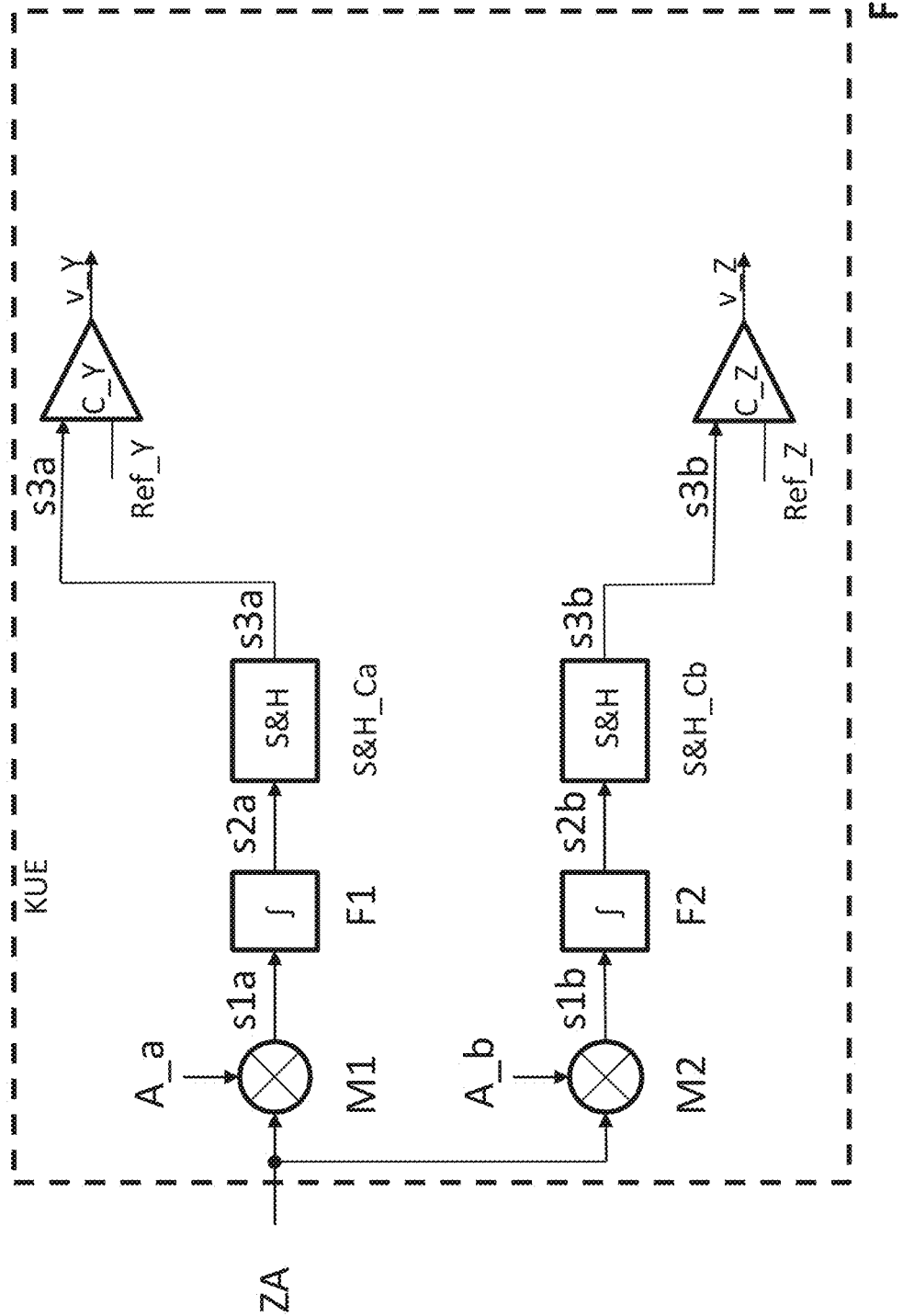
FIG. 55 corresponds to FIG. 54, wherein the ratio of the two internal coefficient signals is now not monitored.

FIG. 55 corresponds to FIG. 54, wherein the ratio of the two internal coefficient signals is now not monitored. Only two comparison results signals (V_Y, V_Z) are now generated. FIG. 55 thus shows, by way of example, a further possible inner structure of an analogue coefficient monitoring sub-apparatus (KUE). The function of the remaining circuit parts has already been described in the descriptions of FIGS. 52 and 54.

Figure 56:
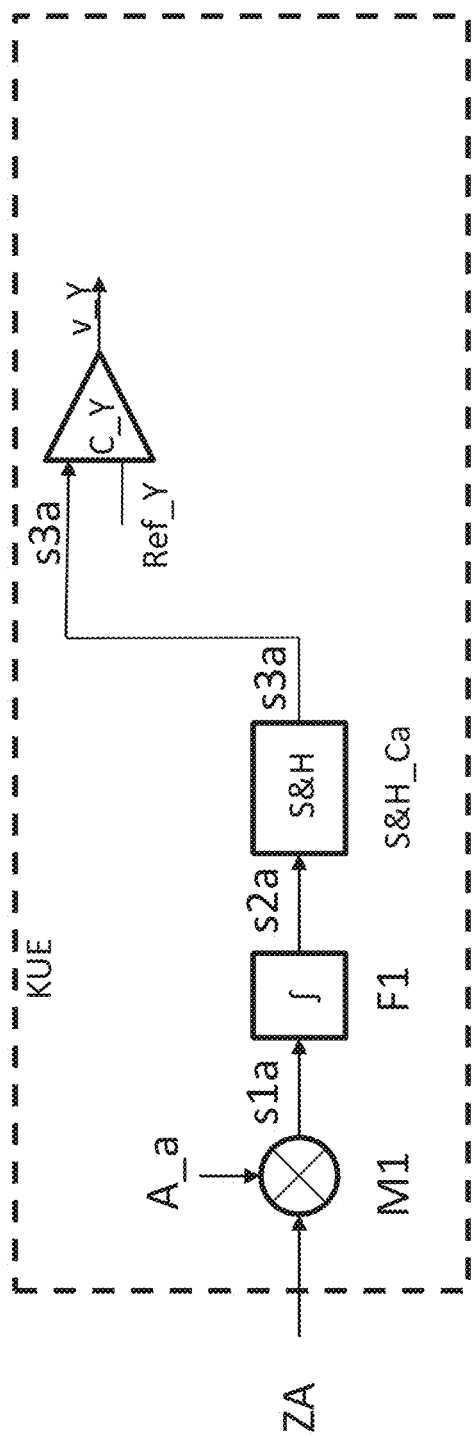
FIG. 56 corresponds to FIG. 55, wherein only an internal coefficient signal is now monitored.

FIG. 56 corresponds to FIG. 55, wherein only one internal coefficient signal (here s3a) is now monitored. Only one comparison result signal (V_Y) is now generated. This second comparison result signal (V_Y), however, monitors only the absolute level of the first internal coefficient signal (s3a), which corresponds to a monitoring of the fundamental waves or harmonic amplitude. In FIG. 52 the ratio of two coefficient signals was monitored. FIG. 56 thus shows, by way of example, a further possible inner structure of an analogue coefficient monitoring sub-apparatus (KUE). The function of the remaining circuit parts has already been described in the descriptions of FIGS. 52 and 54.

Figure 57:
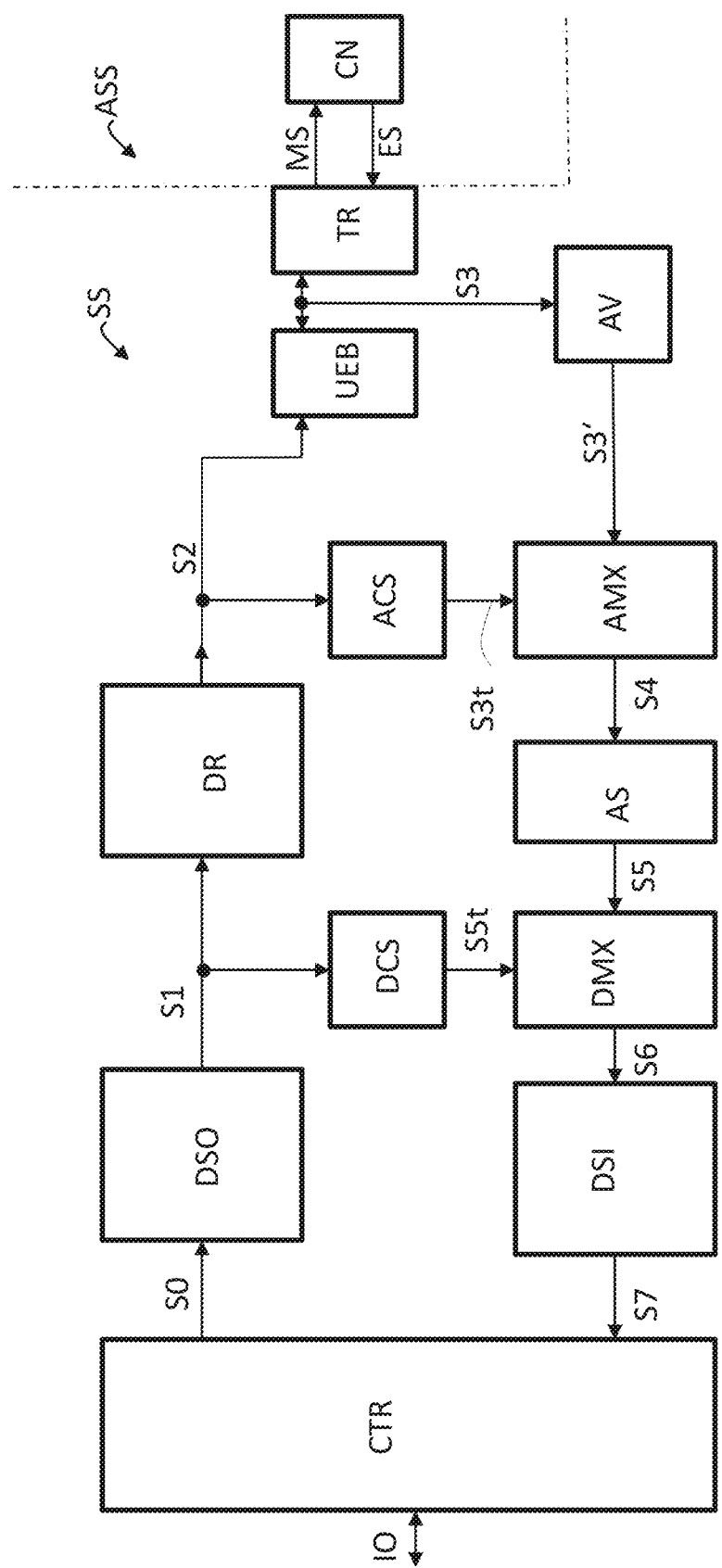
FIG. 57 corresponds to FIG. 2, with the difference that the third analogue signal (S3) is split before the analogue multiplexer (AMX) by an analogue filter or an analogue amplifier (AV) into the third analogue signal (S3) and the amplified third analogue signal (S3').

FIG. 57 corresponds to FIG. 2, with the difference that the third analogue signal (S3) is split before the analogue multiplexer (AMX) by an analogue filter or an analogue amplifier (AV) into the third analogue signal (S3) and the amplified third analogue signal (S3'). This has the advantage that an over modulation is avoided. The disadvantage is that in the second test mode the third analogue test signal (S3t) is fed back into the signal path via the analogue multiplexer (AMX) only after the analogue filter or analogue amplifier (AV). This has the result that the analogue filter or the analogue amplifier (AV) is not also tested. Of course, the totality of analogue input circuit (AS), analogue multiplexer (AMX) and analogue filter or analogue amplifier (AV) could also be considered to be a common analogue input circuit having two inputs, as has already been mentioned above. Should the amplitude of the second analogue signal (S2) the small enough for the input of the analogue multiplexer (AMX) and the input of the analogue input circuit (AS) to not be over modulated by direct application of the second analogue signal (S2), the analogue channel simulation unit (ACS) may optionally be spared in this configuration. There are thus, in total, at least three possibilities for preventing an over modulation of the analogue signal path in the second test mode:

Reconfiguration of the driver stage (DR) in the second test mode preferably by the control device (CTR) in such a way that the output amplitude of the driver stage (DR) is matched to the maximum input amplitude of the analogue multiplexer (AMX) and the maximum input amplitude of the analogue input circuit (AS). In this case, the analogue channel simulation units may be replaced in some circumstances by wire bridges.

Damping of the second analogue signal (S2) to give the third analogue test signal (S3t) in the analogue channel simulation unit in such a way that the output amplitude of the driver stage (DR) is matched to the maximum input amplitude of the analogue multiplexer (AMX) and the maximum input amplitude of the analogue input circuit (AS).

Omission of a preliminary stage of the analogue input circuit (AS)—in the example of FIG. 57 of an analogue filter or analogue amplifier (AB) and feeding of the third analogue test signal (S3t) or even direct feeding of the second analogue signal (S2) via the analogue multiplexer (AMX) into the analogue input circuit (AS). Here, it should again be ensured that the output amplitude of the driver stage (DR) is matched to the maximum input amplitude of the analogue multiplexer (AMX) and the maximum input amplitude of the analogue input circuit (AS). In this case, the analogue channel simulation unit may be replaced in some circumstances by wire bridges.

The corresponding configuration of the measuring system (SS) is preferably implemented again by the control device (CTR).

To conclude the description of the figures, it should again be mentioned that in particular the measures of FIGS. 6, 8, 9, 10, 48, 49, 50 and 53 may be combined with one another. A person skilled in the art will also choose, from these measures, those that come closest to the intended purpose so as not to have to carry out all measures for error detection.

Glossary

Frequency Sweep
  A frequency sweep, in the sense of this disclosure, is understood to mean a process in which the frequency of a first digital signal (S1) or the frequency of a second analogue signal (S2) the frequency of an output signal (MS) at a first moment in time has a starting frequency and at a second moment in time has an end frequency. The frequency, between the first and the second moments in time, preferably passes through all frequencies lying between the starting frequency and the end frequency, preferably strictly monotonically, but at least monotonically.

Ultrasound Transducer
  An ultrasound transducer, in the sense of this disclosure, is composed of the optional (but preferably provided) transducer resistor ($R_{TR}$), the optional (but preferably provided) transducer capacitor ($C_{TR}$), and the inner ultrasound transducer (TRi), which comprises the actual vibration element, housing thereof, and the contacts. An ultrasound transducer is able to transmit and receive ultrasound signals, preferably in a time division multiplex.

Test Case/Check Case
  A test case or check case, in the sense of this disclosure, is understood to mean a predetermined configuration of the signal path and all of its components. The configuration is implemented preferably by the control device (CTR). The stimulation of this predetermined signal path is performed substantially by predetermined signals of the digital signal generating unit (DSO). These predetermined signals are monitored within the signal path by predetermined monitoring apparatuses (for example difference amplifiers and/or comparators), and the response of the signal path to such a stimulus is assessed test-case-specifically, preferably by the digital input circuit (DSI) or the (system) control device (CTR).

Test Mode

A test mode is understood to mean a mode of the measuring system (SS) which is used to check the measuring system (SS) and which is not the operating mode.

Signal String

A signal string is understood to mean the forwarding of a signal within a string of apparatus parts of the measuring system (SS) along the signal path (see also FIGS. 3, 4 and 5).

Digital Part of the Signal String

The digital part of the signal string is understood to mean the circuit parts which are embodied predominantly on the basis of digital circuit technology. In the present example, these are the digital signal generating unit (DSO), the digital multiplexer (DMX) and the digital input circuit (DSI). The digital channel simulation unit (DCS) may be considered to be part of the digital signal string in the third test mode.

Analogue Part of the Signal String

The analogue part of the signal string will be understood to mean the circuit parts which are embodied predominantly on the basis of analogue circuit technology. In the present example these are the driver stage (DR), the analogue multiplexer (AMY), and the analogue input circuit (AS). The analogue channel simulation unit (ACS) may be considered to be part of the analogue signal string in the second test mode.

Error Messages

In the sense of this disclosure, error messages are formed of information regarding detected errors that is transmitted via corresponding apparatus parts, for example cables, or is provided to predetermined or determinable points in apparatus parts. The provision of such information is a generation in the sense of this disclosure.

Triangular Signal

A triangular signal is understood to mean a signal having a temporal amplitude profile, wherein this temporal amplitude profile is characterised by a direct succession of triangular voltage profiles of the signal in question, and wherein these triangles should be approximately isosceles triangles (see also signal A2c_b in FIG. 51).

Sawtooth Signal

A sawtooth signal is understood to mean a signal having a temporal amplitude profile, wherein this temporal amplitude profile is characterised by a direct succession of triangular voltage profiles of the signal in question, and wherein one limb of such a triangle is much steeper than the other limb (see also signal A2c_a in FIG. 51).

LIST OF REFERENCE SIGNS

1.TZ first test mode
2.TZ second test mode
3.TZ third test mode

A2a a first exemplary analysis signal for the coefficient monitoring in the coefficient monitoring sub-apparatus (KUE2a) for the first sub-signal (S2a) of the second analogue signal (S2)

A2a_b second exemplary analysis signal for the coefficient monitoring in the coefficient monitoring sub-apparatus (KUE2a) for the first sub-signal (S2a) of the second analogue signal (S2)

A2b_a first exemplary analysis signal for the coefficient monitoring in the coefficient monitoring sub-apparatus (KUE2b) for the second sub-signal (S2b) of the second analogue signal (S2)

A2b_b second exemplary analysis signal for the coefficient monitoring in the coefficient monitoring sub-apparatus (KUE2b) for the second sub-signal (S2b) of the second analogue signal (S2)

A2c_a first exemplary analysis signal for the coefficient monitoring in the coefficient monitoring sub-apparatus (KUE2c) for the first sub-signal (S2c) of the second analogue signal (S2)

A2c_b second exemplary analysis signal for the coefficient monitoring in the coefficient monitoring sub-apparatus (KUE2c) for the third sub-signal (S2c) of the second analogue signal (S2)

A2c_a' first exemplary analysis signal for the coefficient monitoring in the coefficient monitoring sub-apparatus (KUE2c) for the third sub-signal (S2c) of the second analogue signal (S2), here in an alternative exemplary example A2c_b' second exemplary analysis signal for the coefficient monitoring in the coefficient monitoring sub-apparatus (KUE2c) for the third sub-signal (S2c) of the second analogue signal (S2), here in an alternative exemplary example A3a a first exemplary analysis signal for the coefficient monitoring in the coefficient monitoring sub-apparatus (KUE3a) for the first sub-signal (S3a) of the third analogue signal (S3)

A3a_b second exemplary analysis signal for the coefficient monitoring in the coefficient monitoring sub-apparatus (KUE3a) for the first sub-signal (S3a) of the third analogue signal (S3)

A3b_a first exemplary analysis signal for the coefficient monitoring in the coefficient monitoring sub-apparatus (KUE3b) for the second sub-signal (S3b) of the third analogue signal (S3)

A3b_b second exemplary analysis signal for the coefficient monitoring in the coefficient monitoring sub-apparatus (KUE3b) for the second sub-signal (S3b) of the third analogue signal (S3)

A_a first internal analysis signal of the coefficient monitoring sub-apparatus (KUE) in question. It may be, for example, one of the following signals with the following reference signs: A2a a, A2b_a, A2c_a, A3a a, A3b_a. Other internal, symmetrical signals may also be monitored. The first internal analysis signal must always be selected to match the provided temporal symmetry of the signal to be analysed (ZA) and with the same period duration T as the signal to be analysed (ZA). If, for example, the first sub-signal (S2a) of the second analogue signal (S2) should be monitored, the first internal analysis signal should not have pulses in each period T, as shown in FIG. 51 for the third sub-signal (S2c) of the second analogue signal (S2) for the corresponding first analysis signal (A2c_a), and instead should be in-phase only in each second period. The first internal analysis signal is preferably generated digitally by the digital signal generating unit (DSO).

A_b second internal analysis signal of the coefficient monitoring sub-apparatus (KUE) in question. It may be, for example, one of the following signals with the following reference signs: A2$a$_b, A2$b$_b, A2$c$_b, A3$a$_b, A3$b$_b. Other internal, symmetrical signals may also be monitored. The second internal analysis signal must always be selected to match the provided temporal symmetry of the signal to be analysed (ZA) and with the same period duration T as the signal to be analysed (ZA). If, for example, the first sub-signal (S2$a$) of the second analogue signal (S2) should be monitored, the second internal analysis signal should not have pulses in each period T, as shown in FIG. 51 for the third sub-signal (S2$c$) of the second analogue signal (S2) for the corresponding second analysis signal (A2$c$_b), and instead should be in-phase only in each second period. The second internal analysis signal is preferably generated digitally by the digital signal generating unit (DSO).

ADC analogue-to-digital converter

ACS analogue channel simulation unit

AMX analogue multiplexer

AP decay phase arctan angle calculation unit. Each coefficient monitoring sub-apparatus (KUE) preferably has an angle calculation unit, of the coefficient monitoring sub-apparatus (KUE) is realised in the for of FIG. 52. The angle calculation unit generates the angle signal (sa) from the first internal coefficient signal (s3$a$) and the second internal coefficient signal (s3$b$). The angle signal preferably represents the arctan or the arccot of the ratio of the level of the first internal coefficient signal (s3$a$) and of the second internal coefficient signal (s3$b$). Approximations and other evaluations (for example simple division, etc.) are conceivable.

AS analogue input circuit (has the function of an analogue-to-digital converter (ADC))

ASS outer region outside the measuring system (SS)

AV analogue filter or analogue amplifier

C_X internal comparator. Coefficient monitoring sub-apparatuses (KUE) preferably have an internal comparator (C_X), if the coefficient monitoring sub-apparatus (KUE) is realised in the form of FIG. 52. In particular, in respect of FIG. 53, it may be formed by the comparators with the reference signs C15, C16, C17, C18 and C19, which are not shown in FIG. 53 for reasons of simplicity and are situated within the corresponding coefficient monitoring sub-apparatuses with the reference signs KUE2$a$, KUE2$b$, KUE2$c$, KUE3$a$ and KUE3$b$. The internal comparator compares the level of the angle signal (sa) with the internal reference value (Ref_X). The internal reference value (Ref_X), in respect of FIG. 53, may be formed in particular by reference values with the reference signs Ref15, Ref16, Ref17, Ref18 and Ref19, which are not shown in FIG. 53 for reasons of simplicity and are situated within the corresponding coefficient monitoring sub-apparatuses with the reference signs KUE2$a$, KUE2$b$, KUE2$c$, KUE3$a$ and KUE3$b$. Depending on the result of this comparison, the internal comparator generates an internal comparison result signal (v_X). The internal comparison result signal (v_X), in respect of FIG. 53, may be formed in particular by comparison result signals with the reference signs v15, v16, v17, v18 and v19, which are formed within the corresponding coefficient monitoring sub-apparatuses with the reference signs KUE2$a$, KUE2$b$, KUE2$c$, KUE3$a$ and KUE3$b$.

C_Y second internal comparator. In one implementation, coefficient monitoring sub-apparatuses (KUE) preferably have a second internal comparator (C_Y), if the coefficient monitoring sub-apparatus (KUE) is realised in the form of FIG. 54. In particular, in respect of FIG. 53, it may be formed by the comparators which are not shown in FIG. 53 for reasons of simplicity and are situated within the corresponding coefficient monitoring sub-apparatuses with the reference signs KUE2$a$, KUE2$b$, KUE2$c$, KUE3$a$ and KUE3$b$. The second internal comparator compares the level of the first internal coefficient signal (s3$a$) with the second internal reference value (Ref_Y). The second internal reference value (Ref_Y), in respect of FIG. 53, may be formed in particular by reference values which are not shown in FIG. 53 for reasons of simplicity and are situated within the corresponding coefficient monitoring sub-apparatuses with the reference signs KUE2$a$, KUE2$b$, KUE2$c$, KUE3$a$ and KUE3$b$. Depending on the result of this comparison, the second internal comparator generates a second internal comparison result signal (v_Y). The second internal comparison result signal (v_Y), in respect of FIG. 53, may be formed in particular by comparison result signals which are formed within the corresponding coefficient monitoring sub-apparatuses with the reference signs KUE2$a$, KUE2$b$, KUE2$c$, KUE3$a$ and KUE3$b$ and are not shown in FIG. 53 for reasons of simplicity.

C_Z third internal comparator. In one implementation, coefficient monitoring sub-apparatuses (KUE) preferably have a third internal comparator (C_Z), if the coefficient monitoring sub-apparatus (KUE) is realised in the form of FIG. 54. In particular, in respect of FIG. 53, it may be formed by the comparators which are not shown in FIG. 53 for reasons of simplicity and are situated within the corresponding coefficient monitoring sub-apparatuses with the reference signs KUE2$a$, KUE2$b$, KUE2$c$, KUE3$a$ and KUE3$b$. The third internal comparator compares the level of the second internal coefficient signal (s3$b$) with the third internal reference value (Ref_Z). The third internal reference value (Ref_Z), in respect of FIG. 53, may be formed in particular by reference values which are not shown in FIG. 53 for reasons of simplicity and are situated within the corresponding coefficient monitoring sub-apparatuses with the reference signs KUE2$a$, KUE2$b$, KUE2$c$, KUE3$a$ and KUE3$b$. Depending on the result of this comparison, the third internal comparator generates a third internal comparison result signal (v_Z). The third internal comparison result signal (v_Z), in respect of FIG. 53, may be formed in particular by comparison result signals which are formed within the corresponding coefficient monitoring sub-apparatuses with the reference signs KUE2$a$, KUE2$b$, KUE2$c$, KUE3$a$ and KUE3$b$ and are not shown in FIG. 53 for reasons of simplicity.

C1 first comparator. The first comparator compares the first difference signal (d1) with the first reference value (Ref1) and generates the first comparison result signal (v1)

C2 second comparator. The second comparator compares the first sub-signal (S3$a$) of the third analogue signal (S3) with the second reference value (Ref2) and generates the second comparison result signal (v2)

C3 third comparator. The third comparator compares the second sub-signal (S3$b$) of the third analogue signal (S3) with the third reference value (Ref3) and generates the third comparison result signal (v3)

C4 fourth comparator. The fourth comparator compares the second sub-signal (S2$b$) of the second analogue signal (S2) with the fourth reference value (Ref4) and generates the fourth comparison result signal (v4)

C5 fifth comparator. The fifth comparator compares the third sub-signal (S2c) of the second analogue signal (S2) with the fifth reference value (Ref5) and generates the fifth comparison result signal (v5)

C6 sixth comparator. The sixth comparator compares the first sub-signal (S2a) of the second analogue signal (S2) with the sixth reference value (Ref6) and generates the sixth comparison result signal (v6)

C10 tenth comparator. The tenth comparator compares the second difference signal (d2) with the seventh reference value (Ref7) and generates the tenth comparison result signal (v10)

C11 eleventh comparator. The eleventh comparator compares the third difference signal (d3) with the eighth reference value (Ref8) and generates the eleventh comparison result signal (v11)

C12 twelfth comparator. The twelfth comparator compares the fourth difference signal (d4) with the ninth reference value (Ref9) and generates the twelfth comparison result signal (v12)

C13 thirteenth comparator. The thirteenth comparator compares the integrated fifth difference signal (d5i) with the thirteenth reference value (Ref13) and generates the thirteenth comparison result signal (v13)

C14 fourteenth comparator. The fourteenth comparator compares the integrated fifth difference signal (d5i) with the fourteenth reference value (Ref14) and generates the fourteenth comparison result signal (v14)

C15 fifteenth comparator. The fifteenth comparator compares the angle signal (sax) within the coefficient monitoring sub-apparatus (KUE3a) of the first sub-signal (S3a) of the third analogue signal (S3) with the fifteenth reference value (Ref15) and generates the fifteenth comparison result signal (v15). The fifteenth comparator (C15) is situated within the coefficient monitoring sub-apparatus (KUE3a) of the first sub-signal (S3a) of the third analogue signal (S3)

C16 sixteenth comparator. The sixteenth comparator compares the angle signal (sa) within the coefficient monitoring sub-apparatus (KUE3b) of the second sub-signal (S3b) of the third analogue signal (S3) with the sixteenth reference value (Ref16) and generates the sixteenth comparison result signal (v16). The sixteenth comparator (C16) is situated within the coefficient monitoring sub-apparatus (KUE3b) of the second sub-signal (S3b) of the third analogue signal (S3)

C17 seventeenth comparator. The seventeenth comparator compares the angle signal (sa) within the coefficient monitoring sub-apparatus (KUE2b) of the second sub-signal (S2b) of the second analogue signal (S2) with the seventeenth reference value (Ref17) and generates the seventeenth comparison result signal (v17). The seventeenth comparator (C17) is situated within the coefficient monitoring sub-apparatus (KUE2b) of the second sub-signal (S2b) of the second analogue signal (S2)

C18 eighteenth comparator. The eighteenth comparator compares the angle signal (sa) within the coefficient monitoring sub-apparatus (KUE2c) of the third sub-signal (S2c) of the second analogue signal (S2) with the eighteenth reference value (Ref18) and generates the eighteenth comparison result signal (v18). The eighteenth comparator (C18) is situated within the coefficient monitoring sub-apparatus (KUE2c) of the third sub-signal (S2c) of the second analogue signal (S2)

C19 nineteenth comparator. The nineteenth comparator compares the angle signal (sα) within the coefficient monitoring sub-apparatus (KUE2a) of the first sub-signal (S2a) of the second analogue signal (S2) with the nineteenth reference value (Ref19) and generates the nineteenth comparison result signal (v19). The nineteenth comparator (C19) is situated within the coefficient monitoring sub-apparatus (KUE2a) of the first sub-signal (S2a) of the second analogue signal (S2)

CN measuring channel, in particular an ultrasound measuring channel

CTR control device $CT_{TR}$ transducer capacitor d1 first difference signal. The first difference signal in the example of FIG. 3 represents the difference in the values of the signal amplitudes (as exemplary parameter values) between the first sub-signal (S3a) of the third analogue signal (S3) and the second sub-signal (S3b) of the third analogue signal (S3).

d2 second difference signal. The second difference signal in the example of FIG. 5 represents the difference in the values of the signal amplitudes (as exemplary parameter values) between the second sub-signal (S2b) of the second analogue signal (S2) and the third sub-signal (S2c) of the second analogue signal (S2).

d3 third difference signal. The third difference signal in the example of FIG. 5 represents the difference in the values of the signal amplitudes (as exemplary parameter values) between the third sub-signal (S2c) of the second analogue signal (S2) and the first sub-signal (S2a) of the second analogue signal (S2).

d4 fourth difference signal. The fourth difference signal in the example of FIG. 5 represents the difference in the values of the signal amplitudes (as exemplary parameter values) between the first sub-signal (S2a) of the second analogue signal (S2) and the second sub-signal (S2b) of the second analogue signal (S2).

d5 fifth difference signal. The fifth difference signal in the example of FIG. 49 represents the difference in the values of the signal amplitudes (as exemplary parameter values) between the first sub-signal (S3am) of the third buffered signal (S3m) and the second sub-signal (S3bm) of the third buffered signal (S3m).

d5i integrated fifth difference signal. The integrated fifth difference signal in the example of FIG. 49 represents the output of the second integrator (INT2), which integrates the fifth difference signal (d5) over m clock periods T before it is preferably reset again. Here, m is a positive integer. At the end of the m clock periods the value of the integrated fifth difference signal represents a measure for the asymmetry of the two sub-signals of the third analogue signal (S3).

d6 sixth difference signal. The sixth difference signal in the example of FIG. 50 represents the difference in the values of the signal amplitudes (as exemplary parameter values) between the first sub-signal (S2am) of the second buffered signal (S2m) and the second sub-signal (S2bm) of the second buffered signal (S2m).

d6i integrated sixth difference signal. The integrated sixth difference signal in the example of FIG. 50 represents the output of the first integrator (INT1), which integrates the sixth difference signal (d6) over m clock periods T before it is preferably reset again. At the end of the m clock periods the value of the integrated sixth difference signal represents a measure for the asymmetry of the two sub-signals of the second analogue signal (S3).

D1 first difference amplifier. The first difference amplifier for example forms the first difference signal (d1) by establishing a difference from a parameter value of the first sub-signal (S3a) of the third analogue signal (S3) and from a parameter value of the second sub-signal (S3b) of the third analogue signal (S3).

D2 second difference amplifier. The second difference amplifier for example forms the second difference signal (d2) by establishing a difference from a parameter value of the second sub-signal (S2b) of the second analogue signal (S2) and from a parameter value of the third sub-signal (S2c) of the second analogue signal (S2).

D3 third difference amplifier. The third difference amplifier for example forms the third difference signal (d3) by establishing a difference from a parameter value of the third sub-signal (S2c) of the second analogue signal (S2) and from a parameter value of the first sub-signal (S2a) of the second analogue signal (S2).

D4 fourth difference amplifier. The fourth difference amplifier for example forms the fourth difference signal (d4) by establishing a difference from a parameter value of the first sub-signal (S2a) of the second analogue signal (S2) and from a parameter value of the second sub-signal (S2b) of the second analogue signal (S2).

D5 fifth difference amplifier. The fifth difference amplifier for example forms the fifth difference signal (d5) by establishing a difference from a parameter value of the first sub-signal (S3am) of the third buffered signal (S3m) and from a parameter value of the second sub-signal (S3bm) of the third buffered signal (S3m).

D6 sixth difference amplifier. The sixth difference amplifier for example forms the sixth difference signal (d6) by establishing a difference from a parameter value of the first sub-signal (S2am) of the second buffered signal (S2m) and from a parameter value of the second sub-signal (S2bm) of the second buffered signal (S2m).

DCS digital channel simulation unit

DMX digital multiplexer

DR driver stage

DSI digital input circuit

DSO digital signal generating unit

EP receive phase

ES receive signal, in particular an ultrasound receive signal

EZ switched-on mode

F1 first filter. Each coefficient monitoring sub-apparatus (KUE) preferably comprises a first filter if the coefficient monitoring sub-apparatus (KUE) is realised in the form of FIG. 52. The first filter filters the first internal filter input signal (s1a) to form a first filter output signal (s2a). The first filter is preferably an integrator or at least a low-pass filter. The first filter with the first multiplier (M1) thus forms a first scalar product unit and thus together with the first multiplier (M1) forms a scalar product from the signal to be analysed (ZA) and the first analysis signal (A_a). The first filter output signal (s2a) thus represents this scalar product determined in this way. However, the limits of this first scalar product are still unknown. The subsequent first internal sample-and-hold unit (S&H_Ca) must therefore be supplemented necessarily by the first scalar product unit.

F2 second filter. Each coefficient monitoring sub-apparatus (KUE) preferably comprises a second filter if the coefficient monitoring sub-apparatus (KUE) is realised in the form of FIG. 52. The second filter filters the second internal filter input signal (s1b) to form a second filter output signal (s2b). The second filter is preferably an integrator or at least a low-pass filter. The second filter with the second multiplier (M2) thus forms a second scalar product unit and thus together with the second multiplier (M2) forms a scalar product from the signal to be analysed (ZA) and the second analysis signal (A_b). The second filter output signal (s2b) thus represents this scalar product determined in this way. However, the limits of this second scalar product are still unknown. The subsequent second internal sample-and-hold unit (S&H_Cb) must therefore be supplemented necessarily by the scalar product unit.

FZ error mode

INT1 first integrator

INT2 second integrator

IO data interface

KUE coefficient monitoring sub-apparatus

KUE2a coefficient monitoring sub-apparatus of the first sub-signal (S2a) of the second analogue signal (S2)

KUE2b coefficient monitoring sub-apparatus of the second sub-signal (S2b) of the second analogue signal (S2)

KUE3a coefficient monitoring sub-apparatus of the first sub-signal (S3a) of the third analogue signal (S3)

KUE3b coefficient monitoring sub-apparatus of the second sub-signal (S3a) of the third analogue signal (S3)

m number of clock periods over which the integration is performed

M1 first multiplier. Each coefficient monitoring sub-apparatus (KUE) preferably comprises a first multiplier if the coefficient monitoring sub-apparatus (KUE) is realised in the form of FIG. 52. The first multiplier, within the coefficient monitoring sub-apparatus (KUE) in question, multiplies the first internal analysis signal A_a relevant to the coefficient monitoring sub-apparatus (KUE) in question by the signal to be analysed (ZA) for the coefficient monitoring sub-apparatus (KUE) in question in order to obtain a first internal filter input signal (s1a).

M2 second multiplier. Each coefficient monitoring sub-apparatus (KUE) preferably comprises a second multiplier if the coefficient monitoring sub-apparatus (KUE) is realised in the form of FIG. 52. The second multiplier, within the coefficient monitoring sub-apparatus (KUE) in question, multiplies the second internal analysis signal A_b relevant to the coefficient monitoring sub-apparatus (KUE) in question by the signal to be analysed (ZA) for the coefficient monitoring sub-apparatus (KUE) in question in order to obtain a second internal filter input signal (sib).

MS measuring signal, in particular an ultrasound measuring signal

Ref_X internal reference value. Coefficient monitoring sub-apparatuses (KUE) preferably use an internal reference value if they are realised in the form of FIG. 52. The internal reference value (Ref_X), in respect of FIG. 53, may be formed in particular by reference values with the reference signs Ref15, Ref16, Ref17, Ref18 and Ref19, which are not shown in FIG. 53 for reasons of simplification and are arranged within the corresponding coefficient monitoring sub-apparatuses with the reference signs KUE2a, KUE2b, KUE2c, KUE3a and KUE3b.

Ref_Y second internal reference value. Coefficient monitoring sub-apparatuses (KUE) preferably use a second internal reference value (Ref_Y) if they are realised in the form of FIG. 54, 55 or 56. The second internal reference value (Ref_Y), in respect of FIG. 53, may be formed by reference values which are not shown in FIG. 53 for reasons of simplification and are arranged within the corresponding coefficient monitoring sub-apparatuses with the reference signs KUE2a, KUE2b, KUE2c, KUE3a and KUE3b.

Ref_Z third internal reference value. Coefficient monitoring sub-apparatuses (KUE) preferably use a third internal reference value (Ref_Z) if they are realised in the form of FIG. 54, 55 or 56. The third internal reference value (Ref_Z), in respect of FIG. 53, may be formed by reference values which are not shown in FIG. 53 for reasons of simplification and are arranged within the corresponding coefficient monitoring sub-apparatuses with the reference signs KUE2a, KUE2b, KUE2c, KUE3a and KUE3b.

Ref1 first reference value. The first reference value is used as a comparison value for the first difference signal (d1) for generation of the first comparison result signal (v1) by the first comparator (C1).

Ref2 second reference value. The second reference value is used as a comparison value for the first sub-signal (S3a) of the third analogue signal (S3) for generation of the second comparison result signal (v2) by the second comparator (C2).

Ref3 third reference value. The third reference value is used as a comparison value for the second sub-signal (S3b) of the third analogue signal (S3) for generation of the third comparison result signal (v3) by the third comparator (C3).

Ref4 fourth reference value. The fourth reference value is used as a comparison value for the second sub-signal (S2b) of the second analogue signal (S2) for generation of the fourth comparison result signal (v4) by the fourth comparator (C4).

Ref5 fifth reference value. The fifth reference value is used as a comparison value for the third sub-signal (S2c) of the second analogue signal (S2) for generation of the fifth comparison result signal (v5) by the fifth comparator (C5).

Ref6 sixth reference value. The sixth reference value is used as a comparison value for the first sub-signal (S2a) of the second analogue signal (S2) for generation of the sixth comparison result signal (v6) by the sixth comparator (C6).

Ref7 seventh reference value. The seventh reference value is used as a comparison value for the second difference signal (d2) for generation of the tenth comparison result signal (v10) by the tenth comparator (C10).

Ref8 eighth reference value. The eighth reference value is used as a comparison value for the third difference signal (d3) for generation of the eleventh comparison result signal (v11) by the eleventh comparator (C11).

Ref9 ninth reference value. The ninth reference value is used as a comparison value for the fourth difference signal (d4) for generation of the twelfth comparison result signal (v12) by the twelfth comparator (C12).

Ref13 thirteenth reference value. The thirteenth reference value is used as a comparison value for the integrated sixth difference signal (d6i) for generation of the thirteenth comparison result signal (v13) by the thirteenth comparator (C13).

Ref14 fourteenth reference value. The fourteenth reference value is used as a comparison value for the integrated fifth difference signal (d5i) for generation of the fourteenth comparison result signal (v14) by the fourteenth comparator (C14).

Ref15 fifteenth reference value. The fifteenth reference value is used as a comparison value for the angle signal (sa) within the coefficient monitoring sub-apparatus (KUE3a) of the first sub-signal (S3a) of the third analogue signal (S3) for generation of the fifteenth comparison result signal (v15) by the fifteenth comparator (C15) within the coefficient monitoring sub-apparatus (KUE3a) of the first sib-signal (S3a) of the third analogue signal (S3).

Ref16 sixteenth reference value. The sixteenth reference value is used as a comparison value for the angle signal (sa) within the coefficient monitoring sub-apparatus (KUE3b) of the second sub-signal (S3b) of the third analogue signal (S3) for generation of the sixteenth comparison result signal (v16) by the sixteenth comparator (C16) within the coefficient monitoring sub-apparatus (KUE3b) of the second sub-signal (S3b) of the third analogue signal (S3).

Ref17 seventeenth reference value. The seventeenth reference value is used as a comparison value for the angle signal (sa) within the coefficient monitoring sub-apparatus (KUE2b) of the second sub-signal (S2b) of the second analogue signal (S2) for generation of the seventeenth comparison result signal (v17) by the seventeenth comparator (C17) within the coefficient monitoring sub-apparatus (KUE2b) of the second sub-signal (S2b) of the second analogue signal (S2).

Ref18 eighteenth reference value. The eighteenth reference value is used as a comparison value for the angle signal (sa) within the coefficient monitoring sub-apparatus (KUE2c) of the third sub-signal (S2c) of the second analogue signal (S2) for generation of the eighteenth comparison result signal (v18) by the eighteenth comparator (C18) within the coefficient monitoring sub-apparatus (KUE2c) of the third sub-signal (S2c) of the second analogue signal (S2).

Ref19 nineteenth reference value. The nineteenth reference value is used as a comparison value for the angle signal (sa) within the coefficient monitoring sub-apparatus (KUE2a) of the first sub-signal (S2a) of the second analogue signal (S2) for generation of the nineteenth comparison result signal (v19) by the nineteenth comparator (C19) within the coefficient monitoring sub-apparatus (KUE2a) of the first sub-signal (S2a) of the second analogue signal (S2).

RR transducer resistor sα angle signal. Each coefficient monitoring sub-apparatus (KUE) preferably comprises a signal angle if the coefficient monitoring sub-apparatus (LUE) is realised in the form of FIG. 52. The angle signal is generated by the angle calculation unit of the coefficient monitoring sub-apparatus (LUE). The angle signal preferably represents the arctan or the arccot of the ratio of the level of the first internal coefficient signal (s3a) and of the second internal coefficient signal (s3b). Approximations and other assessments (for example simple division, etc.) are conceivable.

S&H_Aa first phase shifter of the first symmetry checking apparatus (SPA)

S&H_Ab second phase shifter of the first symmetry checking apparatus (SPA)

S&H_Ba first phase shifter of the second symmetry checking apparatus (SPB)

S&H_Bb second phase shifter of the second symmetry checking apparatus (SPB)

S&H_Ca first internal sample-and-hold unit. Each coefficient monitoring sub-apparatus (KUE) preferably comprises a first internal sample-and-hold unit if the coefficient monitoring sub-apparatus (KUE) is realised in the form of FIG. 52. The first internal sample-and-hold unit samples the first internal filter output signal (S2a) at the temporal end of one or more complete periods T of the signal to be analysed (ZA) and thus forms the first internal coefficient signal (S3a). The sampling occurs preferably only in the transmission phase (SP) or at selected time periods within the transmission phase (SP). The first internal sample-and-hold unit is preferably controlled by the digital signal generating unit (DSO).

S&H_Cb second internal sample-and-hold unit. Each coefficient monitoring sub-apparatus (KUE) preferably comprises a second internal sample-and-hold unit if the coefficient monitoring sub-apparatus (KUE) is realised in the form of FIG. 52. The second internal sample-and-hold unit samples the second internal filter output signal (S2b) at the temporal end of one or more complete periods T of the signal to be analysed (ZA) and thus forms the second internal coefficient signal (S3b). The sampling occurs preferably only in the transmission phase (SP) or at selected time periods within the transmission phase (SP). The first internal sample-and-hold unit is preferably controlled by the digital signal generating unit (DSO).

S0 control signal

S1 first digital signal s1a first internal filter input signal. Each coefficient monitoring sub-apparatus (KUE) preferably comprises a first internal filter input signal if the coefficient monitoring sub-apparatus (KUE) is realised in the form of FIG. 52. The first filter input signal is generated in the example of FIG. 52 by multiplying the signal to be analysed (ZA) by the first internal analysis signal (A_a) by means of the first multiplier (M1).

s1b second internal filter input signal. Each coefficient monitoring sub-apparatus (KUE) preferably comprises a second internal filter input signal if the coefficient monitoring sub-apparatus (KUE) is realised in the form of FIG. 52. The second filter input signal is generated in the example of FIG. 52 by multiplying the signal to be analysed (ZA) by the second internal analysis signal (A_a) by means of the second multiplier (M2).

S2 second analogue signal s2a first internal filter input signal. Each coefficient monitoring sub-apparatus (KUE) preferably comprises a first internal filter output signal if the coefficient monitoring sub-apparatus (KUE) is realised in the form of FIG. 52. The first filter output signal is generated in the example of FIG. 52 by filtering the first filter input signal (s1a) in the first internal filter (F1).

S2a first sub-signal of the second analogue signal (S2)

S2am first sub-signal of the second buffered signal (S2m)

s2b second internal filter output signal. Each coefficient monitoring sub-apparatus (KUE) preferably comprises a second internal filter output signal if the coefficient monitoring sub-apparatus (KUE) is realised in the form of FIG. 52. The second filter output signal is generated in the example of FIG. 52 by filtering the second filter input signal (s1b) in the second internal filter (F2).

S2b second sub-signal of the second analogue signal (S2)

S2bm second sub-signal of the buffered signal (S2m)

S2c third sub-signal of the second analogue signal (S2)

S2cLC third sub-signal of the second analogue signal (S2) with disconnection of the transducer capacitor (CTU) (disrupted third sub-signal of the second analogue signal (S2))

S2m second buffered signal

S3 third analogue signal

S3' amplified third analogue signal s3a third internal coefficient signal. Each coefficient monitoring sub-apparatus (KUE) preferably comprises a first internal coefficient signal if the coefficient monitoring sub-apparatus (KUE) is realised in the form of FIG. 52. The first internal sample-and-hold unit (S&H_Ca) forms the first internal coefficient signal by sampling the first internal filter output signal (s2a) at the temporal end of one or more complete periods T of the signal to be analysed (ZA). This sampling is performed preferably only in the transmission phase (SP) or at selected time periods within the transmission phase (SP). The sampling is preferably controlled by the digital generating unit (DSO).

s3b second internal coefficient signal. Each coefficient monitoring sub-apparatus (KUE) preferably comprises a second internal coefficient signal if the coefficient monitoring sub-apparatus (KUE) is realised in the form of FIG. 52. The second internal sample-and-hold unit (S&H_Cb) forms the first internal coefficient signal by sampling the second internal filter output signal (s2b) at the temporal end of one or more complete periods T of the signal to be analysed (ZA). This sampling is performed preferably only in the transmission phase (SP) or at selected time periods within the transmission phase (SP). The sampling is preferably controlled by the digital generating unit (DSO).

S3a first sub-signal of the third analogue signal (S3)

S3am first sub-signal of the third buffered signal (S3m)

S3b second sub-signal of the third analogue signal (S3)

S3bm second sub-signal of the third buffered signal (S3m)

S3m third buffered signal

S3t third analogue test signal

S3ta first sub-signal of the third analogue test signal

S3tb second sub-signal of the third analogue test signal

S4 fourth analogue signal

S5 fifth digital signal

S5t fifth digital test signal

S6 sixth digital signal

S7 seventh response signal

SBA first symmetry checking apparatus

SPB second symmetry checking apparatus

SP transmission phase

SS sensor system

T clock period

TR measuring unit, un particular an ultrasound transducer

Tri inner ultrasound transducer

UEB transmitter; v_X internal comparison signal. The coefficient monitoring sub-apparatuses (LUE) preferably comprise an internal comparison signal (v_X) if the coefficient monitoring sub-apparatuses (KUE) are realised in the form of FIG. 52. In particular, with respect to FIG. 53, the signals are comparison signals with the reference signs v15, v16, v17, v18 and v19, which for reasons of simplicity in FIG. 53 are not output signals of the corresponding coefficient monitoring sub-apparatuses with the reference signs KUE2a, KUE2b, KUE2c, KUE3a and KUE3b. The particular internal comparator (C_X) of the particular coefficient monitoring sub-apparatus (KUE) compares the level of the angle signal (sa) in question with the internal reference value (Ref_X) of the corresponding coefficient monitoring sub-apparatus (KUE) (see also FIG. 52). The internal reference value (Ref_X), with respect to FIG. 53, may be formed by reference values with the reference signs Ref15, Ref16, Ref17, Ref18 and Ref19, which for reasons of simplicity are not shown in FIG. 53 and are situated within the corresponding coefficient monitoring sub-apparatuses with the reference signs KUE2a, KUE2b, KUE2c, KUE3a and KUE3b. They thus represent the internal reference value (Ref_X) of the particular coefficient monitoring sub-apparatus KUE). Depending on the result of this comparison, the internal comparator (C_X) generates the internal comparison result signal (v_X). The internal comparison result signal (v_X), with respect to FIG. 53, may be formed in particular by comparison result signals with the reference signs v15, v16, v17, v18 and v19 which are formed within the corresponding coefficient monitoring sub-apparatuses with the reference signs KUE2a, KUE2b, KUE2c, KUE3a and KUE3b. The control device (CTR) and/or the digital input circuit (DSI) preferably assess the internal comparison result signal (v_X) and generate an error message as appropriate.

v_Y second internal comparison signal. The coefficient monitoring sub-apparatuses (LUE) preferably comprise a second internal comparison signal (v_Y) if the coefficient monitoring sub-apparatuses (KUE) are realised in the form of FIG. 54, 55 or 56. In particular, with respect to FIG. 53, the signals are comparison signals which for reasons of simplicity in FIG. 53 are not output signals of the corresponding coefficient monitoring sub-apparatuses with the reference signs KUE2a, KUE2b, KUE2c, KUE3a and KUE3b. The particular second internal comparator (C_Y) of the particular coefficient monitoring sub-apparatus (KUE) compares the level of the first internal coefficient signal (s3a) with the second internal reference value (Ref_Y) of the corresponding coefficient monitoring sub-apparatus (KUE) (see also FIG. 54, 55 or 56). The second internal reference value (Ref_Y), with respect to FIG. 53, may be formed in particular by reference values which for reasons of simplicity are not shown in FIG. 53 and may be situated within the corresponding coefficient monitoring sub-apparatuses with the reference signs KUE2a, KUE2b, KUE2c, KUE3a and KUE3b. They thus represent the second internal reference value (Ref_Y) of the particular coefficient monitoring sub-apparatus (KUE). Depending on the result of this comparison, the second internal comparator (C_Y) generates the second internal comparison result signal (v_Y). The second internal comparison result signals (v_Y), with respect to FIG. 53, may be formed in particular by comparison result signals which for reasons of simplicity are not shown in FIG. 53 and are formed within the corresponding coefficient monitoring sub-apparatuses with the reference signs KUE2a, KUE2b, KUE2c, KUE3a and KUE3b. The control device (CTR) and/or the digital input circuit (DSI) preferably assess the second internal comparison result signals (v_Y) and generate error messages as appropriate.

v_Z third internal comparison signal. The coefficient monitoring sub-apparatuses (KUE) preferably comprise a third internal comparison signal (v_Z) if the coefficient monitoring sub-apparatuses (KUE) are realised in the form of FIG. 54, 55 or 56. In particular, with respect to FIG. 53, the signals may be comparison signals which for reasons of simplicity in FIG. 53 are not output signals of the corresponding coefficient monitoring sub-apparatuses with the reference signs KUE2a, KUE2b, KUE2c, KUE3a and KUE3b. The particular third internal comparator (C_Z) of the particular coefficient monitoring sub-apparatus (KUE) compares the level of the second internal coefficient signal (s3b) with the third internal reference value (Ref_Z) of the corresponding coefficient monitoring sub-apparatus (KUE) (see also FIG. 54, 55 or 56). The third internal reference value (Ref_Z), with respect to FIG. 53, may be formed in particular by reference values which for reasons of simplicity are not shown in FIG. 53 and may be situated within the corresponding coefficient monitoring sub-apparatuses with the reference signs KUE2a, KUE2b, KUE2c, KUE3a and KUE3b. They thus represent the third internal reference value (Ref_Z) of the particular coefficient monitoring sub-apparatus (KUE). Depending on the result of this comparison, the third internal comparator (C_Z) generates the third internal comparison result signal (v_Z). The third internal comparison result signals (v_Z), with respect to FIG. 53, may be formed in particular by comparison result signals which for reasons of simplicity are not shown in FIG. 53 and are formed within the corresponding coefficient monitoring sub-apparatuses with the reference signs KUE2a, KUE2b, KUE2c, KUE3a and KUE3b. The control device (CTR) and/or the digital input circuit (DSI) preferably assess the third internal comparison result signals (v_Z) and generate error messages as appropriate.

v1 first comparison result signal. In the example of FIG. 3 the first comparison result signal represents the result of the comparison between the value of the first difference signal (d1) and the first reference value (Ref1). The comparison may be made without or with consideration of the algebraic sign. A purely value-based comparison is thus preferably a comparison of the absolute values.

v2 second comparison result signal. In the example of FIG. 3 the second comparison result signal represents the result of the comparison between the value of the first sub-signal (S3a) of the third analogue signal (S3) and the second reference value (Ref2). The comparison may be made without or with consideration of the algebraic sign. A purely value-based comparison is thus preferably a comparison of the absolute values.

v3 third comparison result signal. In the example of FIG. 3 the third comparison result signal represents the result of the comparison between the value of the second sub-signal (S3b) of the third analogue signal (S3) and the second reference value (Ref2). The comparison may be made without or with consideration of the algebraic sign. A purely value-based comparison is thus preferably a comparison of the absolute values.

v4 fourth comparison result signal. In the example of FIG. 4 the fourth comparison result signal represents the result of the comparison between the value of the second sub-signal (S2b) of the second analogue signal (S2) and the fourth reference value (Ref4). The comparison may be made without or with consideration of the algebraic sign. A purely value-based comparison is thus preferably a comparison of the absolute values.

v5 fifth comparison result signal. In the example of FIG. 4 the fifth comparison result signal represents the result of the comparison between the value of the third sub-signal (S2c) of the second analogue signal (S2) and the fifth reference value (Ref5). The comparison may be made without or with consideration of the algebraic sign. A purely value-based comparison is thus preferably a comparison of the absolute values.

v6 sixth comparison result signal. In the example of FIG. 4 the sixth comparison result signal represents the result of the comparison between the value of the first sub-signal (S2a) of the second analogue signal (S2) and the sixth reference value (Ref6). The comparison may be made without or with consideration of the algebraic sign. A purely value-based comparison is thus preferably a comparison of the absolute values.

v10 tenth comparison result signal. In the example of FIG. 8 the tenth comparison result signal represents the result of the comparison between the value of the second difference signal (d2) and the seventh reference value (Ref7) by the tenth comparator (C10). The comparison may be made without or with consideration of the algebraic sign. A purely value-based comparison is thus preferably a comparison of the absolute values.

v11 eleventh comparison result signal. In the example of FIG. 8 the eleventh comparison result signal represents the result of the comparison between the value of the third difference signal (d3) and the eighth reference value (Ref8) by the eleventh comparator (C11). The comparison may be made without or with consideration of the algebraic sign. A purely value-based comparison is thus preferably a comparison of the absolute values.

v12 twelfth comparison result signal. In the example of FIG. 8 the twelfth comparison result signal represents the result of the comparison between the value of the fourth difference signal (d4) and the ninth reference value (Ref9) by the twelfth comparator (C12). The comparison may be made without or with consideration of the algebraic sign. A purely value-based comparison is thus preferably a comparison of the absolute values.

v13 thirteenth comparison result signal. In the example of FIG. 50 the thirteenth comparison result signal represents the result of the comparison between the value of the integrated sixth difference signal (d6i) and the thirteenth reference value (Ref13) by the thirteenth comparator (C13). The comparison may be made without or with consideration of the algebraic sign. A purely value-based comparison is thus preferably a comparison of the absolute values.

v14 fourteenth comparison result signal. In the example of FIG. 49 the fourteenth comparison result signal represents the result of the comparison between the value of the integrated fifth difference signal (d5i) and the fourteenth reference value (Ref14) by the fourteenth comparator (C14). The comparison may be made without or with consideration of the algebraic sign. A purely value-based comparison is thus preferably a comparison of the absolute values.

v15 fifteenth comparison result signal. In the example of FIG. 53 the fifteenth comparison result signal preferably represents the result of the comparison between the determined angle (for example arctan(a)) of the two coefficients of the first sub-signal (S3a) of the third analogue signal (S3) and the fifteenth reference value (Ref15) by the fifteenth comparator (C15), which is preferably situated within the coefficient monitoring sub-apparatus (KUE3a) for the first sub-signal (S3a) of the third analogue signal (S3). The comparison may be made without or with consideration of the algebraic sign. A purely value-based comparison is thus preferably a comparison of the absolute values.

v16 sixteenth comparison result signal. In the example of FIG. 53 the sixteenth comparison result signal preferably represents the result of the comparison between the determined angle (for example arctan(a)) of the two coefficients of the second sub-signal (S3b) of the third analogue signal (S3) and the sixteenth reference value (Ref16) by the sixteenth comparator (C16), which is preferably situated within the coefficient monitoring sub-apparatus (KUE3b) for the second sub-signal (S3b) of the third analogue signal (S3). The comparison may be made without or with consideration of the algebraic sign. A purely value-based comparison is thus preferably a comparison of the absolute values.

v17 seventeenth comparison result signal. In the example of FIG. 53 the seventeenth comparison result signal preferably represents the result of the comparison between the determined angle (for example arctan(a)) of the two coefficients of the first sub-signal (S2a) of the second analogue signal (S2) and the seventeenth reference value (Ref17) by the seventeenth comparator (C17), which is preferably situated within the coefficient monitoring sub-apparatus (KUE2a) for the first sub-signal (S2a) of the second analogue signal (S2). The comparison may be made without or with consideration of the algebraic sign. A purely value-based comparison is thus preferably a comparison of the absolute values.

v18 eighteenth comparison result signal. In the example of FIG. 53 the eighteenth comparison result signal preferably represents the result of the comparison between the determined angle (for example arctan(a)) of the two coefficients of the second sub-signal (S2b) of the second analogue signal (S2) and the eighteenth reference value (Ref18) by the eighteenth comparator (C18), which is preferably situated within the coefficient monitoring sub-apparatus (KUE2b) for the second sub-signal (S2b) of the second analogue signal (S2). The comparison may be made without or with consideration of the algebraic sign. A purely value-based comparison is thus preferably a comparison of the absolute values.

v19 nineteenth comparison result signal. In the example of FIG. 53 the nineteenth comparison result signal preferably represents the result of the comparison between the determined angle (for example arctan(a)) of the two coefficients of the third sub-signal (S2c) of the second analogue signal (S2) and the nineteenth reference value (Ref19) by the nineteenth comparator (C19), which is preferably situated within the coefficient monitoring sub-apparatus (KUE2c) for the third sub-signal (S2c) of the second analogue signal (S2). The comparison may be made without or with consideration of the algebraic sign. A purely value-based comparison is thus preferably a comparison of the absolute values.

Z1 first moment in time

Z2 second moment in time z1 first moment in time for the storage of the determined coefficients z2 second moment in time for the storage of the determined coefficients z3 third moment in time for the storage of the determined coefficients z4 fourth moment in time for the storage of the determined coefficients ZA signal to be analysed by the coefficient monitoring sub-apparatus (KUE) in question. This may be, for example, one of the following signals with the following reference signs: S2a, S2b, S2c, S3a, S3b. Other internal, symmetrical signals may thus also be monitored.

zn n-th moment in time for the storage of the determined coefficients

The invention claimed is:

1. A self-testing measuring system (SS) comprising:
a digital signal generating unit (DSO),
a driver stage (DR),
a measuring unit (TR), which transmits an analogue output signal (MS) as a measuring signal and receives a receive signal (ES) in response thereto,
an analogue input circuit (AS),
a digital input circuit (PSI),
an analogue channel simulation unit (ACS),
a digital channel simulation unit (DCS), an analogue multiplexer (AMX), and
a digital multiplexer (DMX),
wherein the measuring system (SS) assumes
  in an operating phase an operating mode and
  in a test phase, a first test mode,
wherein in the operating mode
  the digital signal generating unit (DSO) generates a first digital signal (S1),
  the driver stage (DR) converts the first digital signal (S1) of the digital signal generating unit (DSO) into a second analogue signal (S2),
  the second analogue signal (S2) prompts the measuring unit (TR) to transmit the analogue output signal (MS) as the measuring signal into a measuring channel (CN),
  the measuring unit (TR) receives the receive signal (ES) from the measuring channel (CN) depending on the analogue output signal (MS),
  the measuring unit (TR) generates a third analogue signal (S3) depending on the received receive signal (ES),
  the analogue multiplexer (AMX) forwards the third analogue signal (S3) to the analogue input circuit (AS) as a fourth analogue signal (S4),
  the analogue input circuit (AS) converts the fourth analogue signal (S4) into a fifth digital signal (S5),
  the digital multiplexer (DMX) forwards the fifth digital signal (S5) to the digital input circuit (DSI as a sixth digital signal (S6),
  the digital input circuit (DSI) receives the sixth digital signal (S6) and generates a seventh response signal (S7), and
  the seventh response signal (S7) is used as a measurement result or to form the measurement result,
wherein in the first test mode
  the digital signal generating unit (DSO) generates the first digital signal (S1),
  the driver stage (DR) converts the first digital signal (S1) of the digital signal generating unit (DSO) into the second analogue signal (S2),
  the second analogue signal (S2) prompts the measuring unit (TR) to emit the analogue output signal (MS) as the measurement signal into the measuring channel (CN),
  the measuring unit (TR) receives the receive signal (ES) from the measuring channel (CN) depending on the analogue output signal (MS),
  the measuring unit (TR) generates the third analogue signal (S3) depending on the received receive signal (ES),
  the analogue multiplexer (AMX) forwards the third analogue signal (S3) to the analogue input circuit (AS) as the fourth analogue signal (S4),
  the analogue input circuit (AS) converts the fourth analogue signal (S4) into the fifth digital signal (S5),
  the digital multiplexer (DMX) forwards the fifth digital signal (S5) to the digital input circuit (DSI) as the sixth digital signal (S6),
  the digital input circuit (DSI) receives the sixth digital signal (S6) and generates the seventh response signal (S7),
  the seventh response signal (S7) is used as a test result or to form a result of a check performed by the measuring system in the first test mode, wherein, in the test phase the measuring system also assumes a third test mode, in which:
  the digital signal generating unit (DSO) generates the first digital signal (S1),
  the digital channel simulation unit converts the first digital signal (S1) into a fifth digital test signal (S5t),
  the digital multiplexer (DMX) forwards the fifth digital test signal (S5t) to the digital input circuit (DSI) as the sixth digital signal (S6),
  the digital input circuit (DSI) receives the sixth digital signal (S6) and generates the seventh response signal (S7), and
  the seventh response signal (S7) is used as a test result or to form the result of a check performed by the measuring system in the third test mode.

2. The measuring system according to claim 1, wherein in the test phase, the measuring system also assumes a second test mode, besides the first test mode and the third test mode, wherein in the second test mode:
  the digital signal generating unit (DSO) generates the first digital signal (S1),
  the driver stage converts the first digital signal (DSI) of the digital signal generating unit (DSO) into the second analogue signal (S2),
  an analogue channel simulation unit (ACS) generates a third analogue test signal (S3t) based on the second analogue signal (S2),
  the analogue multiplexer (AMX) forwards the third analogue test signal (S3t) as the fourth analogue signal (S4),
  the analogue input circuit (AS) converts the fourth analogue signal (S4) into the fifth digital signal (S5),
  the digital multiplexer (DMX) forwards the fifth digital signal (S5) as the sixth digital signal (S6),
  the digital input circuit (DSI) receives the sixth digital signal (S6) and generates the seventh response signal (S7), and
  the seventh response signal (S7) is used as a test result or to form a result of a check performed by the measuring system in the second test mode.

3. The measuring system (SS) according to claim 1, further comprising:
  a transmitter (UEB), which is arranged between the measuring unit (TR) on a first side and the driver stage (DR) and the analogue multiplexer (AMX) on a second side,
  wherein in the operating mode and in the first test mode
    the second analogue signal (S2) of the driver stage (DR) is ted to the measuring unit (TR) by the transmitter (UEB), and
    the measuring unit (TR) feeds the receive signal (ES) to the transmitter (UEB), and the transmitter (UEB) forwards the receive signal (ES) as the third analogue signal (S3) to the analogue multiplexer (AMX).

4. The measuring system (SS) according to claim 3, wherein, in the operating mode, at least one comparison apparatus, in particular a comparator (C2, C3), compares a parameter value of the third analogue signal (S3a, S3b) with at least one reference value (Ref2, Ref3) and generates at least one comparison result signal (v2, v3) depending on a comparison result.

5. The measuring system according to claim 4, wherein, in the operating mode, an error message is generated when indicated by the at least one comparison result signal.

6. The measuring system according to claim 3, wherein, in the operating mode, at least one comparison apparatus, in particular a differential amplifier (D1), compares two parameter values of the third analogue signal (S3a, S3b) with one another, in particular by establishing a difference, and generates a difference signal (d1), and by comparing the difference signal (d1) with at least one reference value (Ref1) generates a comparison result signal (v1), in particular by means of a comparator (C1) separate from the comparison apparatus.

7. The measuring system (SS) according to claim 3, wherein, in the operating mode, at least one comparison apparatus, in particular a comparator (C4, C5, C6), compares a parameter value of the second analogue signal (S2a, S2b, S2c) with a respective reference value (Ref4, Ref5, Ref6) and generates a respective comparison result signal (v4, v5, v6) depending on a respective comparison result.

8. The measuring system (SS) according to claim 3, wherein, in the operating mode, at least one comparison apparatus, in particular a differential amplifier (D7, D6, D8), compares two parameter values of the second analogue signal (S2a, S2b, S2c) with one another, in particular by establishing a respective difference, and generates a respective difference signal (d6, d7, d8), and by comparing the respective difference signal (d6, d7, d8) with a respective reference value (Ref6, Ref7, Ref8) and generates a respective comparison result signal (v10, v11, v12), in particular by means of a respective comparator (C10, C11, C12) separate from the respective comparison apparatus.

9. The measuring system according to claim 8, wherein a control device (CTR) assesses the comparison result signal and generates the error message.

10. The measuring system (SS) according to claim 1, wherein the measuring unit (TR) is an ultrasound transducer which, as the analogue output signal (MS), transmits an ultrasound measurement signal as measurement signal into the ultrasound measuring channel (CN) and, as the receive signal (ES), receives the ultrasound receive signal reflected at an object in the ultrasound measuring channel.

11. The measuring system (SS) according to claim 1, further comprising a control device (CTR) for controlling the digital signal generating unit (DSO) and for receiving the seventh response signal (S7) of the digital input circuit (DSO, wherein the control device (CTR) in the first or second or third test mode compares the seventh response signal (S7) of the digital input circuit (DSI) with a predefined response and determines a comparison result.

12. The measuring system (SS) according to claim 11, wherein the control device (CTR), in the first or second or third test mode, controls the digital signal generating unit (DSO) with a test signal, and in that the control device (CTR), in the first or second or third test mode, compares the seventh response signal (S7) of the digital input circuit (DSI) with a predefined response and determines a comparison result, wherein the predefined response is dependent on the test signal.

13. The measuring system according to claim 1, further comprising a control device (CTR), wherein the control device (CTR), in the second test mode, controls the analogue channel simulation unit (ACS) via the driver stage (DR), and the creation of the third analogue test signal (S3t) from the second analogue signal (S2) and the channel simulation unit is dependent on this control of the analogue channel simulation unit (ACS), wherein the control device (CTR), in the second test mode, compares the seventh response signal (S7) of the digital input circuit (DSI) with a predefined response and determines a comparison result, wherein the predefined response and the control of the analogue channel simulation unit (ACS) are dependent on one another.

14. The measuring system according to claim 1, further comprising a control device (CTR), wherein the control device (CTR), in the third test mode, controls the digital channel simulation unit (DCS) and a way in which the digital channel simulation unit (DCS) generates the fifth digital test signal (S5t) from the first digital signal (S1) is dependent on the control of the digital channel simulation unit (DCS), and wherein the control device (CTR), in the third test mode, compares the seventh response signal (S7) of the digital input circuit (DSI) with a predefined response and determines a comparison result, wherein the predefined response and the control of the digital channel simulation unit (DCS) are dependent on one another.

15. The measuring system (SS) according to claim 1, wherein the analogue multiplexer (AMX) is part of the analogue channel simulation unit (ACS) or of the analogue input circuit (AS), or vice versa, and/or in that the digital multiplexer (DMX) is part of the digital channel simulation unit (DCS) or of the digital input circuit (DST), or vice versa.

16. The measuring system according to claim 1, wherein the measuring unit (SS) comprises an ultrasound transducer or a pair formed of at least one ultrasound transmitter and one ultrasound receiver, in that the second, third and fourth analogue signal (S2, S3, S4) is in each case an oscillating signal, in that the first, fifth and sixth digital signal (S1, S5, S6) represents in each case an oscillating signal, and in that the digital input circuit (DSI) comprises an apparatus for measuring a vibration frequency of the sixth digital signal (S6) in a transmission phase of the analogue output signal (MS) of the measuring unit (TR) and/or an apparatus for measuring a decay time of the sixth digital signal (S6) in a decay phase following the transmission phase and/or following a receipt of the receive signal (ES) of the ultrasound transducer or ultrasound transmitter of the pair formed of the at least one ultrasound transmitter and one ultrasound receiver.

17. The measuring system according to claim 16, wherein the digital input circuit (DSI) or a control device (CTR) compares the measured vibration frequency with a target value or a target value range of the vibration frequency, and/or the digital input circuit (DSI) or a control device (CTR) compares the measured decay time with a target value or a target value range of the decay time and in particular concludes that there is a short circuit of the measuring unit (TR), or an absent or non-functioning part of the measuring unit (TR), or a transmitter (LIB) connected on a secondary side, or another error, if the determined vibration frequency is higher than the target value of the vibration frequency or has a value above the target value range of the vibration frequency and/or if the determined decay time is shorter than the target value of the decay time or has a value below the target value range of the decay time, wherein the digital input circuit (DSI) or a control device (CTR) generates an error message in this case or these cases.

18. The measuring system (SS) according to claim 1, wherein the measuring unit (TR) comprises at least one active element for generating an acoustic, optical, electric, inductive, capacitive, electromagnetic IR or UV output signal (MS) as the measurement signal and at least one sensor element for detecting a signal as the receive signal (ES) in response to the analogue output signal (MS) of the active element.

19. The measuring system (SS) according to claim 1, wherein the measuring unit (TR) comprises an ultrasound transducer or a pair formed of at least one ultrasound transmitter and an ultrasound receiver, a TOF camera, a pair formed of heating element and temperature sensor, a pair formed of optical transmitter and optical receiver, or at least one other pair formed of actuator and sensor, which are operatively connected to one another, and/or a Micro-Electrical-Mechanical-System, a Micro-Electrical-Optical-System or a Micro-Electrical-Mechanical-Optical-System.

20. The measuring system (SS) according to a claim 1, wherein, in the operating mode, a value profile and/or values of the seventh response signal (S7), in particular in the form of measurement results and measured values, can be checked for plausibility, in particular by a comparison with target values and target value ranges, by the digital input circuit (DSI) and/or the control device (CTR).

21. The measuring system (SS) according to claim 20, wherein the value profile and/or the values of the seventh response signal (S7), which in particular are present in the form of measurement results and measured values, are/is forwarded in the operating mode only if the plausibility check was successful, and/or in that an error message is generated if the plausibility check was not successful.

22. A method for operating the self-testing measuring system (SS) according to claim 1, the method comprising:
assuming the third test mode and simulating at least one test case by generation of a test signal (S0) corresponding to this test case by the control device (CTR),
detecting the seventh response signal (S7) by the control device (CTR),
comparing the seventh response signal (S7) with a predefined pattern for the seventh response signal (S7),
determining an error if the seventh response signal (S7) does not correspond exactly to the predefined pattern of the seventh response signal (S7),
leaving the third test mode, and
assuming the operating mode.

23. The method according to claim 22, wherein the operating mode is assumed if no error has occurred in the test mode in question, or in that the operating mode is assumed in spite of the occurrence of an error in the test mode in question.

24. A method for operating the self-testing measuring system (SS) of claim 1, comprising:
assuming the second test mode and simulating at least one test case by generation of a test signal (S0) corresponding to this test case by the control device (CTR),
detecting the seventh response signal (S7) by the control device (CTR),
comparing the seventh response signal (S7) with a predefined pattern corridor for the seventh response signal (S7),
determining an error if the seventh response signal (S7) does not lie within the predefined pattern corridor of the seventh response signal (S7),
leaving the second test mode, and
assuming the operating mode.

25. A method for operating the self-testing measuring system according to claim 1, comprising:
assuming the first test mode by the measuring system (SS) and simulating at least one test case by generation of a test signal (S0) corresponding to this test case by the control unit (CTR),
detecting the seventh response signal (S7) by the control unit (CTR),
comparing the seventh response signal (S7) with a predefined pattern corridor for the seventh response signal (S7),
determining an error if the seventh response signal (S7) does not lie within the predefined pattern corridor of the seventh response signal (S7),
leaving the first test mode, and
assuming the operating mode.

26. A method for operating the self-testing measuring system (SS) according to claim 1, comprising:
optionally assuming a switched-on mode (EZ) once the measuring system (SS) has been switched on or reset,
assuming the third test mode and checking a function of the digital signal generating unit (DSO) and of the digital input circuit (DSI) by means of at least one predetermined test pattern or a predetermined test sequence and displaying and/or changing into an error mode (FZ) if an error occurs,
assuming the first test mode and performing parametric testing of a functioning of the measuring unit (TR) by means of at least one predetermined test pattern or a predetermined test sequence and displaying and/or changing into an error mode (FZ) if an error occurs, and
assuming the operating mode.

27. The method according to claim 26, wherein, in the switched-on mode (EZ) once the measuring system (SS) has been switched on or reset, no measured values are output via a data interface (IO), but only status messages regarding a progress of a switch-on process.

* * * * *

UNITED STATES PATENT AND TRADEMARK OFFICE
CERTIFICATE OF CORRECTION

PATENT NO. : 11,313,967 B2
APPLICATION NO. : 17/106750
DATED : April 26, 2022
INVENTOR(S) : André Schmidt, Guido Schlautmann and Stefanie Heppekausen It is certified that error appears in the above-identified patent and that said Letters Patent is hereby corrected as shown below:

In the Claims

In Claim 3, at Line 47 of Column 66, the word "ted" should be replaced with the word --fed--.

Signed and Sealed this
Thirteenth Day of December, 2022

Katherine Kelly Vidal
*Director of the United States Patent and Trademark Office*